US012749807B2

(12) United States Patent
Zhang et al.

(10) Patent No.: US 12,749,807 B2
(45) Date of Patent: Sep. 29, 2026

(54) PIXEL-BASED RECONFIGURABLE ANTENNA APPLICABLE IN FLUID ANTENNA SYSTEMS

(71) Applicant: The Hong Kong University of Science and Technology, Hong Kong (CN)

(72) Inventors: Jichen Zhang, Hong Kong (CN); Junhui Rao, Hong Kong (CN); Zhaoyang Ming, Hong Kong (CN); Zan Li, Hong Kong (CN); Chi Yuk Chiu, Hong Kong (CN); Ross David Murch, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 0 days.

(21) Appl. No.: 19/226,246

(22) Filed: Jun. 3, 2025

(65) Prior Publication Data

US 2025/0372866 A1 Dec. 4, 2025

Related U.S. Application Data

(60) Provisional application No. 63/655,830, filed on Jun. 4, 2024.

(51) Int. Cl.

*H01Q 3/01* (2006.01)
*H01Q 1/38* (2006.01)
*H01Q 23/00* (2006.01)

(52) U.S. Cl.

CPC ................ *H01Q 3/01* (2013.01); *H01Q 1/38* (2013.01); *H01Q 23/00* (2013.01)

(58) Field of Classification Search

CPC ............ H01Q 3/01; H01Q 1/38; H01Q 23/00
See application file for complete search history.

(56) References Cited

U.S. PATENT DOCUMENTS 6,885,345 B2 4/2005 Jackson
9,379,449 B2 6/2016 Cetiner et al.

OTHER PUBLICATIONS

Wee Kiat New et al., A Tutorial on Fluid Antenna System for 6G Networks: Encompassing Communication Theory, Optimization Methods and Hardware Designs.

Wong et al., Bruce Lee-Inspired Fluid Antenna System: Six Research Topics and the Potentials for 6G; Frontiers in Communications and Networks; Mar. 2022; vol. 3; Article 853416.

Kai-Kit Wong et al., Fluid Antenna System—Part I: Preliminaries; IEEE 2023.

*Primary Examiner* — Graham P Smith
(74) *Attorney, Agent, or Firm* — S&F/WEHRW

(57) ABSTRACT

A pixel-based reconfigurable antenna (PRA) and the method for designing a PRA are disclosed. The PRA supports a total of N fluid antenna system (FAS) ports uniformly distributed across a linear length of Wλ. A physical model is established to connect the correlation of the antenna's reconfigurable radiation patterns with the spatial correlation of physical displacement. A two-step search optimization algorithm is proposed to find the optimized configurations of a pixel layer of the PRA.

31 Claims, 30 Drawing Sheets

PIXEL-BASED RECONFIGURABLE ANTENNA APPLICABLE IN FLUID ANTENNA SYSTEMS

CROSS-REFERENCE TO RELATED APPLICATIONS

This application claims priority to, and the benefit of, U.S. Provisional Patent Application Ser. No. 63/655,830 filed Jun. 4, 2024, the disclosure of which is incorporated by reference herein in its entirety.

FIELD OF THE DISCLOSURE

The present invention relates to a field of antenna systems.

BACKGROUND

It is expected that total mobile data traffic, including traffic generated by fixed wireless access, will grow from 130 EB per month in 2024 to 403 EB per month in 2029 [1]. To meet this demand, the development of the next generation of wireless communication, the 6-th generation (6G), is underway [2], [3], [4]. It is anticipated that 6G will leverage a suite of technologies that span fundamental electromagnetic structures, such as multiple-input multiple-output (MIMO) and reconfigurable intelligent surfaces (RISs) through to artificial intelligence (AI), all of which are currently being investigated [5], [6], [7]. The development of 6G will also require new technologies to be developed, and one such system having potential for 6G applications is the Fluid Antenna System (FAS) [8], [9], which promises to enhance wireless system performance and potentially reduce implementation costs [10]. A FAS uses a liquid-based or reconfigurable antenna structure to dynamically change its physical or electrical characteristics, such as resonance frequency, radiation pattern, or polarization, to suit different communication scenarios. The system may use liquid metals (e.g., gallium-based alloys) or microfluidic technologies to physically reshape the antenna. Alternatively, it may employ electronic reconfiguration techniques, such as tunable components or software-defined controls, to adjust antenna properties without physical movement. While a FAS utilize the term "fluid", it should be noted that this term is utilized from the systems perspective and the design of FAS may use any implementation as long as it meets the system requirements of FAS.

The development of FAS was inspired from the wireless systems perspective where there are numerous results. However, existing implementations of FAS remain relatively scarce to date, and these have been primarily based on mechanical antennas including liquid-based [19], [20], surface-wave-based [21], and programmable droplet-based [22]. They can largely meet the system specifications of FAS by moving metal or liquid in the antenna to achieve the fine spatial sampling. However, since FAS designs depend on physical fluid displacement, their reconfiguration speed is inherently limited by mechanical movement, imposing significant performance constraints [12]. Compared to the packet transmission rate (around one millisecond per packet), existing mechanical based FAS designs are not fast enough [9] to provide the packet-by-packet reconfigurability.

A Pixel-based Reconfigurable Antenna (PRA) is a type of advanced antenna system that uses a grid of small, individually controllable elements called pixels to dynamically change its radiation pattern, frequency, polarization, or other properties. This reconfigurability allows the antenna to adapt to different communication requirements or environmental conditions in real time. The antenna consists of a grid of small conductive elements (pixels) that can be electrically connected or disconnected using switches (e.g., PIN diodes, MEMS switches, or transistors). By controlling the state of these pixels, the antenna's physical or electrical structure can be reconfigured. PRA has a long history of development and date back to 2004 when they were first proposed [23]. Since then, a large number of designs have been proposed that can reconfigure pattern [24], [25], [26], polarization [27], phase [28], and frequency [29], [30]. S. Song et al. proposed an approach for optimizing frequency reconfigurable pixel antennas using genetic algorithms, realizing a reconfigurable dual-band antenna that reconfigures the bands 820-1140 and 1720-1900 MHz to the bands 860-1160 and 1890-2300 MHz with dimensions of 39 mm×24 mm on a ground plane of 40 mm×65 mm with one switch only [30]. To obtain a wider bandwidth for the FAS to handle stable correlations for larger bandwidth, it is necessary to increase the number of switches. That is, more switch combinations are to be searched through to find those with sufficient bandwidth.

SUMMARY

The present invention aims to propose a design for a PRA that meets the requirements of a FAS and the required switching speed. That is, the new approach is proposed to a FAS system design that leverages PRA design. One of the challenges in using PRAs for a FAS is that previous designs have not been developed to provide fine spatial sampling of the channels. Therefore, in the disclosure, inventors propose a novel FAS that is based on a PRA design, successfully providing a method resolving fine spatial sampling of the channels.

In the present disclosure, the PRA is also referred as PRA-FAS or FAS throughout the specification. These names or port names named after them are only for the convenience of description and are not intended to limit the scope of the claims. Other names that meet the same or similar structures or functions described in the claims may also be replaced by the principle of equivalents. Unlike conventional FAS that rely on physical movement, the proposed FAS employs radio frequency (RF) switches to achieve the desired adaptability. Leveraging electronic switching components (e.g., PIN diodes), PRA achieves μs-level reconfiguration speeds, satisfying the packet-to-packet reconfigurability requirements essential for FAS operation.

In one embodiment, the proposed design can provide 12 FAS ports across ½ wavelength and consists of an E-slot patch antenna and an upper reconfigurable pixel layer with 6 RF switches. Simulation and experimental results from a prototype operating at 2.5 GHz demonstrate that the design can meet the requirements of FAS including port correlation with matched impedance.

The inventors have found that doubling the height of the radiating feed plate and increasing the number of switches to 7 can increase the bandwidth to 130 MHz, exceeding 5%. Future investigation of increasing the bandwidth is required so that other approaches can also be considered for bandwidth extension.

In one aspect of the disclosure there is provided a PRA. The PRA comprises: a lower substrate; a ground plane attached to a bottom surface of the lower substrate; and a patch antenna attached to a top surface of the lower substrate. The patch antenna serves as a radiation source of the PRA, and the radiation source is configured to be fed from a back side of the ground plane through a probe. The PRA further comprises: an upper substrate disposed above the lower substrate and separated from the lower substrate with a spacing of hair; and a pixel layer consisting of plural metallic pixel patches attached to a top surface of the upper substrate. The plural metallic pixel patches are arranged in a uniform grid pattern with a constant pitch distance b between any two adjacent metallic pixel patches. The patch antenna provides reference electric field, which is then radiated after being coupled to metals of the pixel layer. The pixel layer is reconfigurable. Each reconfigurable state of the PRA corresponds to a FAS port. The PRA supports a total of N FAS ports uniformly distributed across a linear length of Wλ, where λ is wavelength, W is the number of the wavelengths, and N/W>1. Connections between any two adjacent metallic pixel patches are configured to be hard-wired, open-circuited, or implemented via RF switches. Position selections of hardwires, open circuits, and the RF switches satisfy a first condition that the position selections of the hardwires, the open circuits, and the RF switches provide impedance match over a specified bandwidth. Selection and ordering of the N FAS ports from on/off state combinations of the RF switches satisfy a second condition that any two adjacent FAS ports of the N FAS ports are spatial correlated. The second condition can be satisfied when difference between a radiation pattern covariance matrix of all reconfigurable states and a target covariance matrix is minimized.

Additionally or optionally, the connections between any two adjacent metallic pixel patches in the uniform grid pattern constitute a total of $\mathcal{Q}$ internal ports, of which P internal ports are designated for the RF switches. Open states denoted by 0 or connected states denoted by 1 between any two adjacent metallic pixel patches are represented by a vector x and position selections of the RF switches are specified by a set S, so that the vector x and the set S given below completely define a connection configuration of the PRA for the pixel layer:

$$x = [x_1, x_2, \ldots, x_{\mathcal{Q}}], \tag{10}$$

where $x_q \in \{0, 1\}$ for q=1, 2, . . . , $\mathcal{Q}$, $$S = \{q_1, q_2, \ldots, q_P\}, \text{ for } P < \mathcal{Q}, \tag{11}$$

where $q_1$ to $q_P$ specify ordinal indices in the vector x of selected positions for P RF switches among the $\mathcal{Q}$ internal ports.

Additionally or optionally, for a vector $x_l$ of all possible vectors x and a set $S_k$ of all possible sets S, $\mathcal{U}_{k,l}$ defines a set that contains $2^P$ elements representing all of the on/off state combinations of the RF switches. A total number of such defined sets $$\mathcal{U}_{k,l} \text{ is } 2^{\mathcal{Q}-P} C_P^{\mathcal{Q}}.$$

Set $$\mathcal{U}_{k,l}^M$$

is a subset of set $\mathcal{U}_{k,l}$ that satisfies the first condition, and the first condition is mathematically formulated as $$\mathcal{U}_{k,l}^M = \{x_l^m | S_E(x_l^m, S_k) < -10 \text{ dB}, x_l^m \in \mathcal{U}_{k,l}\} \tag{18}$$

$$\text{s.t.: } \mathrm{card}(\mathcal{U}_{k,l}^M) = M \geq N, \tag{19}$$

where $$S_E(x_l^m, S_k)$$

is a reflection coefficient of the PRA under a connection configuration determined by the vector $$x_l^m$$

and the set $S_k$.

Additionally or optionally, part of sets $$\mathcal{U}_{k,l}^M$$

that satisfies the first condition are selected as candidate sets for implementing the second condition to reduce search space.

Additionally or optionally, the second condition serves as a optimization objective for a genetic algorithm (GA)'s object function $\delta_e(D)$, and the optimization objective is given by $$\min_D \delta_e(D) \quad \text{s.t.: } D \in \{1, 2, \ldots, M\}^N, \text{ with } [D]_n \neq [D]_{n'}, \tag{30}$$

where a vector sequence $D=[d_1, d_2, \ldots, d_N]^T$ represents the selection and ordering of the N FAS ports from M matching patterns in each candidate set $$\mathcal{U}_{k,l}^M,$$

and the objective function $\delta_e(D)$ is given by $$\delta_e(D) = \frac{\Delta(D)}{TN^2}, \tag{29}$$

where Δ(D) is a total absolute error given by $$\Delta D = \sum_{n=1}^{N} \sum_{n'=1}^{N} \left| |[\varrho(D)]_{n,n'}| - |[\varrho^*]_{n,n'}| \right|, \tag{26}$$

where $[\varrho]_{n,n'}$ is an (n, n')-th entry of the radiation pattern covariance matrix $\varrho$, and $[\varrho^*]_{n,n'}$ is an (n, n')-th entry of the target covariance matrix $\varrho^*$.

Additionally or optionally, when frequency is considered to meet the requirement of bandwidth, equation (18) is replaced by $$\mathcal{U}_{k,l}^{M} = \{x_l^m | \max[S_E(x_l^m, S_k, f_t)] < -10 \text{ dB}, x_l^m \in \mathcal{U}_{k,l}\}, \quad (27)$$

and equation (26) is replaced by $$\Delta(D) = \sum_{t=1}^{T} \sum_{n=1}^{N} \sum_{n'=1}^{N} \left\| [\varrho(D, f_t)]_{n,n'} \right| - \left| [\varrho^*]_{n,n'} \right\|, \quad (28)$$

where $$f_t = f_l + (t-1)\frac{f_u - f_l}{T-1}$$

for t=1, 2, . . . , T, $f_l$ is a lower limit, $f_u$ is an upper limit, and T represents sampling frequency points.

Additionally or optionally, $[\varrho^*]_{n,n'}$ is given by $$[\varrho^*]_{n,n'} = J_0\left(\frac{2\pi|n-n'|W}{N-1}\right), \quad (25)$$

where $J_0$ is Bessel function of first kind, order zero.

Additionally or optionally, a $(Q+1)\times(Q+1)$ impedance matrix Z represents impedances of $(Q+1)$ ports made up of the Q internal ports and a single external feed port, and the $(Q+1)\times(Q+1)$ impedance matrix Z is represented by $$Z = \begin{bmatrix} Z_E & Z_{EI} \\ Z_{IE} & Z_I \end{bmatrix} = \begin{bmatrix} z_{0,0}(f) & z_{0,1}(f) & \dots & z_{0,Q}(f) \\ z_{1,0}(f) & z_{1,1}(f) & \dots & z_{1,Q}(f) \\ \vdots & \vdots & \ddots & \vdots \\ z_{Q,0}(f) & z_{Q,1}(f) & \dots & z_{Q,Q}(f) \end{bmatrix},$$

where $Z_{i,j}(f)$ denotes each element of the $(Q+1)\times(Q+1)$ impedance matrix Z, where f is frequency, 0 is the single external feed port, and 1 to $Q$ are the $Q$ internal ports, and where $Z_E \in \mathbb{C}^{1\times 1}$, $Z_{EI} \in \mathbb{C}^{1\times Q}$, $Z_{IE} \in \mathbb{C}^{Q\times 1}$ and $Z_I \in \mathbb{C}^{Q\times Q}$ are four sub-matrixes of the $(Q+1)\times(Q+1)$ impedance matrix Z.

Additionally or optionally, an input impedance of the PRA is calculated as $$Z_{in}(x, S) = Z_E - Z_{EI}\left[Z_I + Z^L(x, S)\right]^{-1} Z_{IE}, \quad (15)$$

where $Z^L(x, S)$ is a $Q\times Q$ diagonal matrix indicating impedances terminated at the $Q$ internal ports under a connection configuration determined by the vector x and the set S.

Additionally or optionally, the reflection coefficient $$S_E(x_l^m, S_k)$$

is given by $$S_E(x_l^m, S_k) = 10 \cdot lg \left| \frac{Z_{in}(x_l^m, S_k) - Z_0}{Z_{in}(x_l^m, S_k) + Z_0} \right|^2 \text{dB}, \quad (20)$$

where $Z_0$ denotes a characteristic impedance, and $Z_{in}(\mathbf{x}_l^m, S_k)$ is the input impedance of the PRA under the connection configuration determined by the vector $$x_l^m$$

and the set $S_k$.

Additionally or optionally, $$e_q^{oc}(\Omega)$$

is an open-circuit radiation pattern excited by a unit current at a q-th port of the $(Q+1)$ ports when all other ports are open, given by $$e_q^{oc}(\Omega) = \left[e_{\theta,q}^{oc}(\Omega), e_{\phi,q}^{oc}(\Omega)\right]^T$$

where θ and ϕ represent an elevation angle and an azimuth angle in spherical coordinates, respectively, and Ω=(θ, ϕ). A combination of $$e_q^{oc} \text{ for } q = 0, 1, 2, \dots, Q$$

is represented by an open-circuit radiation pattern matrix $E_{OC}$, given by $$E_{OC} = [e_0^{oc}, e_1^{oc}, e_2^{oc}, , \mathbf{e}_Q^{oc}].$$

Additionally or optionally, the radiation pattern covariance matrix $\varrho$ is written as $$\varrho = \varrho_0 = |C \oslash G|, \quad (22)$$

where $\oslash$ is Hadamard division, a matrix $G \in \mathbb{C}^{M\times M}$ represents an average energy of all M matching patterns and is used for normalization, and an (i, j)-th entry of the matrix G is written as $$[G]_{i,j} = \sqrt{[C]_{i,i}[C]_{j,j}}, \quad (24)$$

where a matrix C is an absolute correlation matrix of all M matching patterns, defines as $$C = I^H\left(\int\int_{\Omega} E_{OC}^H E_{OC} S(\Omega) d(\Omega)\right) I = I^H K_{OC} I, \quad (23)$$

where $K_{OC} \in \mathbb{C}^{(Q+1)\times(Q+1)}$ is a correlation matrix of all open-circuit radiation patterns weighted by $S(\Omega)$, $S(\Omega)$ is power angular spectrum (PAS), $E_{OC}$ is the open-circuit radiation pattern matrix, and $I=[i_1, i_2, \ldots, i_M]$ is a current matrix, where $i_1, i_2, \ldots, i_M$ are current vectors of all M matching patterns, each given by $$i = \frac{1}{\sqrt{Z_{in}(x, S)}}\begin{bmatrix} 1 \\ -[Z_I + Z^L(x, S)]^{-1} Z_{IE} \end{bmatrix}. \quad (17)$$

Additionally or optionally, $[\varrho]_{n,n'}$ is given by $$[\varrho]_{n,n'} = \frac{\int\int e_n(\Omega)\cdot e^*_{n'}(\Omega)S(\Omega)d\Omega}{\sqrt{\int\int e_n(\Omega)\cdot e^*_{n'}(\Omega)S(\Omega)d\Omega \int\int e_{n'}(\Omega)\cdot e^*_{n'}(\Omega)S(\Omega)d\Omega}}, \quad (8)$$

where $S(\Omega)$ is power angular spectrum (PAS), $e_n(\Omega)$ represents FAS radiation pattern of an n-th port of the N FAS ports excited by an n-th current vector $i_n$, and $e^*_{x'}(\Omega)$ denotes a complex conjugate of $e_{n'}(\Omega)$. $e_n(\Omega)$ is written as $$e_n(\Omega) = \sum_{q=0}^{Q} [i_n]_q e_q^{oc}(\Omega) = E_{OC} i_n, \quad (16)$$

where $E_{OC}$ is the open-circuit radiation pattern matrix, and the n-th current vector $i_n$ is obtained by $$i_n = \frac{1}{\sqrt{Z_{in}(x, S)}}\begin{bmatrix} 1 \\ -[Z_I + Z^L(x, S)]^{-1} Z_{IE} \end{bmatrix}. \quad (17)$$

Additionally or optionally, $Q=60$, P=6, and a number of the candidate sets for implementing the second condition is approximately 100.

Additionally or optionally, the upper and lower substrates are square prisms of size $P_s \times P_s \times h$, with a side length $P_s$ and a height h, each metallic pixel patch is a square having a side length a, the uniform grid pattern is arranged in a $N_s \times N_s$ square configuration, and a number of internal ports is given by $Q=2\times N_s \times (N_s-1)$.

Additionally or optionally, the patch antenna is an E-slot patch with a first slot and a second slot each extending inward from a long edge of a $L_p \times W_p$ rectangular radiating surface of the E-slot patch. The first and second slots are elongated rectangles each with dimensions $L_s \times W_s$.

Additionally or optionally, the RF switches are controlled by direct current (DC) control lines arranged around boundaries of the PRA, with capacitors replacing part of the hardwires and inductors occupying feed points of the DC control lines and replacing part of the open circuits. The capacitors and the inductors provide isolation between DC control signals and RF signals.

In another aspect of the disclosure there is provided a method for designing a PRA. A pixel layer of the PRA is reconfigurable. Each reconfigurable state of the PRA corresponds to a FAS port. The PRA supports a total of N FAS ports uniformly distributed across a linear length of Wλ, where λ is wavelength, W is the number of the wavelengths, and N/W>1. The method comprises: selecting positions of hardwires, open circuits, or RF switches between any two adjacent metallic pixel patches in the pixel layer to satisfy a first condition that the position selections of the hardwires, the open circuits, and the RF switches provide impedance match over a specified bandwidth; and selecting and ordering the N FAS ports from on/off state combinations of the RF switches to satisfy a second condition that any two adjacent FAS ports of the N FAS ports are spatial correlated. The second condition can be satisfied when difference between a radiation pattern covariance matrix of all reconfigurable states and a target covariance matrix is minimized.

Additionally or optionally, the method further comprises selecting part of sets $$\mathcal{U}_{k,l}^{M}$$

that satisfies the first condition as candidate sets for implementing the second condition to reduce search space.

Other example embodiments are discussed herein.

BRIEF DESCRIPTION OF THE DRAWINGS

Embodiments of the disclosure will now be described, by way of example only, with reference to the accompanying drawings in which.

(2 FAS Channels) or 12 PRA-FAS states (ports) for three different stationary channels.

Figure 20:
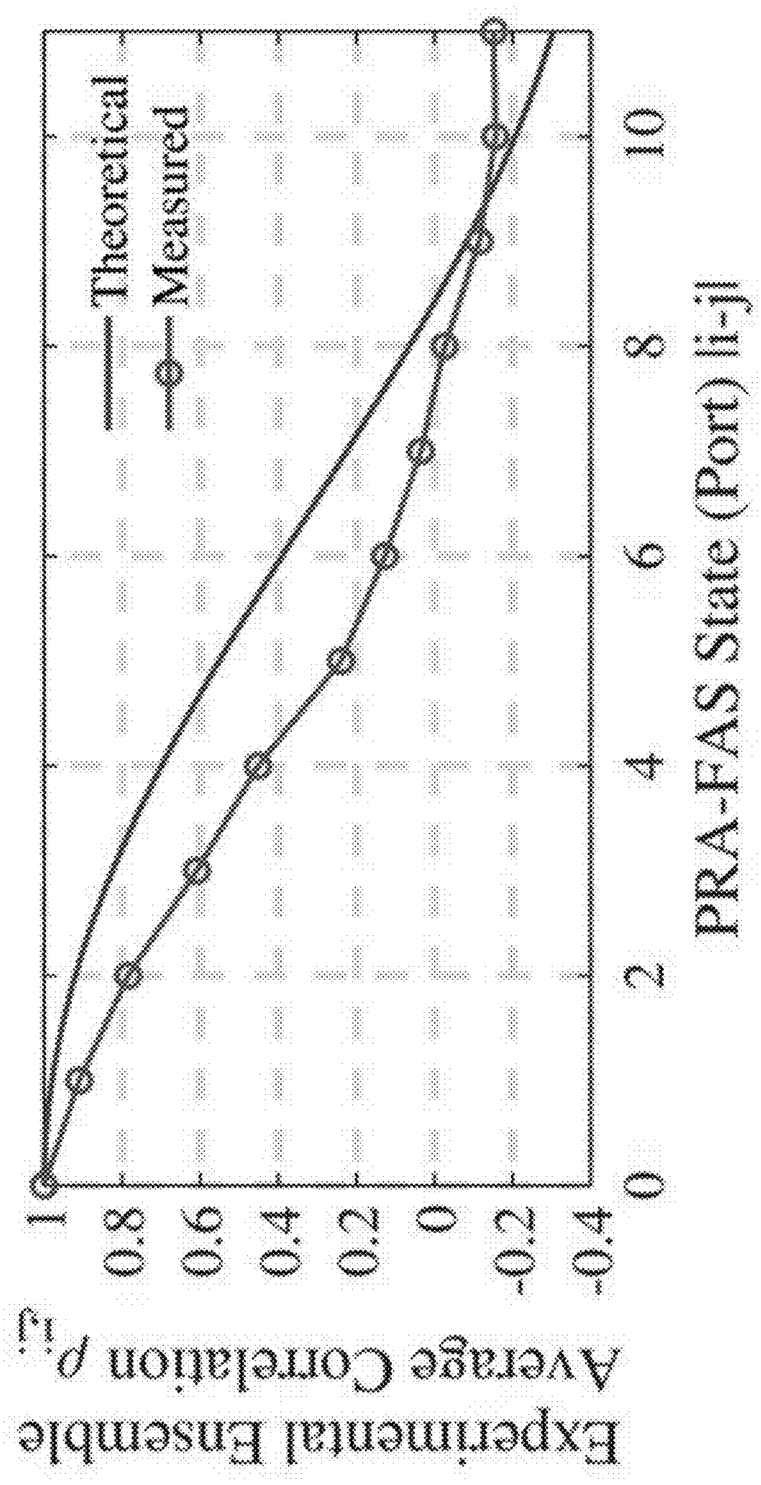

FIG. 20 illustrates theoretical Bessel curve in equation (9) and measured ensemble average port correlation of the PRA-FAS.

Figure 21:
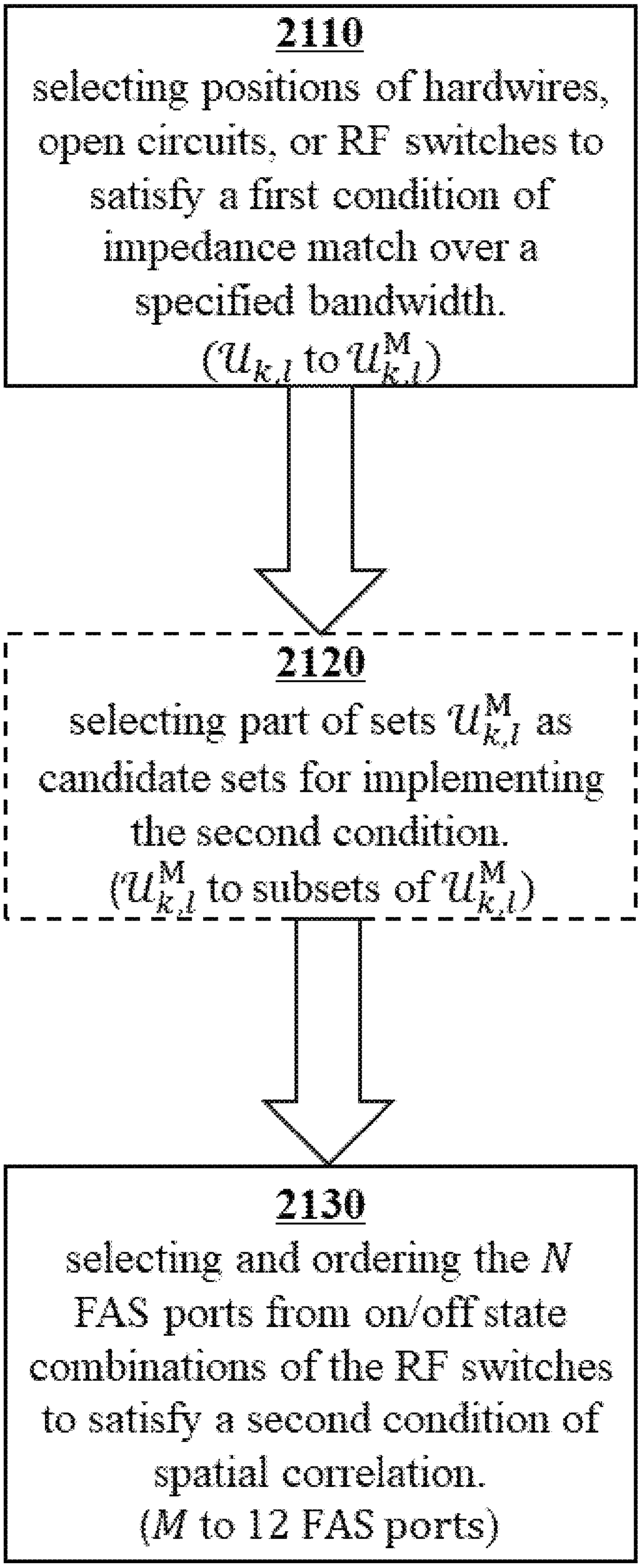

FIG. 21 illustrates a method for designing a PRA-FAS according to a certain embodiment of the present disclosure.

In the drawings, similar reference numbers are used for similar elements to aid comprehension.

DETAILED DESCRIPTION

The present disclosure will now be described with reference to the following examples which should be considered in all respects as illustrative and non-restrictive. In the Figures, corresponding features within the same embodiment or common to different embodiments have been given the same or similar reference numerals.

Throughout the description and the claims, the words "comprise", "comprising", and the like are to be construed in an inclusive sense as opposed to an exclusive or exhaustive sense; that is to say, in the sense of "comprising, but not limited to".

Furthermore, as used herein and unless otherwise specified, the use of the ordinal adjectives "first", "second", etc., to describe a common object, merely indicate that different instances of like objects are being referred to, and are not intended to imply that the objects so described must be in a given sequence, either temporally, spatially, in ranking, or in any other manner.

The terms 'upper', 'lower', 'top', and 'bottom' as used in the specification and claims are employed solely to clearly describe the relative positioning between elements in the illustrated embodiments. These directional references are not intended to limit any element to being exclusively above, below, at the top of, or at the bottom of another element. For example, an apparatus comprising these elements may be inverted, rotated, or otherwise oriented such that what is described as the 'top' may become the 'bottom', and vice versa, without departing from the scope of this disclosure.

For brevity, the explicit dependence of frequency on electromagnetic quantities such as impedance and radiation patterns are omitted, unless otherwise stated. Letters in bold font denote matrices or vectors, while letters not in bold font represent scalars. $\theta$ and $\phi$ represent spherical coordinates and are termed the elevation and azimuth angles, with $\hat{\theta}$ and $\hat{\phi}$ being the unit spherical coordinate vectors. $[A]_i$ is the i-th element of the vector A, while $[A]_{i,j}$, $A^T$ and $A^H$ are the (i, j)-th entry, the transpose, and the conjugate transpose of the matrix A, respectively. Letters in maths calligraphy font denote the set. The cardinal number of set $\mathcal{U}$ is denoted as card ($\mathcal{U}$). $\delta(\cdot)$ denotes the impulse function. $U_N$ is the N×N identity matrix. diag($a_1$, $a_2$, . . . , $a_N$) denotes a diagonal matrix with diagonal elements $a_1$, $a_2$, . . . , $a_N$.

Theoretical foundations, implementation methodologies, apparatus embodiments, along with simulation and experimental results of the present disclosure are comprehensively detailed below.

Figure 1A:
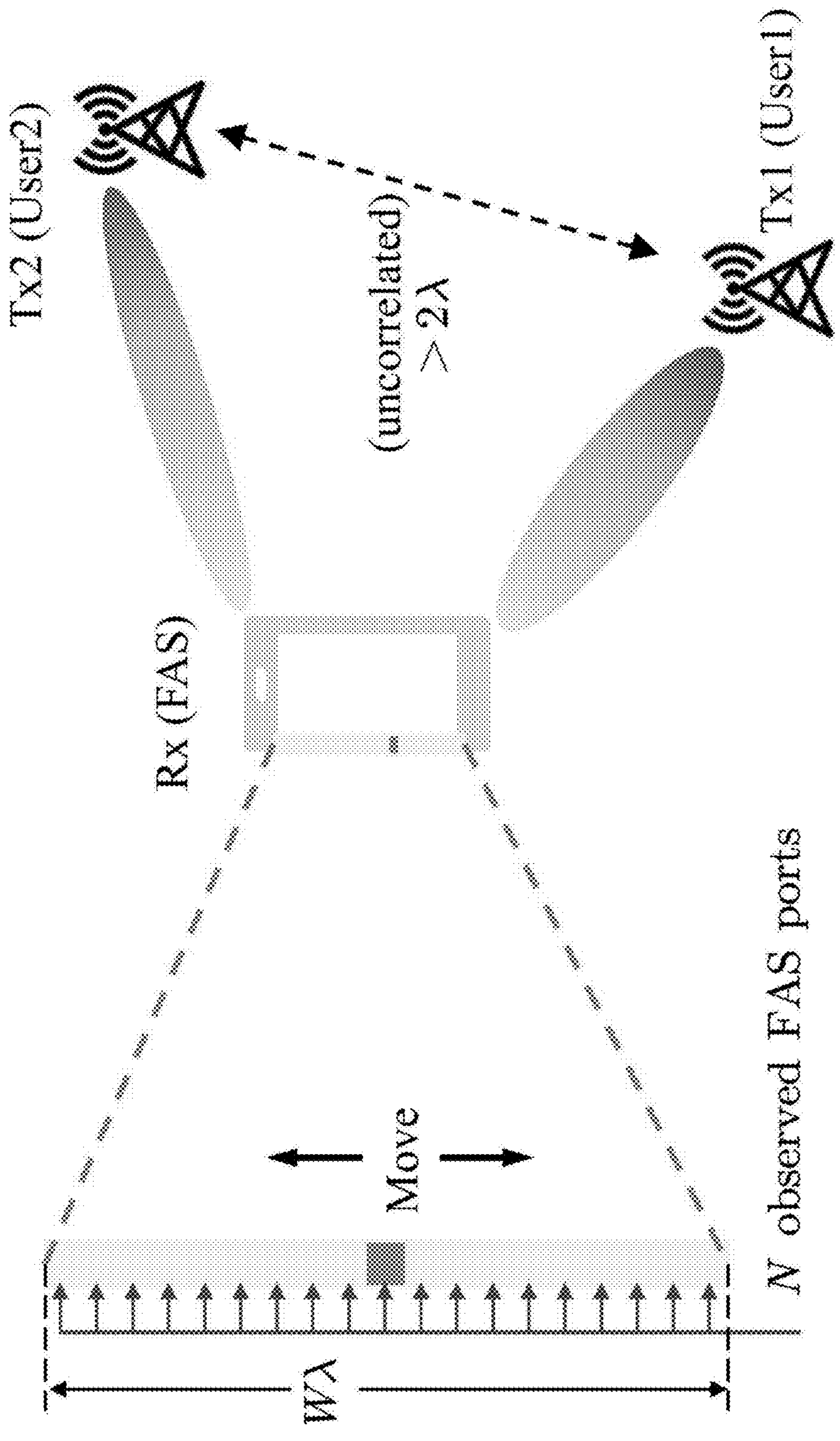
FIG. 1A illustrates a system of a typical FAS with N FAS ports across the size of Wλ according to a certain embodiment of the present disclosure.
Figure 1B:
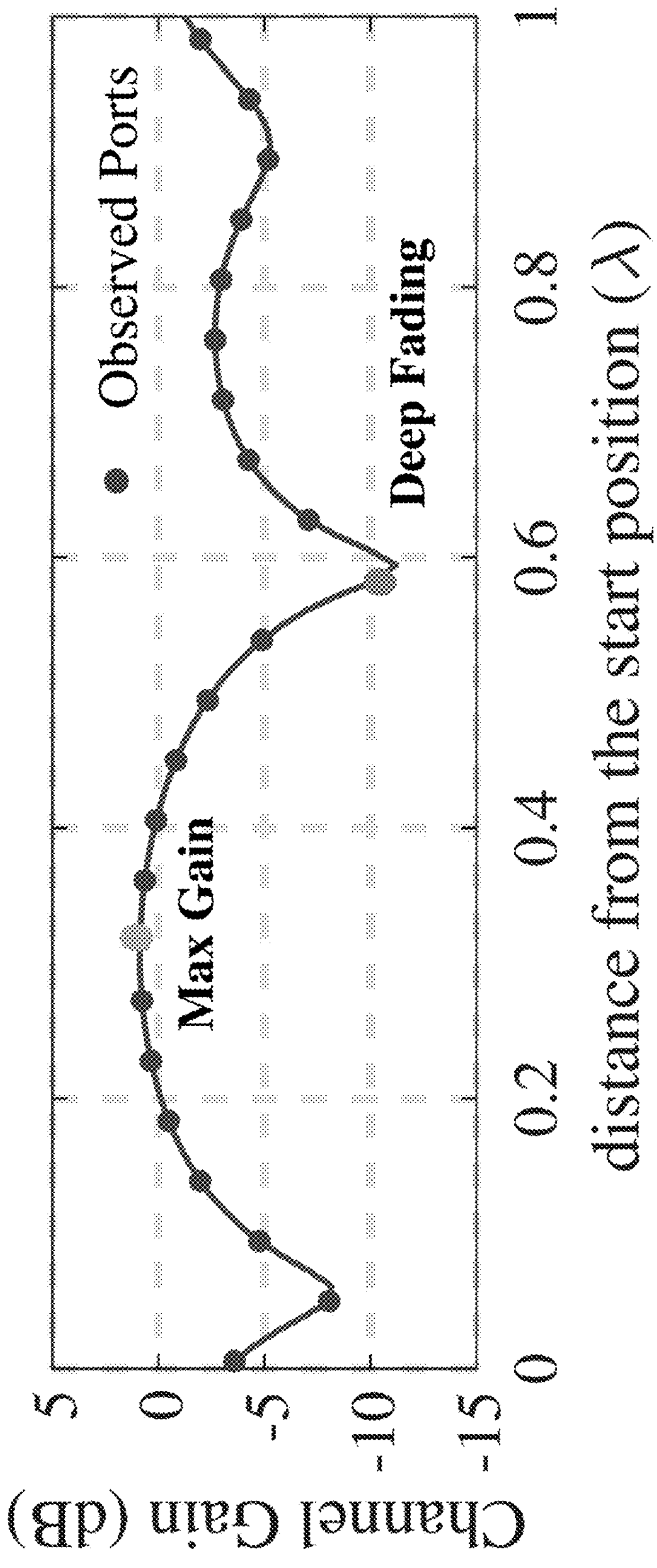
FIG. 1B illustrates channel gain at different FAS ports according to the system of FIG. 1A.

FAS, in its most straightforward form, can be thought of as a single antenna element that can physically move, or reconfigure, among N predefined port locations, known as FAS ports. The term "the FAS ports" here is only for the convenience of description to distinguish them from other ports in the specification. In fact, the FAS ports in the present disclosure show certain FAS performance, but they are neither confined to FAS systems nor specified as FAS-exclusive in their implementation. These ports are uniformly distributed across a certain linear length of W$\lambda$, where $\lambda$ is wavelength and W is the number of the wavelengths. A systems impression of its implementation [8], [9] is shown in FIG. 1A. At any instant in time, only one of the FAS ports can be accessed. In a rich scattering environment, the channel gain at each FAS port is expected to adhere to a Rayleigh distribution, exhibiting spatial correlation. Because the ratio N/W is >>1, the ports of the FAS can finely sample the Rayleigh fading spatial signal, as shown by the solid dots in FIG. 1B. In a preferred embodiment, N/W>10. Due to the fine spatial sampling, spatial channel correlation between adjacent ports of the FAS ports is evident. It is this channel correlation feature that a FAS exploits to enhance wireless communication performance.

Figure 1C:
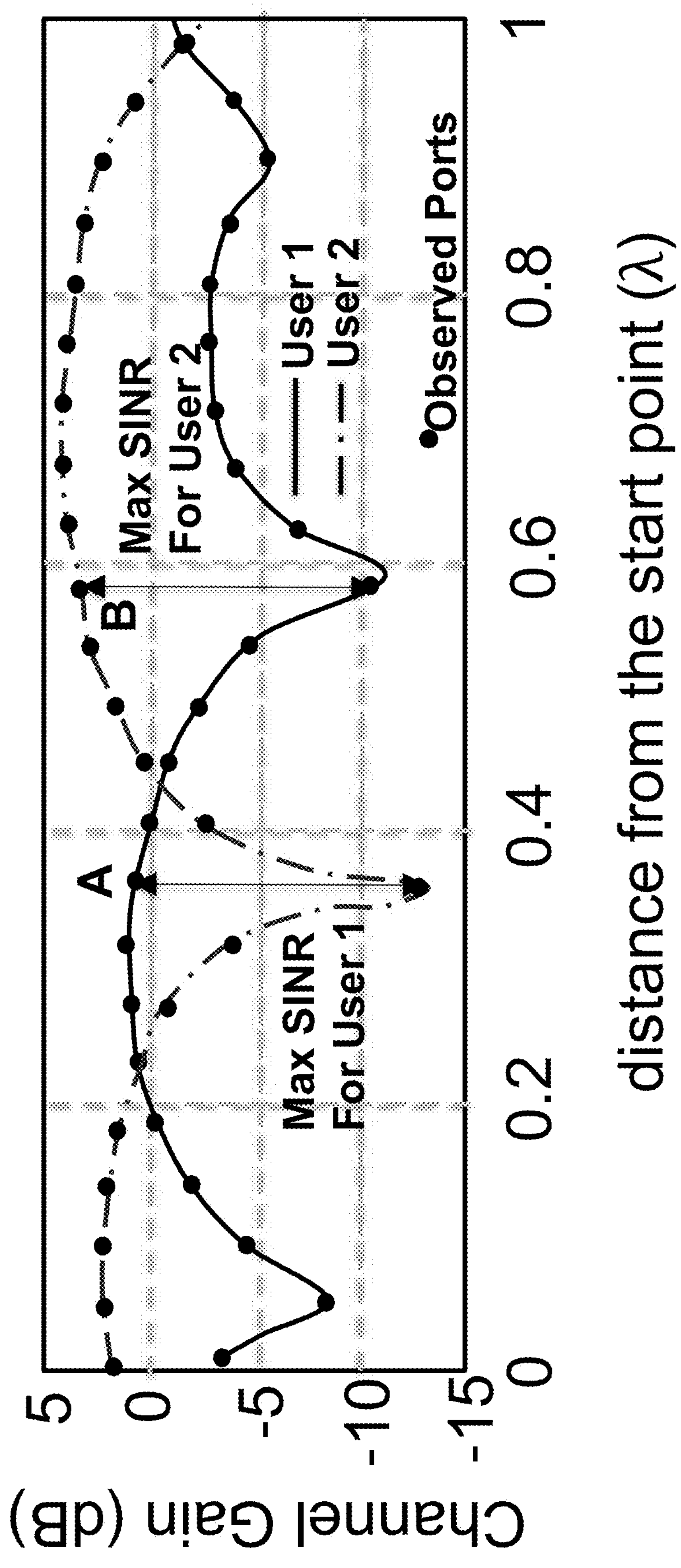
FIG. 1C illustrates channel gain at different FAS ports with two base stations according to the system of FIG. 1A.

One example of how fine spatial sampling of the channel can be exploited is shown in FIG. 1C, under a multi-user rich scattering environment in which signals from two base stations are received by the FAS [11]. Since the base stations are far apart, the signal fading seen at the FAS will be different for each base station. Therefore, the FAS can select the spatial port where the signal from the desired base station is high and the signal from the interfering one is low, as shown by point A in FIG. 1C. That is, by finely selecting the FAS port position, the signal-to-interference ratio (SIR) can be significantly increased to enhance the communication performance. More generally, it has been shown that using a FAS for multiple access, known as Fluid Antenna Multiple Access (FAMA), can approach near optimal performance for two users [12], [13]. Furthermore, FAMA can be utilized in conjunction with other communication technologies, including millimeter-wave (mmW) communication, RIS, MIMO, and non-orthogonal multiple access (NOMA) [9], [14], [15], [16], [17], [18]. FAMA is just one possible example of how a FAS may be utilized and there are other scenarios also under investigation.

A. Theory of PRA-FAS Design

A.1 Statistical Model of Typical FAS

To begin with, the statistical model of a typical wireless environment is introduced, defined as a rich scattering environment, where there is no dominant line-of-sight (LoS) component [31], [32]. As given in FIG. 1A, the FAS antenna consists of a single movable or shape-able radiator capable of switching between N FAS ports (also named N PRA-FAS ports, N PRA-FAS states, or N states in the specification) uniformly distributed along a linear length of Wλ. The case with a single RF chain is considered, where only one port at a time can be activated due to the necessary physical movement of the radiator element.

To analyze the FAS antenna, the open-circuit voltage received at the n-th FAS receiver port is denoted as $g_n$, which follows a circularly symmetric complex Gaussian distribution with zero mean and variance $\sigma^2$, because the channel conforms to Rayleigh fading in the rich scattering environment. The received open-circuit voltages of all N ports are written as a vector $g=[g_1, g_2, \ldots, g_N]^T$.

To characterize the fine spatial sampling in a FAS, it is necessary to obtain a statistical relation between the $g_n$. As such a FAS channel model describing the correlation relationship between the various ports in a FAS has been proposed [33]. This is performed by adopting a spatial covariance matrix $\varrho$, where each entry quantifies the correlation between a pair of ports. For instance, $[\varrho]_{i,j}$, denoted as $\rho_{i,j}$, represents the correlation between the i-th and j-th ports, and it is typically specified as $$\rho_{i,j} = \frac{\mathrm{Cov}(g_i, g_j)}{\sigma^2} = J_0\left(\frac{2\pi|i-j|W}{N-1}\right), \tag{1}$$

where $J_0$ is the Bessel function of the first kind, order zero, and Cov(•, •) is the covariance between two quantities. It can be seen as following Clarke's model for mobile radio propagation [31].

A.2 From Conventional FAS to "Fluid" Radiation Patterns

Conventional FAS that rely on physical movement are limited by slow port switching speed for use in wireless communication. To address this issue, the physical model of FAS needs to be revisited to establish a physical model that can connect the correlation of the antenna's reconfigurable radiation patterns with the spatial correlation of physical displacement. This relation will then guide the design of new FAS capable of faster switching speeds.

To relate the requirement stipulated in equation (1) to radiation patterns, it is necessary to define the electromagnetic environment. Let the incident radiation at the FAS be written as $$h(\Omega) = h_\theta(\Omega)\hat{\theta} + h_\phi(\Omega)\hat{\phi} = [h_\theta(\Omega), h_\phi(\Omega)]^T, \tag{2}$$

where $\Omega=(\theta, \phi)$. The corresponding polarization matrix is then written as [32], [34].

$$\Gamma(\Omega, \Omega') = \begin{bmatrix} \Gamma_{\theta,\theta}(\Omega, \Omega'), & \Gamma_{\theta,\phi}(\Omega, \Omega') \\ \Gamma_{\phi,\theta}(\Omega, \Omega'), & \Gamma_{\phi,\phi}(\Omega, \Omega') \end{bmatrix} \in \mathbb{C}^{2\times 2}, \tag{3}$$

where $\Gamma_{\theta,\phi}(\Omega, \Omega')=\varepsilon[h_\theta(\Omega)h^*_\theta(\Omega')]$, and similarly for $\sigma_{\theta,\theta}(\Omega, \Omega')$, $\Gamma_{\phi,\theta}(\Omega, \Omega')$ and $\Gamma_{\phi,\phi}(\Omega, \Omega')$.

In rich scattering scenarios, the incident radiation is modelled with both polarization components uncorrelated and equal in power, so that $\Gamma_{\phi,\phi}=\Gamma_{\theta,\theta}$, and $\Gamma_{\phi,\theta}$ and $\Gamma_{\theta,\phi}$ are zero. $\Gamma(\Omega, \Omega')$ is a diagonal matrix. In addition, it is assumed that the spatial components are also uncorrelated and write the resulting polarization matrix as $$\Gamma(\Omega, \Omega') = S(\Omega)U_2\delta(\Omega - \Omega'), \tag{4}$$

where $S(\Omega)$ is known as the power angular spectrum (PAS).

By using (4), a statistical relation between $g_n$ at different ports is obtained. In the presence of the rich scattering scenario, the correlation coefficient for the open circuit voltage of the i-th and j-th ports, $g_i$ and $g_j$ can be written as $$\rho_{i,j} = \frac{\varepsilon[g_i g_j^*]}{\sqrt{\varepsilon[g_i g_i^*]\varepsilon[g_j g_j^*]}}, \tag{5}$$

where it is assumed the expected values $\varepsilon[g_n]$ are all zero. The voltages at the ports can be expressed in terms of the incident radiation and the FAS pattern of the n-th port as [32], [34]

$$g_n = a\int\int_\Omega e_n(\Omega)\cdot h_n(\Omega)\,d\Omega, \tag{6}$$

where $e_n(\Omega)=[e_{\theta,n}(\Omega), e_{\phi,n}(\Omega)]^T=e_{\theta,n}(\Omega)\hat{\theta}+e_{\phi,n}(\Omega)\hat{\phi}$ is the FAS radiation pattern of the n-th port. The proportionality constant a is given in [34], [35] but is not required as it will be cancelled later. Using (5) and (6), the expression for correlation can be written as $$\rho_{i,j} = \varepsilon\left[\int\int_{\Omega_i} e_i(\Omega_i)\cdot h_i(\Omega_i)d\Omega_i \int\int_{\Omega_j} h_j^*(\Omega_j)\cdot e_j^*(\Omega_j)d\Omega_j\right], \tag{7}$$

where the denominator terms in equation (5) have not been included for expediency. Imposing the rich scattering scenario [31], [32], using equation (4) and interchanging the order of integration and expectation, the final expression for correlation between ports is shown as $$\rho_{i,j} = \frac{\int\int e_i(\Omega)\cdot e_j^*(\Omega)S(\Omega)d\Omega}{\sqrt{\int\int e_i(\Omega)\cdot e_i^*(\Omega)S(\Omega)d\Omega\int\int e_j(\Omega)\cdot e_j^*(\Omega)S(\Omega)d\Omega}}. \tag{8}$$

Equation (8) implies that the correlation characteristics between two FAS ports only depend on the patterns of the antennas and the scattering environment through its PAS. It also suggests another interpretation of FAS that can capture the definition of the shape and position flexible antennas, i.e., the fluid antenna in a FAS can be thought of as equivalent to "fluid" radiation patterns. This serves as the theoretical foundation for the second condition to be discussed in the subsequent sections. In particular, the radiation patterns of the different FAS ports are transformed or configured from one to another to meet the required FAS port correlation relationship, for example, that given in equation (1).

To provide an example of the equivalence between shape and position flexible antennas to antennas with "fluid" radiation patterns, the canonical example of two vertically polarized dipoles where incident radiation is restricted to the 2-dimensional (2D) plane can be analyzed so that $S(\Omega)=\delta(\theta)$. It is assumed that all the ports of the FAS act as vertically polarized dipoles that are separated by distance $$d_{i,j} = \frac{|i-j|W}{N-1}$$

in the horizontal plane. If the pattern of the i-th port is defined as $e_i(\Omega)=E(\theta)\hat{\theta}$ then that of the j-th port can be obtained by phase translations as $e_j(\Omega)=E(\theta)e^{jkd_{i,j}\cos\phi}\hat{\theta}$. Using (8), the correlation can be obtained as $$\rho_{i,j} = \int\int E(\theta)E^*(\theta)e^{-jkd_{i,j}\cos\phi}\delta(\theta)d\Omega = J_0\left(\frac{2\pi|i-j|W}{N-1}\right), \quad (9)$$

where the denominator terms from (8) in the first line are not included for expediency. As can be observed, the exact same result as in (1) is obtained, showing that changing the FAS radiation pattern can achieve the same results as moving the dipole antenna in the rich scattering environment.

Equation (8) and the example (9), show that the patterns can be utilized to obtain port correlations and these depend on the particular scattering environment of PAS that is utilized. More generally, equation (8) is valid for FAS ports with arbitrary radiation patterns. In conclusion, the development of PRA-FAS with a sufficient number of states, where each state's radiation pattern adheres to the specific correlation relation (5), can effectively meet the requirements of FAS.

A.3 PRA-FAS Design Objective

Using equation (8) and the example (9), the general design objective of PRA-FAS can now be defined. The objective is to design a FAS with N reconfigurable states such that the elements of equation (8) are the same as specified by the required FAS covariance equation (1) for a given W. A subtlety of the design objective is that the selection of the states must also be ordered appropriately to meet equation (1). Furthermore, the state switching of the system must be electronically controlled to achieve the necessary packet-level switching speed required for high-performance FASs.

The above correlation requirement is disclosed herein. It should be noted that other correlation functions also fall within the scope of the present disclosure. In a certain embodiment, the objective is to meet the conditions imposed by equation (1). It is also worth noting that a significant advantage of the proposed design approach is that it is general and can potentially match any required FAS covariance.

In a certain embodiment, the specific objective is to design a PRA-FAS with N=12 and W=½. This implies that it is necessary to design an PRA-FAS with N=12 radiation patterns that fulfill the conditions imposed by equation (1) with W=½ using equation (8). The detailed implementations are discussed in the following sections.

B. Proposed PRA-FAS Geometry and Model

Figure 2:
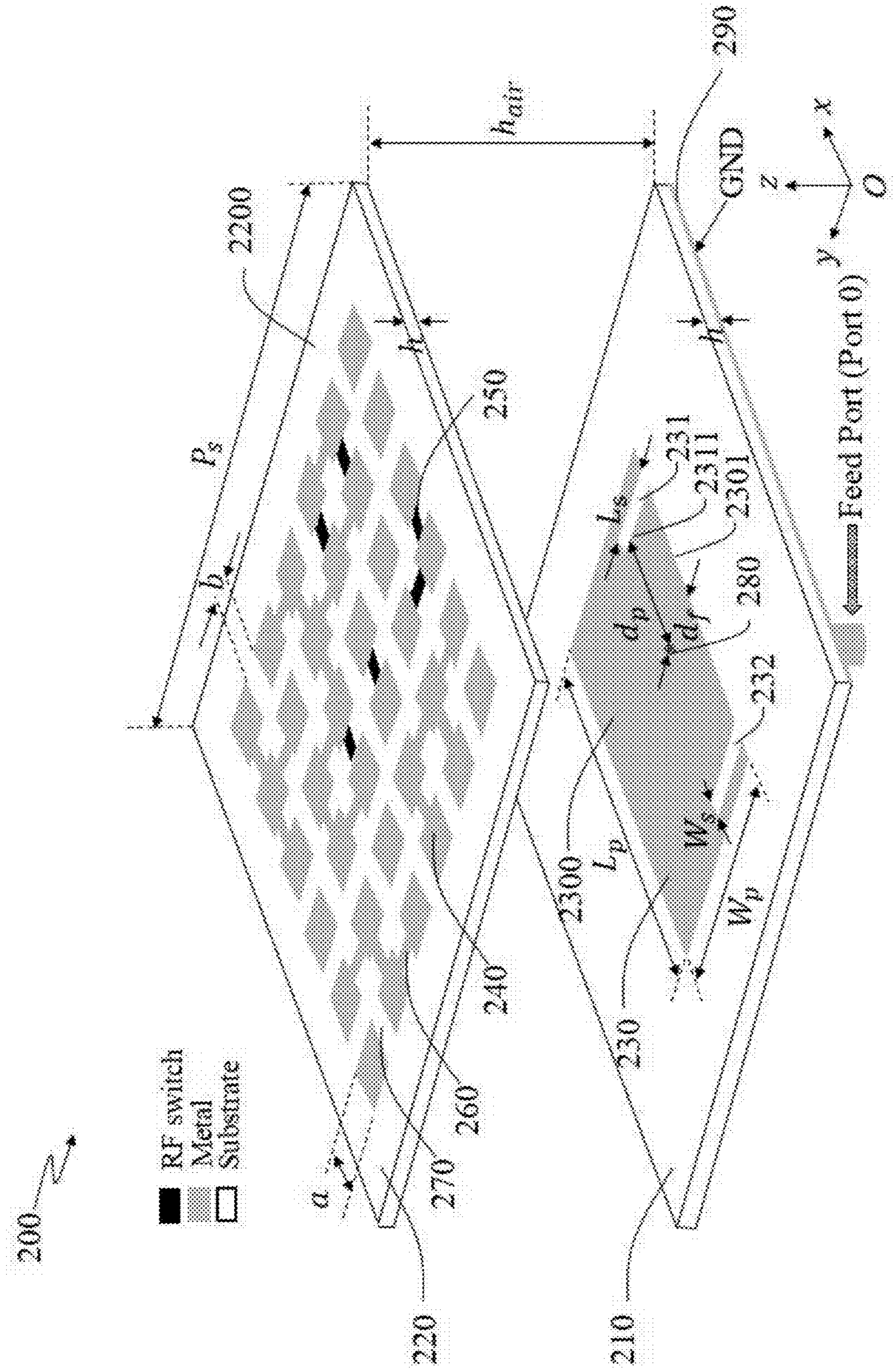
FIG. 2 illustrates configuration of a PRA-FAS according to a certain embodiment of the present disclosure.

To meet the design objective, the proposed PRA-FAS geometry 200 is shown in FIG. 2. The PRA-FAS geometry 200 comprises two layers of dielectric substrates: a lower substrate 210 and an upper substrate 220 disposed above the lower substrate 210. In a certain embodiment, both the upper and lower substrates 210, 220 consist of Rogers 4003C material with permittivity of $\epsilon_r=3.55$ and a loss tangent of $\tan\delta_d=0.0027$. In a preferred embodiment, the lower substrate 210 and the upper substrate 220 are $P_s\times P_s\times h$ square prisms with a side length $P_s=80$ mm and a height h=1.524 mm. The upper substrate 220 is separated from the lower substrate 210 with a spacing of $h_{air}=12$ mm. Those skilled in the art will appreciate that the dimensions and shapes in the specification are illustrative rather than restrictive. A ground plane 290 cover nearly an entire bottom surface of the lower substrate 210. A patch antenna 230 is attached to a top surface of the lower substrate 210. The patch antenna 230, as a radiation source of the PRA, is configured to be fed from the back side of the ground plane 290 through the signal feed probe 280. The signal feed probe 280 is represented in grid lines in FIG. 2.

Probe feeding is a common excitation method in antenna engineering where a conductive probe (typically the inner conductor of a coaxial cable) delivers RF signals from a ground plane 290 to a radiating element, such as a patch antenna. The RF signal travels through the coaxial cable and its inner conductor (the probe) couples the energy to the patch. The probe typically passes through a hole in the ground plane, but it remains electrically isolated from the ground to avoid short-circuiting the signal.

In a certain embodiment, the patch antenna 230 is shaped in an E-slot patch 2300. From a top view, a first slot 231 and a second slot 232 respectively extend inward from a long edge 2301 of the rectangular radiation surface of the E-slot patch 2300, along a direction parallel to the short edges of the rectangular radiation surface. The rectangular radiation surface has a length $L_p=50$ mm and a width $W_p=30.6$ mm. Each slot 231, 232 is a longitudinal rectangle having a length $L_s=12$ mm and a width $W_s=2$ mm. The signal feed probe 280 is positioned $d_p=19.4$ mm from a first long edge 2311 remote from the E-slot patch 2300's boundary of the first slot 231 and $d_f=10.7$ mm from the long edge 2301 of the E-slot patch 2300.

A pixel layer 2200 is attached to a top surface of the upper substrate 220, consisting of plural metallic pixel patches 240 printed on the pixel layer 2200. The E-slot patch 2300 acts as a radiation source for the pixel layer 2200. Different radiation characteristics can be obtained by utilizing different configurations for connections between the metallic pixel patches 240 in the pixel layer 2200. Each metallic pixel patch 240 is a square with a side length a=7 mm from the top view. The shapes of the metallic pixel patches can be extended beyond square geometries to encompass non-square configurations arranged in a periodical pattern. In a preferred embodiment, the metallic pixel patches 240 are arranged in a $N_P\times N_P$ uniform grid pattern with a constant pitch distance b=4 mm between any two adjacent metallic pixel patches 240, where $N_s=6$. Therefore, there are $Q=2\times N_s\times(N_s-1)=2\times6\times(6-1)=60$ possible positions for connections between any two adjacent metallic pixel patches 240 and this can be seen with reference to FIG. 3. The patch antenna 230 provides reference electric field, which is then radiated after being coupled to metals of the pixel layer 2200. The pixel layer 2200 is reconfigurable. Each reconfigurable state of the PRA-FAS 200 corresponds to a FAS port.

To construct the complete PRA-FAS, ideally all $Q$ connections between any two adjacent metallic pixel patches 240 should be controlled by RF switches 250, allowing up to $2^Q$ configurations (ignoring symmetries) and therefore $2^Q$ radiation patterns. However, controlling a large number of RF switches 250 would necessitate a complex DC feeding network [24], compromising the performance of the antenna in terms of efficiency [36]. To mitigate the complexity, a strategy is proposed to deploy a limited number of P($<Q$) RF switches 250 and fix the other connections between pixels with hardwires 260 or open circuits 270. In this regard, the connections between any two adjacent metallic pixel patches are configured to be hardwired, open-circuited, or implemented via RF switches 250. As indicated in FIG. 2, there are P=6 RF switches 250 between any two adjacent metallic pixel patches 240 in a preferred embodiment, where P has been selected as a good trade-off between design flexibility and complexity. More detailed discussion on how to select the switch number is interpreted in the subsequent sections. With P=6, this can provide at most $2^P$=64 radiation patterns, 12 radiation patterns of which have to be selected as the 12 FAS ports that are well matched and meet the spatial correlation requirements in equation (1).

The structure depicted in FIG. 2 is proposed for two primary reasons. Firstly, the PRA-FAS can typically ensure good matching for various configurations of the pixel layer 2200. Equation (8) can be used to select radiation patterns that fulfil the correlation criteria specified in equation (1). Secondly, since the size of a single metallic pixel patch 240 is only about one tenth of the wavelength λ, the radiation pattern's similarity can be manipulated by controlling the shape and quantity of connections comprising RF switches 250, hardwires 260, and open circuits 270, thereby allowing to manage the correlation coefficient. If the connected metallic pixel patches 240 (pixel pattern) in two states are similar in shape and only slightly differ in number, they can achieve high correlation, making them suitable for adjacent FAS patterns, as exemplified by $\rho_{1,2}\approx 1$. On the contrary, a significant difference in pixel patterns can achieve the low correlation required for FAS patterns that are spatially distant, as indicated by a correlation coefficient approaching zero ($\rho_{1,N}\approx 0$).

To obtain the configuration of the PRA-FAS with P RF switches 250 and ($Q$−P) fixed potential connections comprising hardwires 260 and open circuits 270, the states of the connections should be specified. As a result, a binary variable $x_q \in \{0, 1\}$ for q=1, 2, . . . , $Q$ is utilized to express whether the q-th connection is open ("0") or connected ("1"). The states of $Q$ connections can be written as a vector:

$$x = [x_1, x_2, \ldots, x_Q]. \tag{10}$$

Figure 3:
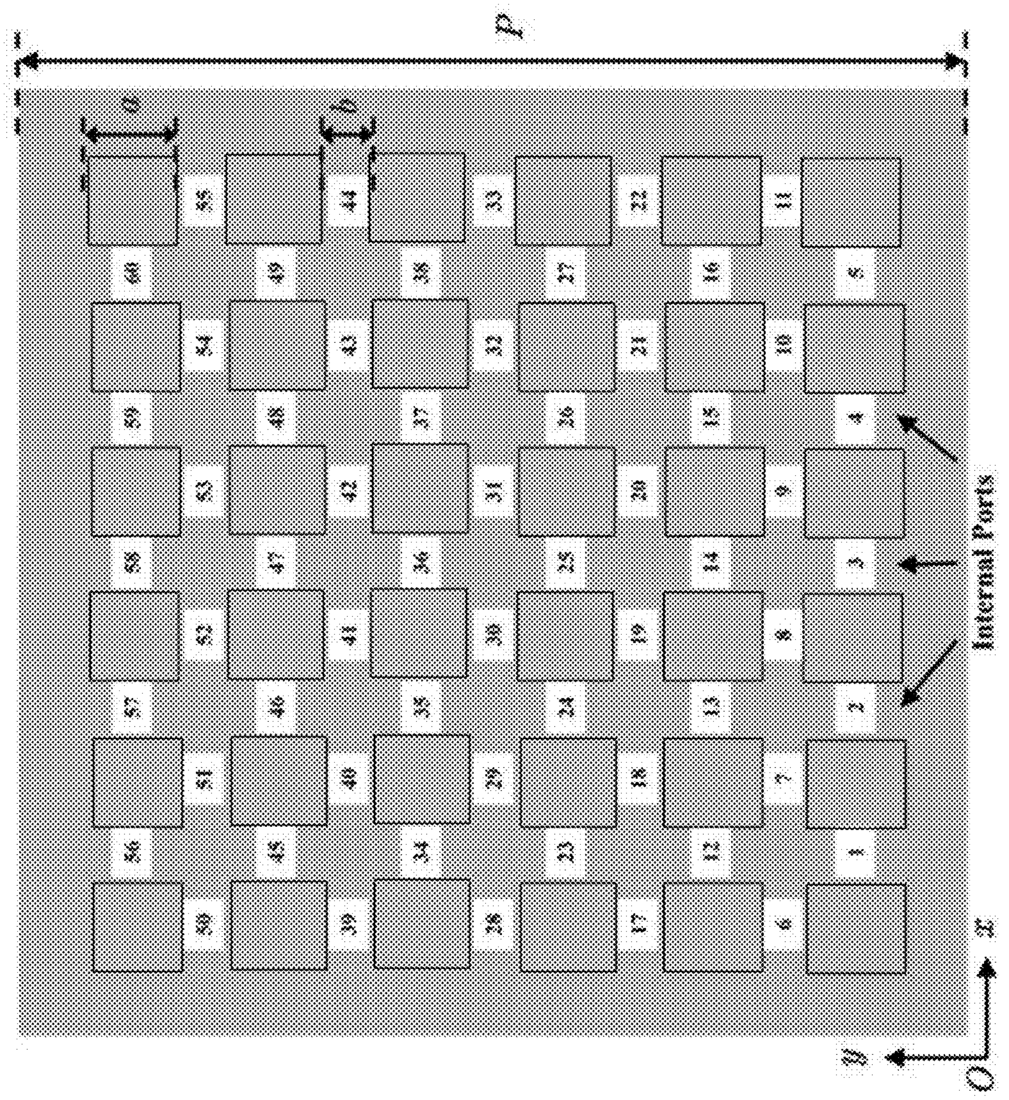
FIG. 3 illustrates configuration of the pixel layer, which includes $Q=60$ potential connections between adjacent metallic pixel patches according to the configuration of FIG. 2.

Because the connections between any two metallic pixel patches 240 can be either switches (via 250) or fixed (via 260 or 270), it is also necessary to differentiate them in equation (10). This is required later because the impedance of the switches is different from the hardwires. The most direct way to perform this is to specify which connections are RF switches 250. This can be performed by specifying a set with the connection numbers of those with RF switches 250. For P RF switches 250, these positions can be given by P connection numbers and specified by the set S as $$S = \{q_1, q_2, \ldots, q_P\}, \text{ for } P < Q, \tag{11}$$

where the elements $q_1$ to $q_P$ indicate the connection numbers with RF switches 250. That is, $q_1$ to $q_P$ specify ordinal indices in the vector x of selected positions for the P RF switches 250 among the $Q$ connections. The $Q$ connections are also defined as $Q$ internal ports as shown in FIG. 3, and the $Q$ internal ports will be discussed later. The vectors x and the set S then completely specify the configuration of the pixel layer 2200 in the PRA-FAS.

Figure 4:
FIG. 4 illustrates the equivalent circuit model of the RF switch MA4AGP907.

The state of the connections between any two adjacent metallic pixel patches 240 in the PRA-FAS can also be expressed using an impedance matrix. For a particular x and S, the diagonal $Q\times Q$ impedance matrix $$Z^L = \mathrm{diag}(Z_1^L, Z_2^L, \ldots, Z_Q^L)$$

is used to represent the connections. The off-diagonal elements are all zero because there are only connections between two adjacent metallic pixel patches 240. For those connections with $q\notin S$ (that is short by hardwires 260 or open circuits 270), the impedance matrix element $$Z_q^L$$

is strightforwardly set to zero or ∞ depending on whether $x_q$ is 1 or 0, respectively. For the six connections with RF switches 250, as specified by S, the on and off impedance of the RF switches 250 needs to be used. In a preferred embodiment, the RF PIN diode MA4AGP907 [37] is used. The equivalent circuit models thereof for the on and off states are given in FIG. 4. Therefore, for those connections $q\in S$, the element $$Z_q^L$$

is set to be either the "on" or "off" impedance shown in FIG. 4, specified by whether the corresponding element $x_q$ is 1 or 0, respectively.

Figure 5:
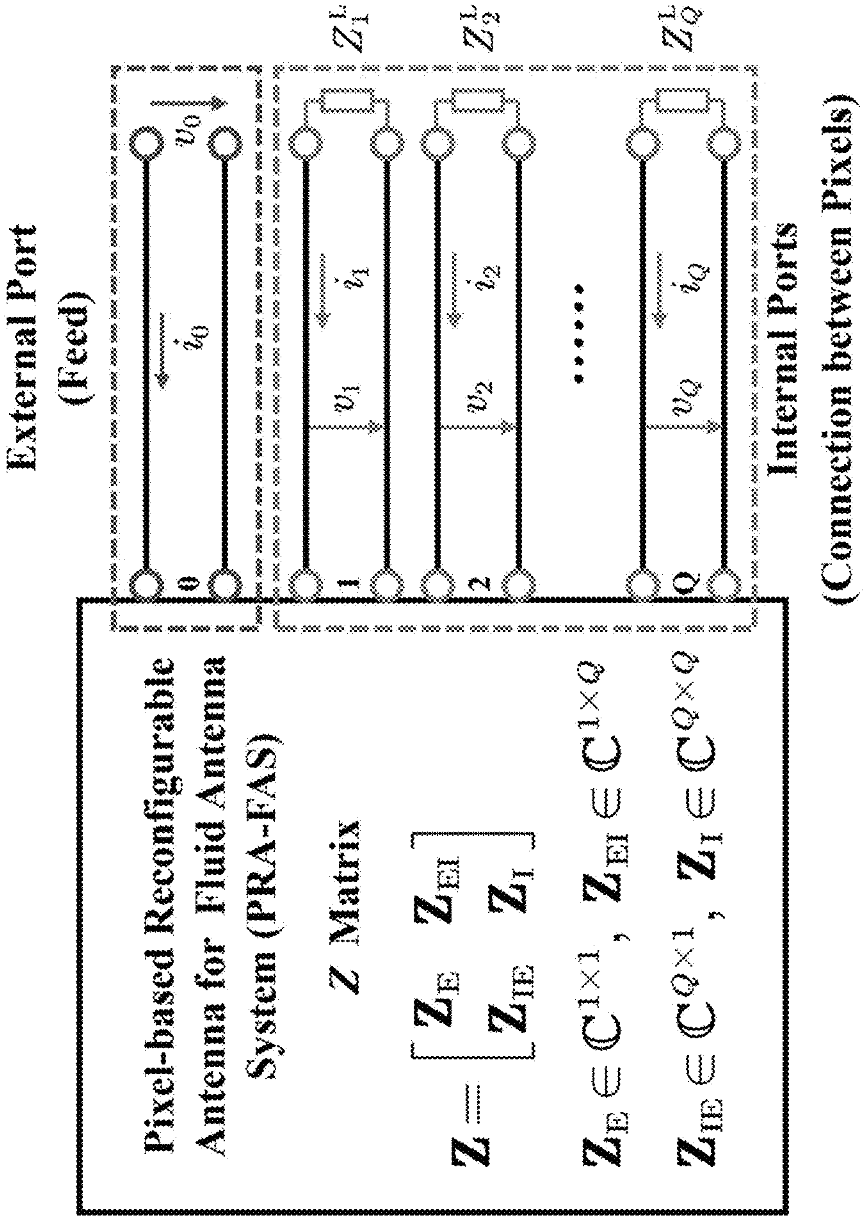
FIG. 5 illustrates the equivalent circuit model for the PRA-FAS with a single external feed port and $Q$ internal ports according to a certain embodiment of the present disclosure.

With the impedance of the connections between any two adjacent metallic pixel patches 240 specified, a circuit model for the PRA-FAS can be provided as shown in FIG. 5. The technique that utilizes this model has been previously termed the internal multi-port method (IMPM) [30]. In IMPM, the PRA-FAS using ($Q$+1) ports made up of $Q$ internal ports (representing the $Q$ load impedance connections) and one external port (the single external feed port) can be represented. The model is accurate as long as the coupling between the loads is negligible, which is usually valid [30]. These ports are numbered with q=0, 1, 2, . . . , $Q$ (where 0 is the single external feed port and 1 to $Q$ are the internal ports). The voltage across the q-th port is denoted as $v_q$ and it has been associated with its current $i_q$. All $v_q$ and $i_q$ are grouped into vectors as $$v = [v_0, v_1, v_2, \ldots, v_Q]^T,$$

$$i=[i_0, i_1, i_2, \ldots, i_Q]^T, \tag{12}$$

where $v_0$, $i_0$ are the voltage and the current of the single external feed port (port 0), and $v^I=[v_1, v_2, \ldots, v_Q]^T$, $i^I=[i_1, i_2, \ldots, i_Q]^T$ are defined as the voltage and current vector of the $Q$ internal ports, respectively.

The impedance of the single external feed port and internal ports is denoted by Z, a $(Q+1)\times(Q+1)$ matrix so that these voltages and currents have the following relationship $$v=\begin{bmatrix} v_0 \\ v^I \end{bmatrix}=Zi=\begin{bmatrix} Z_E & Z_{EI} \\ Z_{IE} & Z_I \end{bmatrix}\begin{bmatrix} i_0 \\ i^I \end{bmatrix}, \tag{13}$$

where $Z_E \in \mathbb{C}^{1\times 1}$, $Z_{EI} \in \mathbb{C}^{1\times Q}$, $Z_{IE} \in \mathbb{C}^{Q\times 1}$ and $Z_I \in \mathbb{C}^{Q\times Q}$ are four sub-matrixes of the $(Q+1)\times(Q+1)$ impedance matrix Z shown in FIG. 5. Specifically, the impedance matrix Z can be represented by $$Z=\begin{bmatrix} Z_E & Z_{EI} \\ Z_{IE} & Z_I \end{bmatrix}=\begin{bmatrix} z_{0,0}(f) & z_{0,1}(f) & \ldots & z_{0,Q}(f) \\ z_{1,0}(f) & z_{1,1}(f) & \ldots & z_{1,Q}(f) \\ \vdots & \vdots & \ddots & \vdots \\ z_{Q,0}(f) & z_{Q,1}(f) & \ldots & z_{Q,Q}(f) \end{bmatrix},$$

where $Z_{i,j}(f)$ denotes each element of the $(Q+1)\times(Q+1)$ impedance matrix Z, and f is frequency. The voltage and current on the q-th internal port can be derived using the corresponding load impedance as $$v_q=-Z_q^L i_q.$$

As a result, the voltages and currents on all internal ports can be expressed as $$v^I=-Z^L i^I. \tag{14}$$

With a given connection vector x and set S, the input impedance of the PRA-FAS can be calculated as $$Z_{in}(x, S)=Z_E-Z_{EI}\left[Z_I+Z^L(x, S)\right]^{-1}Z_{IE}, \tag{15}$$

where $Z^L(x, S)$ is the corresponding diagonal matrix, indicating the impedance terminated at all internal ports, either short (via hardwires 260), open (via open circuits 270), or switched (via RF switches 250) in on/off states under a certain configuration.

The subsequent radiation pattern of the PRA-FAS can also be found straightforwardly. With the port current vector, the open-circuit radiation pattern induced by the currents at each port can be summed together to obtain the total radiation pattern. Assuming that among the N operating states in the PRA-FAS, the n-th radication pattern, $e_n(\Omega)$ excited by the n-th current vector, $i_n$ is $$e_n(\Omega)=\sum_{q=0}^{Q}[i_n]_q e_q^{oc}(\Omega)=E_{OC}i_n, \tag{16}$$

where $$e_q^{oc}(\Omega)=\left[e_{\theta,q}^{oc}(\Omega), e_{\phi,q}^{oc}(\Omega)\right]^T$$

is the open-circuit radiation pattern excited by a unit current at the q-th port when all other ports are open, and an open-circuit radiation pattern matrix $$E_{OC}=\left[e_0^{oc}, e_1^{oc}, e_2^{oc}, \ldots, e_Q^{oc}\right]$$

denotes the combination of $$e_q^{oc}$$

for q=0, 1, 2, . . . , $Q$. The current vector $i_n$ can be obtained using $$i_n=\begin{bmatrix} i_n^E \\ i_n^I \end{bmatrix}=\frac{1}{\sqrt{Z_{in}(x, S)}}\begin{bmatrix} 1 \\ -\left[Z_I+Z^L(x, S)\right]^{-1}Z_{IE} \end{bmatrix}. \tag{17}$$

Thus, the covariance matrix $\varrho \in \mathbb{C}^{N\times N}$ of N states can be calculated through equation (8), with the (i, j)-th entry $[\varrho]_{i,j}=\rho_{i,j}$.

With the proposed geometry and circuit model, equations (15) and (16) can be used to obtain the input impedance and radiation patterns of the PRA-FAS for a given x and set S. The next step is to find the positions of the switches S and the states of the x that best meet the PRA-FAS design objective defined at the end of Section A. This is described in the next section.

C. PRA-FAS Analysis and Design

Using the expression for impedance and radiation patterns from the previous section, the performance of the antenna for all possible states x and switch positions S needs to be analyzed to obtain those meeting the PRA-FAS design objective. However, the number of vectors x and sets S is very large. Taking the PRA-FAS model in FIG. 2 as an example, there are $2^{60}$ possible states x with $Q=60$ internal ports. Furthermore, there are $$C_6^{60}$$

possible sets S or locations for the switches if there are P=6 switches. The total number of possible configurations that need to be analyzed is therefore $$2^{60}C_6^{60},$$

i.e., there are a huge number of possible configurations. As a result, it is necessary to develop a method that can efficiently select the appropriate internal port state x and sets S.

In the present disclosure, a two-step process is performed. Specifically, a two-step search optimization algorithm is proposed to find the optimized configurations of the pixel layer 2200. In the first step, a subset of states x and sets S that provide the necessary impedance match over the specified bandwidth is found. That is, the position selections of hardwires 260, open circuits 270, and the RF switches 250 should provide the necessary impedance match over the specified bandwidth. In the second step, these are searched through to find 12 switch states to find their optimum selection and order, that can meet the proposed design objective. That is, selection and ordering of the N FAS ports from on/off state combinations of the RF switches 250 should satisfy a second condition that any two adjacent FAS ports of the N FAS ports are spatial correlated. The second condition will be satisfied when difference between a radiation pattern covariance matrix of all reconfigurable states and a target covariance matrix is minimized. Those skilled in the art will appreciate that other methods may also be considered to describe the correlation. Taking the PRA-FAS design in FIG. 2 and FIG. 3, where P=6, $\mathcal{Q}$=60, these two steps are described next.

C.1 Step 1: Selection of Matched States

For a given $x_l$ and $S_k$, the pixel surface is completely defined. However, the RF switches 250 at locations $S_k$ can be reconfigured to $2^6$ possible states, and therefore $x_l$ can be reconfigured to any one of these 26 states easily. For conveniency, a set $\mathcal{U}_{k,l}$ containing all the $2^6$ states for a given $x_l$ and $S_k$ is defined. That is, the set $\mathcal{U}_{k,l}$ contains those states $x_l$ where the elements at positions $S_k$ can take all possible values (with set size $2^6$). There are $$C_6^{60}$$

sets $\mathcal{U}_{k,l}$ for a given $x_l$, and in total there are $$2^{54}C_6^{60}$$

possible sets $\mathcal{U}_{k,l}$ across all possible states.

Not all $2^6$ states in set $\mathcal{U}_{k,l}$ will have the required impedance matching across the desired bandwidth. This is because the driven element will adversely affect matching for some pixel combinations. Therefore, in this step, the task is to select only those sets $\mathcal{U}_{k,l}$ with sufficient matched states. For $\mathcal{U}_{k,l}$ to be considered a desirable set, the number of matched states in the set should exceed N. With this consideration, $$\mathcal{U}_{k,l}^{M}$$

as the sunset or states in set $\mathcal{U}_{k,l}$ that are matched is defined. Therefore, the first condition can be expressed as $$\mathcal{U}_{k,l}^{M} = \{x_l^m \mid S_E(x_l^m, S_k) < -10\text{ dB}, x_l^m \in \mathcal{U}_{k,l}\}, \tag{18}$$

$$\text{s.t.: card}\left(\mathcal{U}_{k,l}^{M}\right) = M \geq N, \tag{19}$$

where $$S_E(x_l^m, S_k)$$

is the reflection coefficient of a state $$S_E(x_l^m, S_k) = 10\cdot lg\left|\frac{Z_{in}(x_l^m, S_k) - Z_0}{Z_{in}(x_l^m, S_k) + Z_0}\right|^2 \text{dB}, \tag{20}$$

in which $Z_0$ is the characteristic impedance.

The set $$\mathcal{U}_{k,l}^{M}$$

is then formally defined as those that meet equation (18) and constraint (19) in the remainder of the present disclosure.

The number of sets $$\mathcal{U}_{k,l}^{M}$$

could be quite large. However, it is not necessary to find all sets $$\mathcal{U}_{k,l}^{M}$$

that meet the matching requirement. Only enough sets are required that provide a sufficiently high chance that the selection and ordering objective in the second step can be met. Therefore, part of sets $$\mathcal{U}_{k,l}^{M}$$

that satisfies the first condition are selected as candidate sets for implementing the next step to reduce search space. Typically, the inventors found that only approximately 100 matched sets $$\mathcal{U}_{k,l}^{M}$$

are sufficient to be obtained to proceed to the next step. Therefore, step 1 serves the purpose of not only finding those configurations that are matched, but it is also used to reduce the search space for the next step, from $$2^{54}C_6^{60} \text{ to } 100.$$

Those skilled in the art would know that the selection of the number 100 herein is purely illustrative and should not be construed as limiting.

C.2 Step 2: Meeting the Spatial Covariance Requirement

From the matched sets $$\mathcal{U}_{k,l}^{M}$$

obtained in step 1, the best set that meets the spatial correlation objective in equation (1) for N out of its M matched states in $$\mathcal{U}_{k,l}^{M}$$

should be selected. Furthermore, this step also requires an ordering process where the N states are mapped to the FAS port number that best meets equation (1). That is, not only should N out of its M matched states in $$\mathcal{U}_{k,l}^{M}$$

be selected, but the selected N states should also be arranged in a specific sequence.

To start step 2, the correlations between the states in each set $$\mathcal{U}_{k,l}^{M}$$

need to be found. To perform this, all M radiation patterns must be obtained through equation (16) for each set $$\mathcal{U}_{k,l}^{M}.$$

This can impose a heavy burden on computation, since it will also require equation (8) to be calculated M(M−1)/2 times for each $$\mathcal{U}_{k,l}^{M}.$$

To make this process more computationally efficient, the previous work can be leveraged on a related pattern correlation decomposition method (PCDM) [38].

In PCDM, all current vectors of the M reconfigurable states can be written compactly by collecting them into a matrix as $I=[i_1, i_2, \ldots, i_M]$. Similarly, all M total radiation patterns can be compactly written as $E=[e_1, e_2, \ldots, e_M]$. The relationship between E and I is then given by $$E = E_{oc}I. \tag{21}$$

$E_{OC}$ is the open-circuit radiation pattern matrix discussed in the above sections. This allows the radiation pattern covariance matrix $\varrho$ (denoted as $\varrho_0$ for discrimination purpose) of all M PRA-FAS states to be written as $$\varrho_0 = |C \oslash G|, \tag{22}$$

where $\oslash$ is Hadamard division, and C is the absolute correlation matrix of all M matching patterns, defines as $$C = \int\int_{\Omega} E^H E S(\Omega) d\Omega = \int\int_{\Omega} I^H E_{OC}^H E_{OC} S(\Omega) I d\Omega = I^H\left(\int\int_{\Omega} E_{OC}^H E_{OC} S(\Omega) d\Omega\right) I = I^H K_{OC} I, \tag{23}$$

where $K_{OC} \in \mathbb{C}^{(Q+1)\times(Q+1)}$ is the correlation matrix of all open-circuit radiation patterns weighted by the PAS. The matrix $G \in \mathbb{C}^{M\times M}$ represents the average energy of all M patterns, which is used for normalization. The (i, j)-th entry of G is written as $$[G]_{i,j} = \sqrt{[C]_{i,i}[C]_{j,j}}. \tag{24}$$

The equations (22) to (24) provide a direct method to find the pattern correlations, while equation (16) is no longer required. This is because $K_{OC}$ only needs to be found once for the PRA-FAS. Then all the spatial correlations for all searched pixel configurations can be found using equations (22) to (24) straightforwardly, because the currents I have already been found in determining the PRA-FAS impedance using equation (17).

The next task in step 2 is the selection of N=12 states from the M available in each possible $$\mathcal{U}_{k,l}^{M}$$

so that the spatial correlation objective (1) is best met. This task is made intricate because both the selection and ordering of the states are important in meeting the spatial correlation objective (1). As such, a vector sequence $D=[d_1, d_2, \ldots, d_N]^T$ is used to capture the order and selection of N states from M. Each element in D is in the range 1 to M, and each value can only be used once. As a result, there are N!

$$C_N^M$$

combinations for the sequence of states for D. The n-th element of D acts as a map from the n-th FAS port to the PRA-FAS state $[D]_n$. It is suggested to search through all possible D to find the sequence that produces the closest match to equation (1).

Quantifying the match can be performed by defining a function as the difference between the radiation pattern covariance matrix generated by the proposed PRA-FAS design and the target covariance matrix. The target covariance matrix used here is defined as $\varrho^*$, with its (n, n')-th entry given by $$[\varrho^*]_{n,n'} = \rho_{n,n'} = J_0\left(\frac{2\pi|n-n'|W}{N-1}\right). \tag{25}$$

According to the given D, the terms in $\varrho_0$ in equation (22) are taken, to form the radiation pattern covariance matrix $\varrho \in \mathbb{C}^{N\times N}$ of N states. Since the phase of the FAS port correlation is not of interests, the absolute value of each term in the radiation pattern covariance matrix for a given port order D is used. Therefore, the total absolute error in the covariance matrix can be written as $$\Delta D = \sum_{n=1}^{N}\sum_{n'=1}^{N}\left||[\varrho(D)]_{n,n'}| - |[\varrho^*]_{n,n'}|\right|. \tag{26}$$

It is also important to explicitly include frequency so that design specification for bandwidth can also be met. Assuming the target specification is a single band with the lower limit, $f_l$, and the upper limit, $f_u$, equation (26) at T sampling frequency points, with $f_t = f_l +$ $$(t-1)\frac{f_u - f_l}{T-1} \text{ for } t = 1, 2, \ldots, T,$$

can be evaluated. Explicitly including frequency dependence in the expressions in equation (18) will acquire $$\mathcal{U}_{k,l}^{M} = \{x_l^m \mid \max[S_E(x_l^m, S_k, f_t)] < -10 \text{ dB}, x_l^m \in \mathcal{U}_{k,l}\}, \quad (27)$$

for t=1, 2, . . . , T. Correspondingly, the total absolute error (26) also becomes $$\Delta D = \sum_{t=1}^{T}\sum_{n=1}^{N}\sum_{n'=1}^{N}\left\| [\varrho(D, f_t)]_{n,n'} \right| - \left| [\varrho^*]_{n,n'} \right\|. \quad (28)$$

To qualify the match of the design results with the ideal target $\varrho^*$, the average error $\delta_e$ can be selected as the objective function. This is defined as the total absolute error divided by the number of entries in the covariance matrix, taking into account the sampling frequency points T. It is a measure of the average difference of the covariance of an element from the desired value and is always less than unity and should be as small as possible and at least less than 0.1. The resulting objective function is given by $$\delta_e(D) = \frac{\Delta(D)}{TN^2}. \quad (29)$$

The optimization objective can then be written as $$\min_{D} \delta_e(D) \quad (30)$$

$$\text{s.t.: } D \in \{1, 2, \ldots, M\}^N, \text{ with } [D]_n \neq [D]_{n'}.$$

This combinatorial optimization (30) is an $N_P$-hard problem. Therefore, a heuristic algorithm, GA [30], [39], [40] is adopted here to solve it. Detailed parameters in the use of GA are given in TABLE. 1, where the proposed approach provides computational efficiency, allowing for rapid optimization.

TABLE 1

Parameters used in GA

| Parameter | Value |
|---|---|
| Max. Generations | 200 |
| Population Size | 600 |
| Cross Probability | 0.8 (Uniformly Distributed) |
| Mutation Probability | 0.1 (Uniformly Distributed) |

Algorithm 1 Decode Algorithm for Non-Repeating Order

```
Input: B = [b_1, b_2, ... , b_N] ∈ {1, 2, . . . , M}^N
  Initialization: i = 0, H = [1, 2, . . . , M]
        D = [d_1, d_2, ... , d_N] = 0
  Define: dim(·) expresses the length of the vector.
  repeat
  i = i + 1
    Calculate j = [(b_i − 1) mod dim(H)] + 1
    Update d_i = [H]_j
    Delete [H]_j from the vector H
  until i ≥ N
Output: D = [d_1, d_2, ... , d_N], d_n ∈ {1, 2, . . . , M},
      d_n ≠ d_n' for any n ≠ n'.
```

Using GA, the optimum switch locations $S^*_k$, fixed hardwire configuration $x^*_l$ (excluding those elements in $S^*_k$ which are switches), as well as the mapping $D^*$ are all found. These can then be used to find the design of the required PRA-FAS.

When using GA to optimize the selection and ordering of states, it should be noted that the crossovers between individual chromosomes (variables) require careful consideration. This is because duplicated elements within the sequence, D cannot directly serve as the new chromosome. Here a proposed encoding method can transform a coded vector B, which may contain repeated elements, into the corresponding non-repeating vector D. The steps of the decoding process are depicted in Algorithm 1, ensuring the resulting sequence D remains valid and free from duplication.

D. Simulation and Measurement Results

In this section, simulation and measurement results for the proposed PRA-FAS design operating at the center frequency of 2.5 GHz are provided. To ensure the PRA-FAS has unidirectional radiation, the PAS was selected as $S(\Omega)$ with $S(\theta, \phi) = S_0$ for $\theta \in [0, \pi/2]$, $\phi \in [0, 2\pi)$ and $S(\theta, \phi) = 0$ otherwise. In all the simulations, CST Studio Suite [41] is used to obtain full-wave simulations of S-parameters, radiation patterns, and efficiency.

Figure 6:
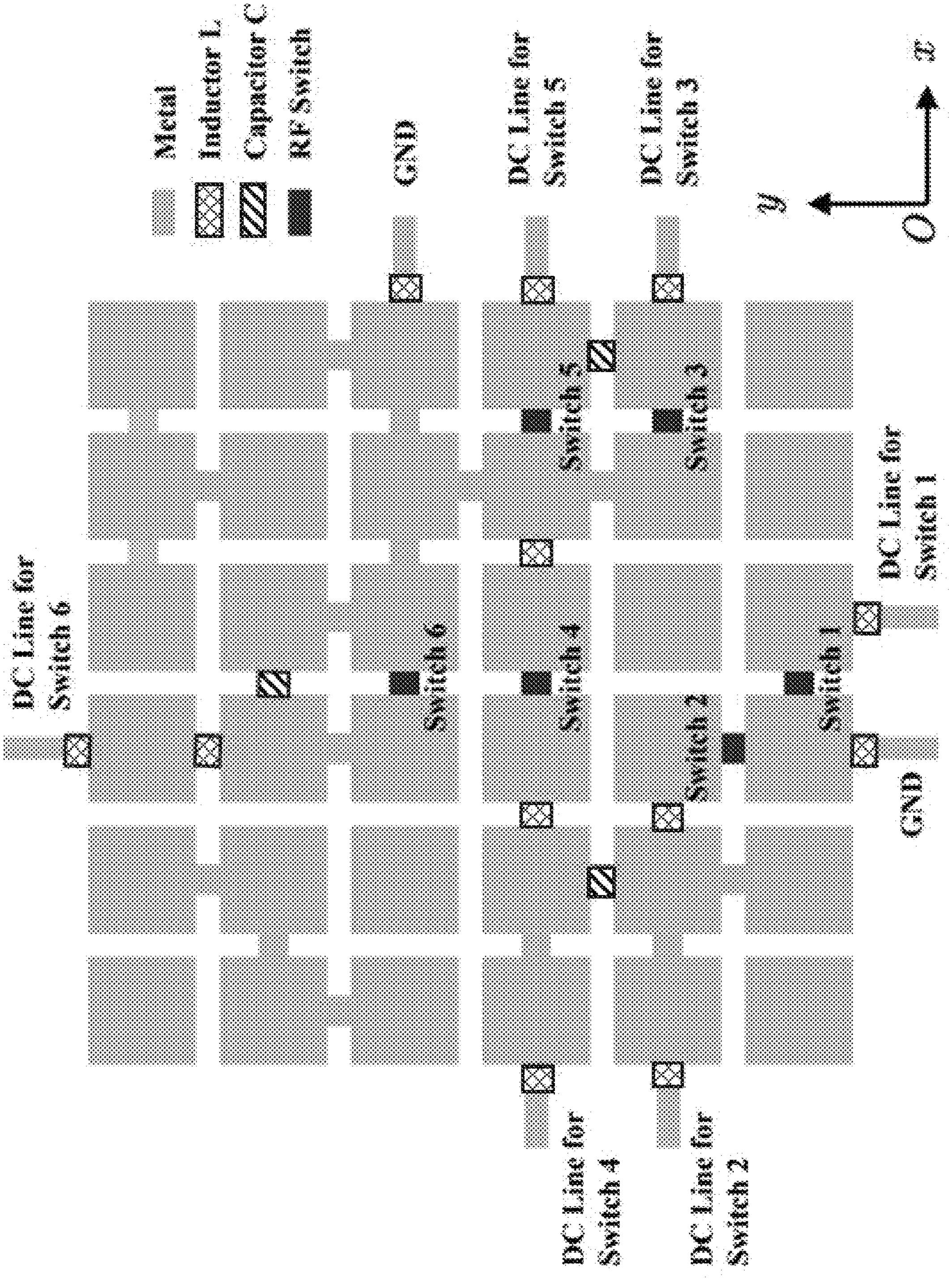
FIG. 6 illustrates optimized configuration of the PRA-FAS according to a certain embodiment of the present disclosure.

It is necessary to specify the design of the switches so that the simulations can include their effects and the PRA-FAS can be fabricated in practice. In the design examples, PIN diodes for the RF switches 250 similar to other approaches to PRA design [24], [25], [42], [43], [44] are utilized. PIN diode MA4AGP907 [37] is used and its equivalent circuit models for on and off are shown in FIG. 4. The control of the PIN diodes is performed using DC signals, and therefore isolation between the DC signals and RF signals is required. This can be provided by using auxiliary inductors and capacitors. Inductors 0402DC-R10XJRW [45] from Coilcraft serve as RF chokes, equivalent to RF open-circuit impedance connected to the internal ports. Capacitors GJM1555C1H130GB01 from Murata are utilized as both RF short for internal ports and block for DC signals. In order to control the PIN diodes without interfering with the operation of PRA-FAS, the DC control feeds are all located around the boundary of the PRA-FAS. Considering that the DC feed lines are inductively isolated from the radiating structure (pixels), and their length is much smaller than the wavelength, the DC feeds minimally affect the RF currents as well as radiation. The switch layout and the corresponding auxiliary components for the proposed PRA-FAS are shown in FIG. 6. This design and the simulation will be discussed further in the next section. The PRA-FAS in FIG. 6 consists of the positions of 6 RF switches and shorted internal ports connected by hardwires. Unconnected pixels in the corners cannot be removed, since they form Z together with other pixels and they are also part of the optimization process. The measurement results follow that along with system evaluation.

D.1 Simulation Results of the PRA-FAS

In the first simulation, results for the reference PRA-FAS design as given in FIG. 2 are provided, where operation at the center frequency of 2.5 GHz is targeted. T=1 is set to illuminate the basic design process without the complication of bandwidth optimization. Following the PRA-FAS design process described in the previous sections, a PRA-FAS design is obtained where the optimum switch locations $S^*_k$, fixed hardwire configuration $x^*_l$ (excluding those elements at $S^*_k$ which are switches), as well as the corresponding mapping D* are all found. The resulting design is shown in FIG. 6, where the detailed structure and positions of the RF switches, hardwires, open circuits, as well as DC control lines for RF switches, inductors (equivalent to RF open circuits) and capacitors (equivalent to RF short or hardwires) that have been devised can be seen.

With reference to the internal port numbering illustrated in FIG. 3, the 6 RF switches are positioned at internal port Nos. 3, 8, 16, 25, 27 and 36. The hardwires are positioned at internal port Nos. 7, 12, 21, 23, 32, 37-39, 41, 42, 44, 45, 51, 54, 59 and 60. The open circuits are positioned at internal port Nos. 1, 2, 4-6, 9-11, 14, 15, 17, 19, 20, 28-31, 33-35, 40, 43, 46, 48-50, 53 and 55-58. The capacitors (equivalent to hardwires) are positioned at internal port Nos. 18, 22 and 47. The inductors (equivalent to open circuits) are positioned at internal port Nos. 13, 24, 26 and 52, at feed points of all DC control lines for 6 RF switches, and at feed point of GND. The DC control lines for 6 RF switches are all arranged around the boundary of the PRA-FAS.

The states of each switch corresponding to the 12 states of the PRA-FAS arranged in order is shown in TABLE. 2.

TABLE 2

Parameters used in GA

| | Switch No. (in FIG. 6) | | | | | |
|---|---|---|---|---|---|---|
| | 1 | 2 | 3 | 4 | 5 | 6 |
| | Switch Positions ($S_k$*) | | | | | |
| | 3 | 8 | 16 | 25 | 27 | 36 |
| State 1 | on | on | off | off | off | off |
| State 2 | on | on | off | off | on | off |
| State 3 | on | on | on | off | on | off |
| State 4 | off | off | off | off | on | off |
| State 5 | off | on | on | off | on | off |
| State 6 | off | on | off | on | on | off |
| State 7 | off | on | on | on | on | off |
| State 8 | off | off | on | on | on | on |
| State 9 | off | on | on | on | on | on |
| State 10 | off | on | on | on | off | on |
| State 11 | off | on | on | off | off | on |
| State 12 | off | off | on | off | off | on |

Figure 7:
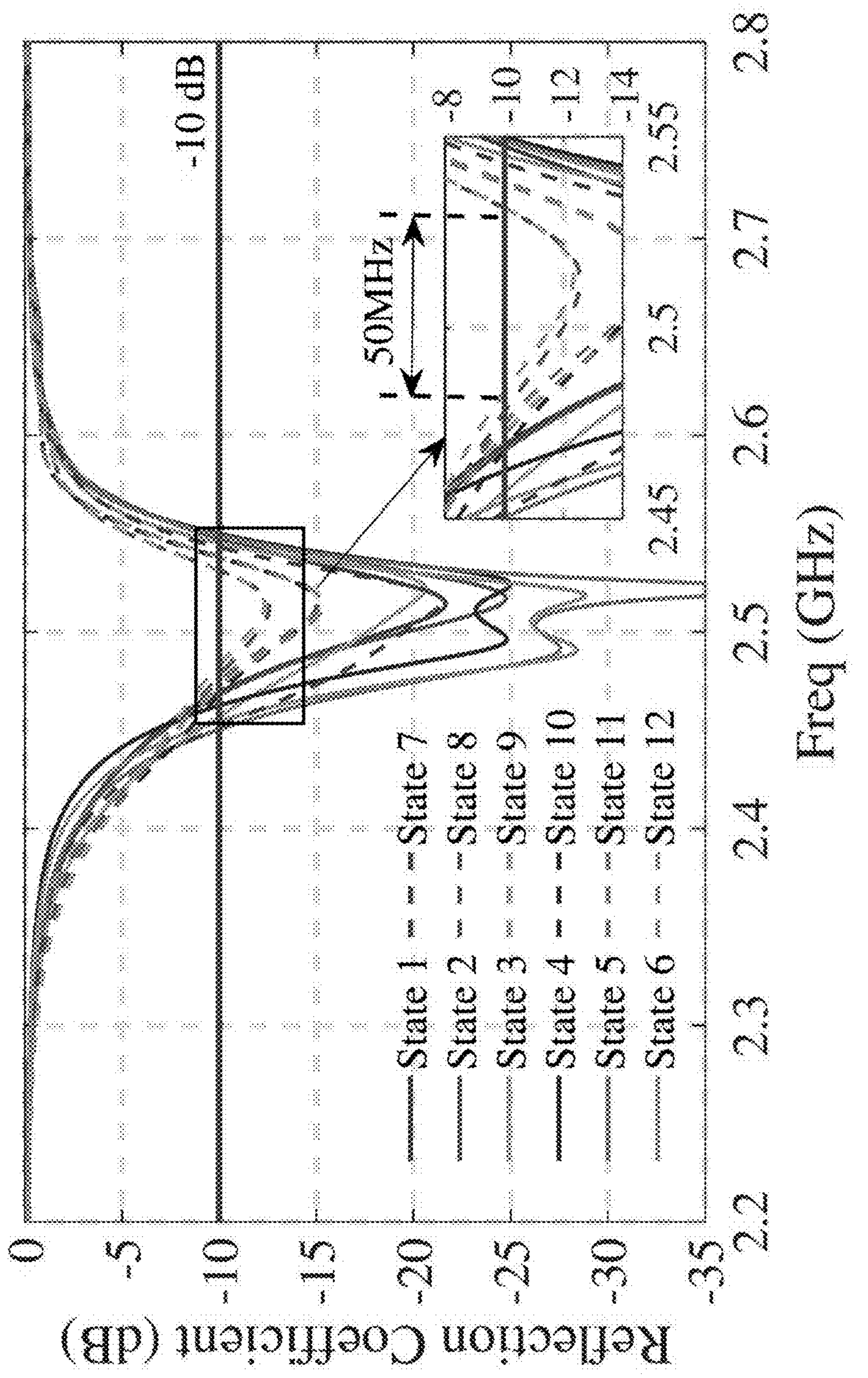
FIG. 7 illustrates simulated reflection coefficients of 12 states of the proposed PRA-FAS in FIG. 2 versus frequency.

The simulated S-parameters are provided in FIG. 7 to verify that the antenna is operational in all its states. From these, it can be seen that the PRA-FAS is well-matched to the center frequency of 2.5 GHZ, and the overall bandwidth is slightly over 50 MHZ.

Figure 8A:
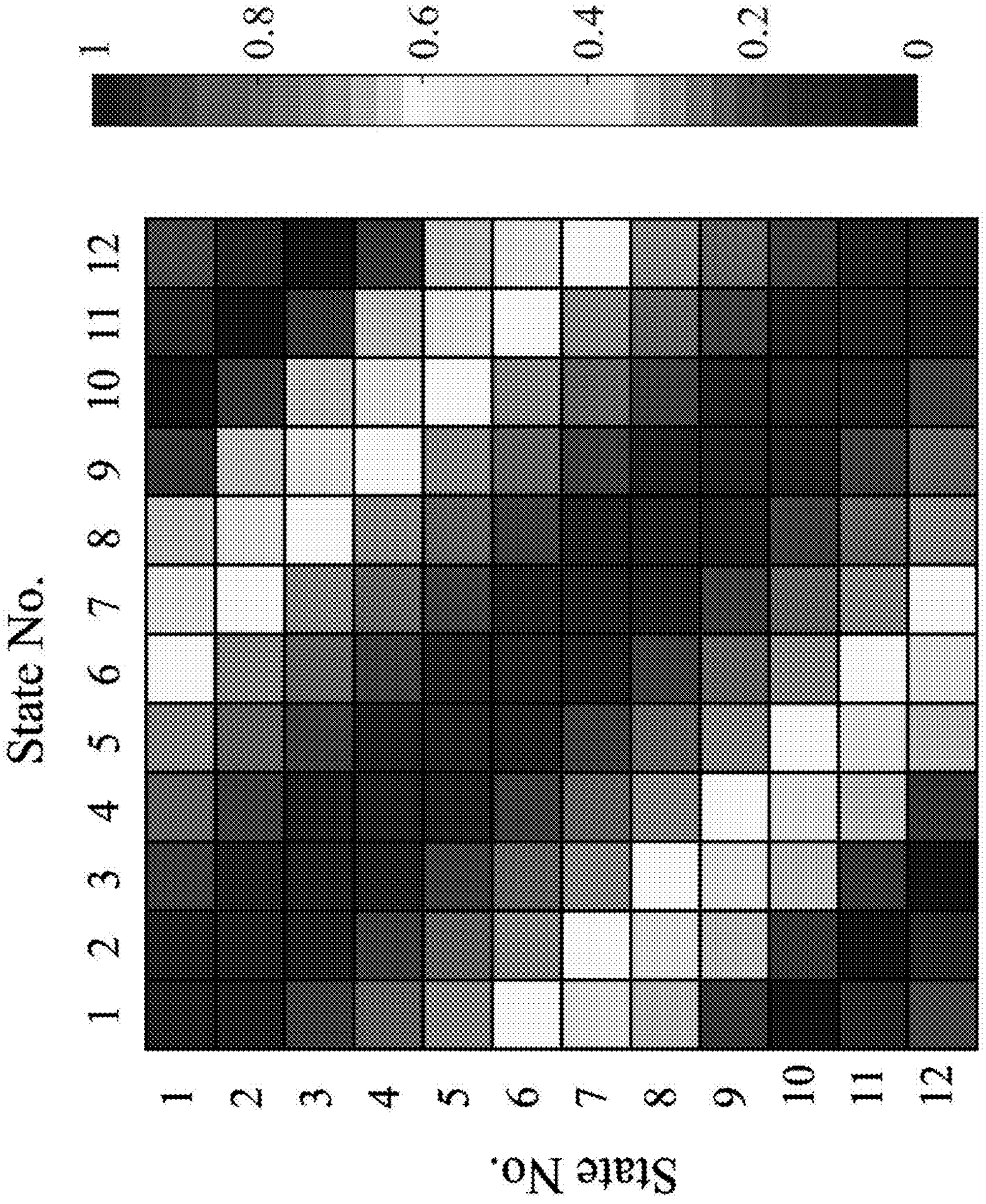
FIG. 8A illustrates the ideal target covariance matrix for N=12 states of the proposed PRA-FAS in FIG. 6 with W=0.5.
Figure 8B:
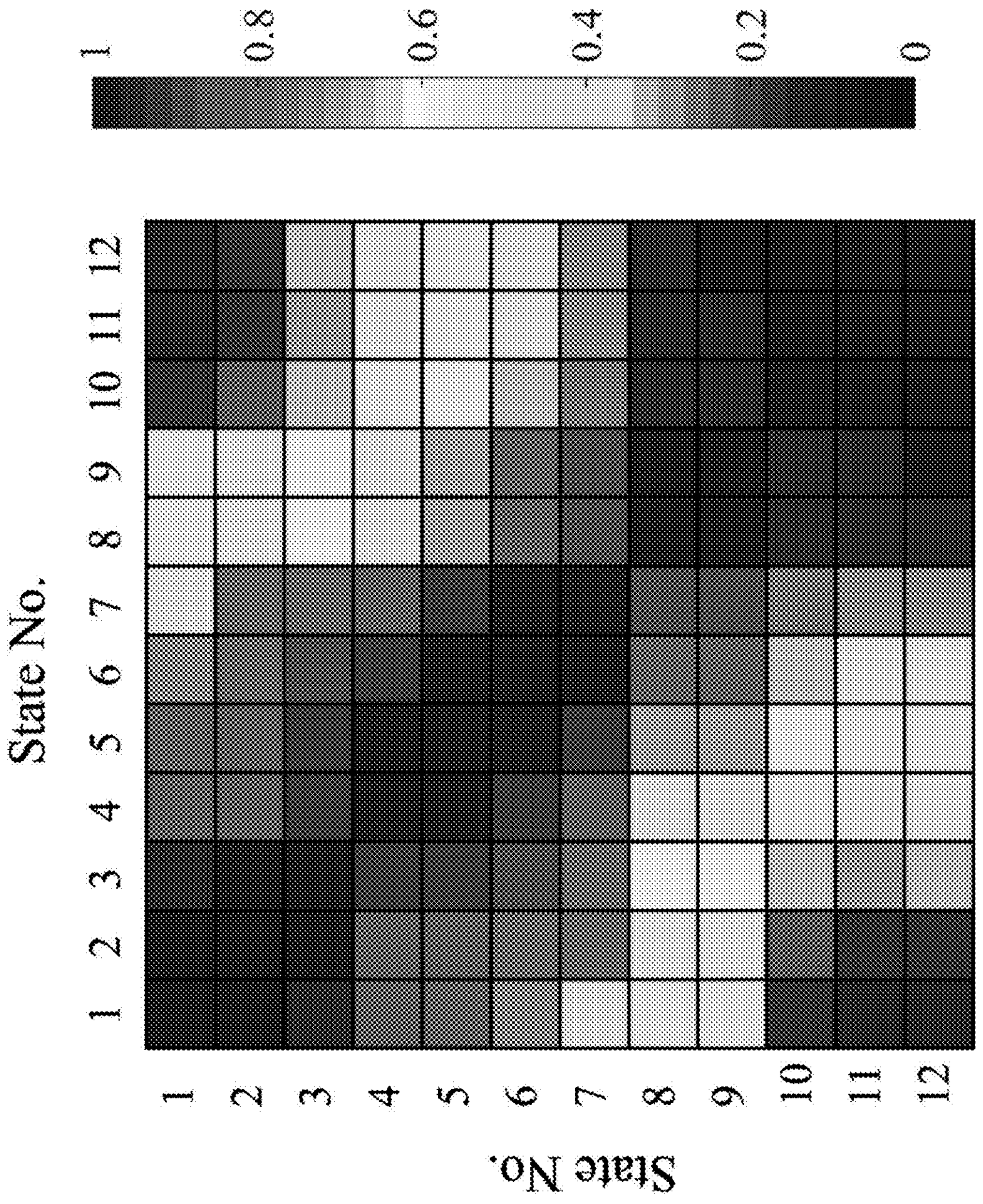
FIG. 8B illustrates the simulated covariance matrix for N=12 states of the proposed PRA-FAS in FIG. 6 with W=0.5, and an average relative error of $\delta_e=0.063$.
Figure 8C:
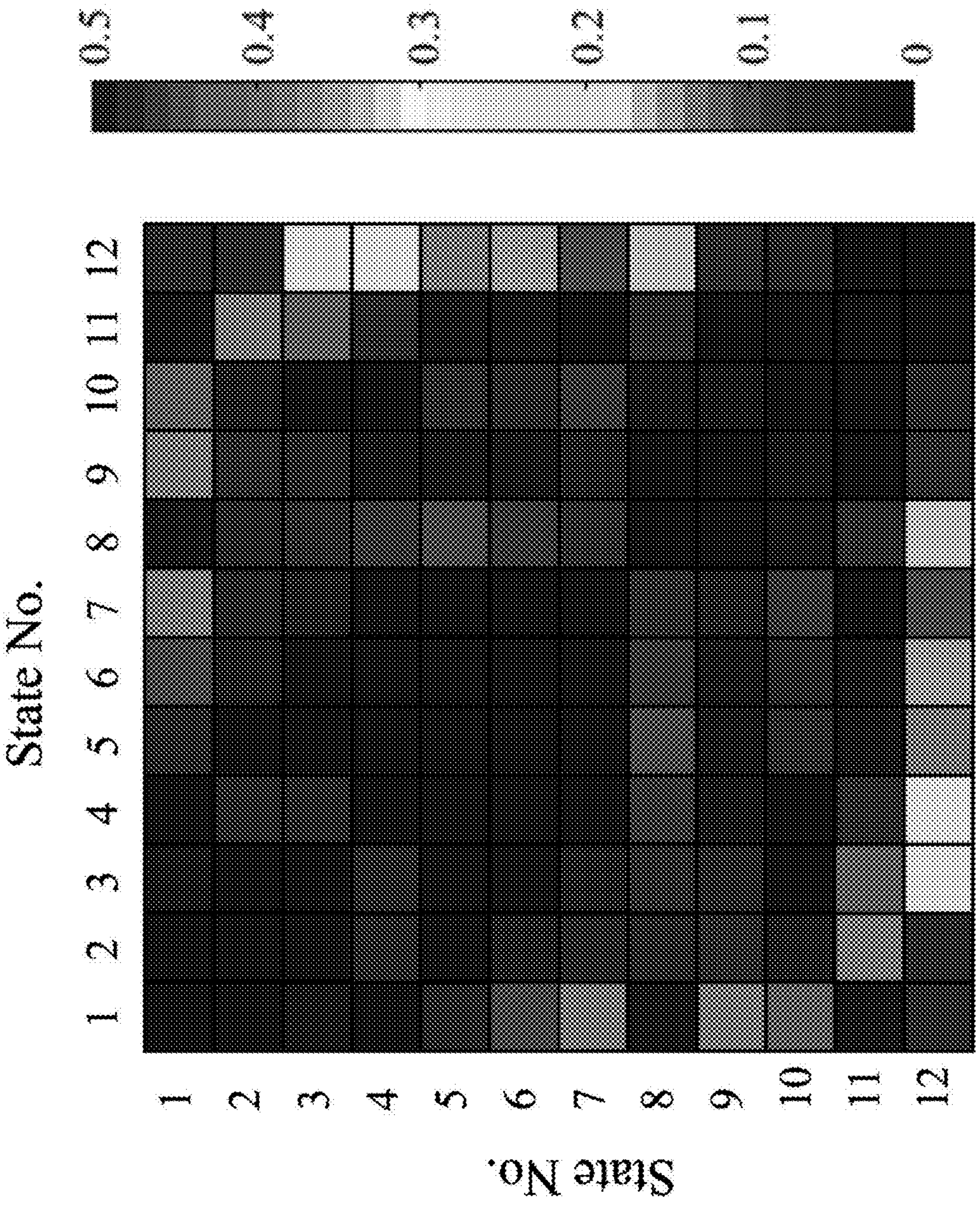
FIG. 8C illustrates the absolute error between the simulated result in FIG. 8B and the target covariance matrix in FIG. 8A.

The key design parameter for a FAS is however the correlation characteristics. FIG. 8A shows the target covariance objective $\varrho^*$ as specified by equation (25) when N=12 and W=½. This figure presents the ideal covariance matrix for n, n'∈{1, 2, . . . , 12}. As expected, the leading diagonal is unity and the matrix is symmetric. FIG. 8B presents the simulated radiation pattern covariance matrix of the optimized 12 states of the PRA-FAS. All 12 radiation patterns are obtained by full-wave simulations. FIG. 8C presents the difference between the simulated covariance matrix and the target correlation. It can be seen that the covariance values between any pair of patterns are found to be very near to the intended target. Using the operating states in TABLE. 2, the minimum average relative error between the simulated covariance matrix and target covariance is as low as $\delta_e$=0.063 from equation (29), thereby demonstrating the precision of the proposed PRA-FAS design method.

Figure 9:
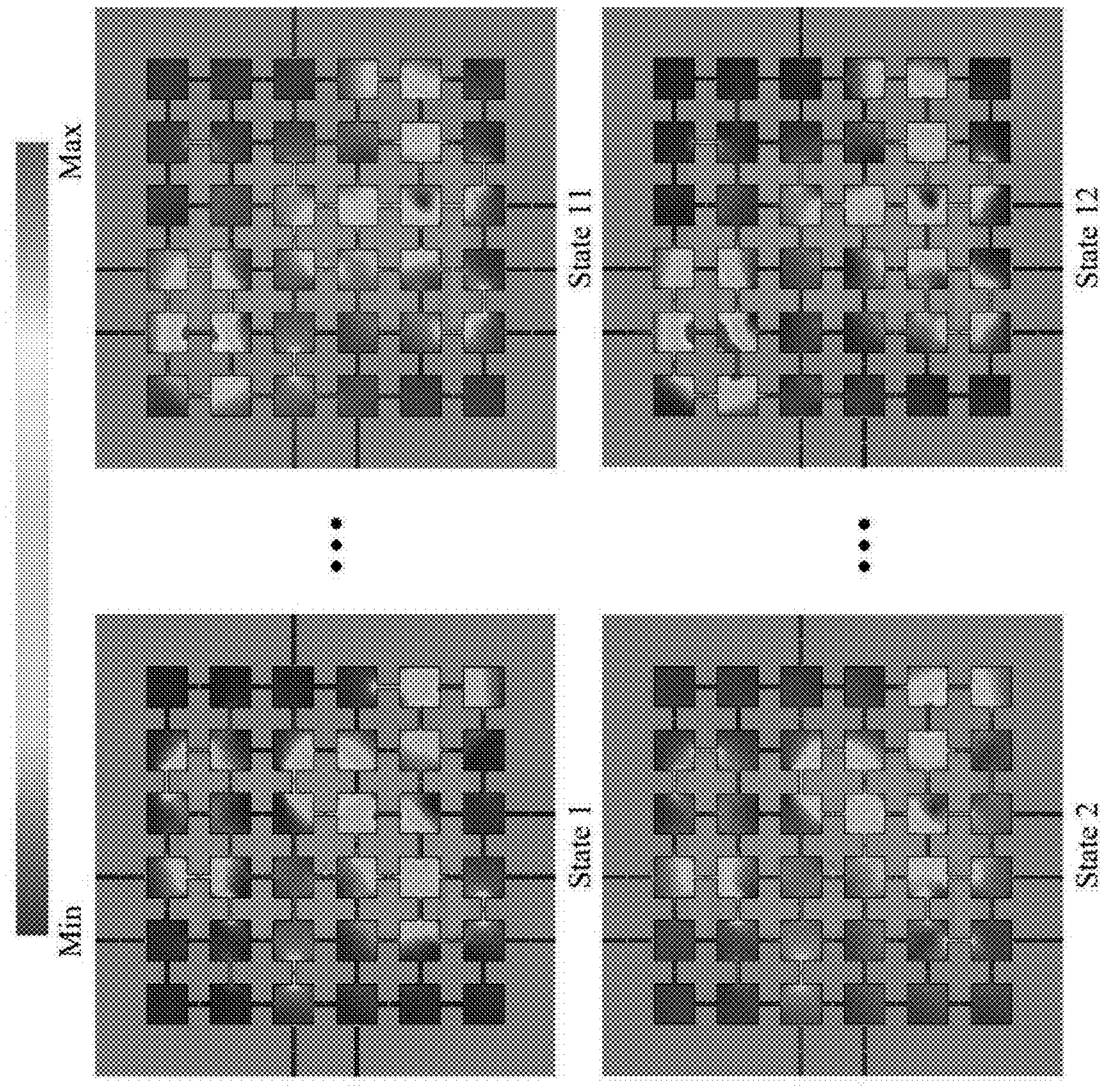
FIG. 9 illustrates simulated pixel layer current distribution of PRA-FAS states numbered 1, 2, 11, 12, respectively, at 2.5 GHz.

From the covariance matrix of the PRA-FAS, it can be seen that adjacent FAS states (ports) have a high correlation, which implies that the radiation patterns of these adjacent states should exhibit a greater degree of similarity based on equation (8). This is supported by the simulation results of the pixel layer current distribution for 4 selected FAS states. In FIG. 9, the current distribution on states 1, 2, 11, and 12 are shown. It is evident that adjacent states, such as 1 and 2, or 11 and 12, share similar current distributions. Consequently, their radiation patterns are indeed also similar. In contrast, states far apart, like 1 and 11, or 1 and 12, exhibit significant differences in current distributions, leading to uncorrelated radiation patterns, which align with the theoretical predictions.

Figure 10:
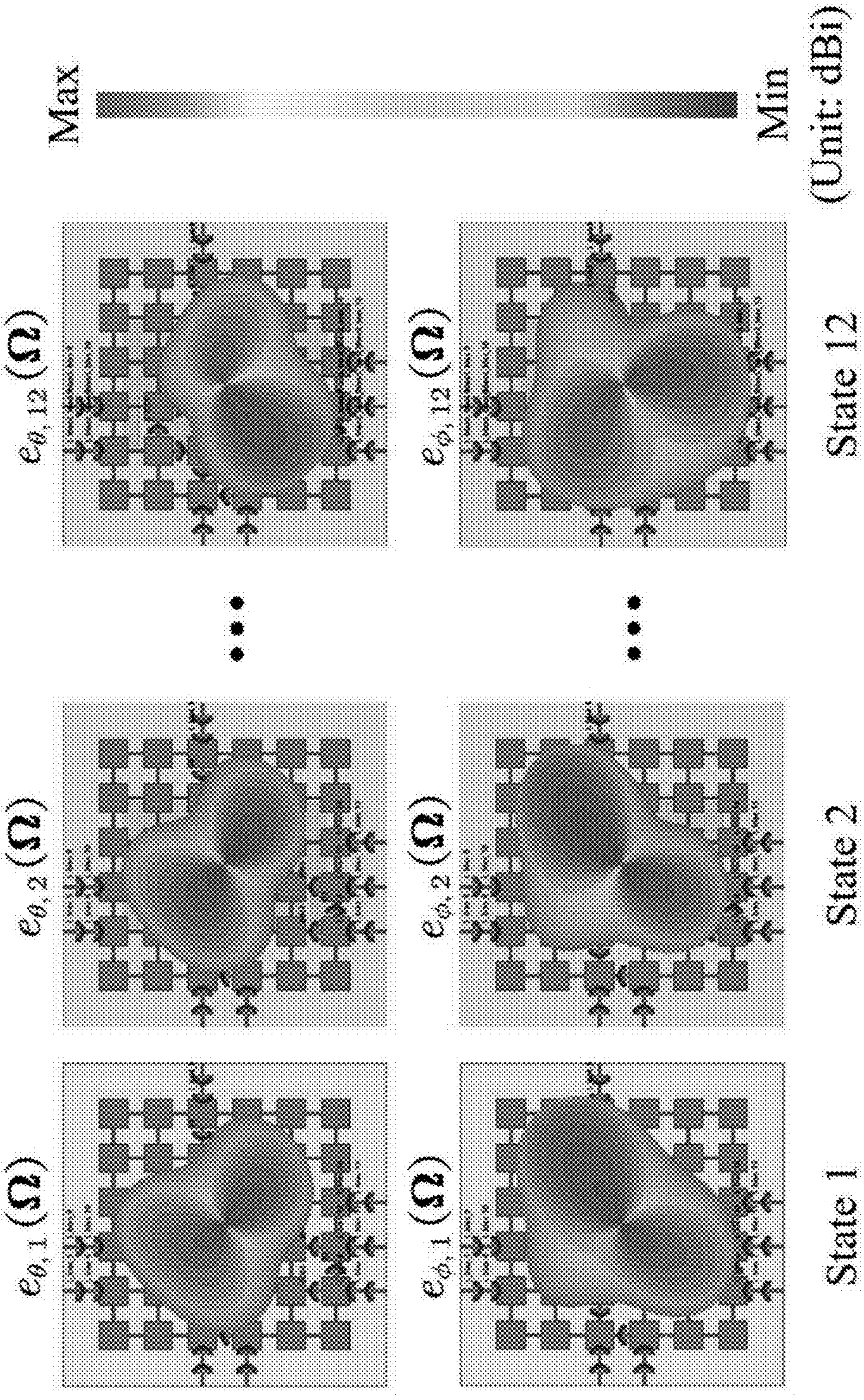
FIG. 10 illustrates simulated radiation patterns of State 1, 2, and 12 at 2.5 GHZ, where both $e_\theta(\Omega)$ and $e_\phi(\Omega)$ polarized components are depicted.

By examining the radiation patterns of the PRA-FAS, further insight into the associated covariance matrix of the radiation patterns can be obtained. FIG. 10 illustrates the $e_\theta(\Omega)$ and $e_\phi(\Omega)$ components of the radiation patterns for PRA-FAS states 1, 2, and 12. A comparison between states 1 and 2 reveals striking similarities in both components, which naturally results in a high correlation coefficient $\rho_{1,2}$ approaching unity. In contrast, the radiation patterns of states 1 and 12 exhibit orthogonality in their $e_\theta(\Omega)$ and $e_\phi(\Omega)$ components, leading to low correlation of $\rho_{1,12}\approx 0$ due to cross-polarization. Additionally, FIG. 10 indicates that the direction of the maximum gain for all states' radiation patterns closely aligns with the central normal of the antenna aperture plane, confirming that it is accurate to characterize all 12 states as exhibiting approximately unidirectional radiation.

It should be noted that in finding the signal correlation using equation (8), it is the difference between the radiation patterns that reduce the correlation. Even though the magnitudes of the simulated and measured radiation patterns of all states are similar, it is mainly the difference between the phases that result in the various correlations between states in this antenna. An example of this effect can be seen for the dipoles in equation (9), where only the pattern phase is changed.

Figure 11:
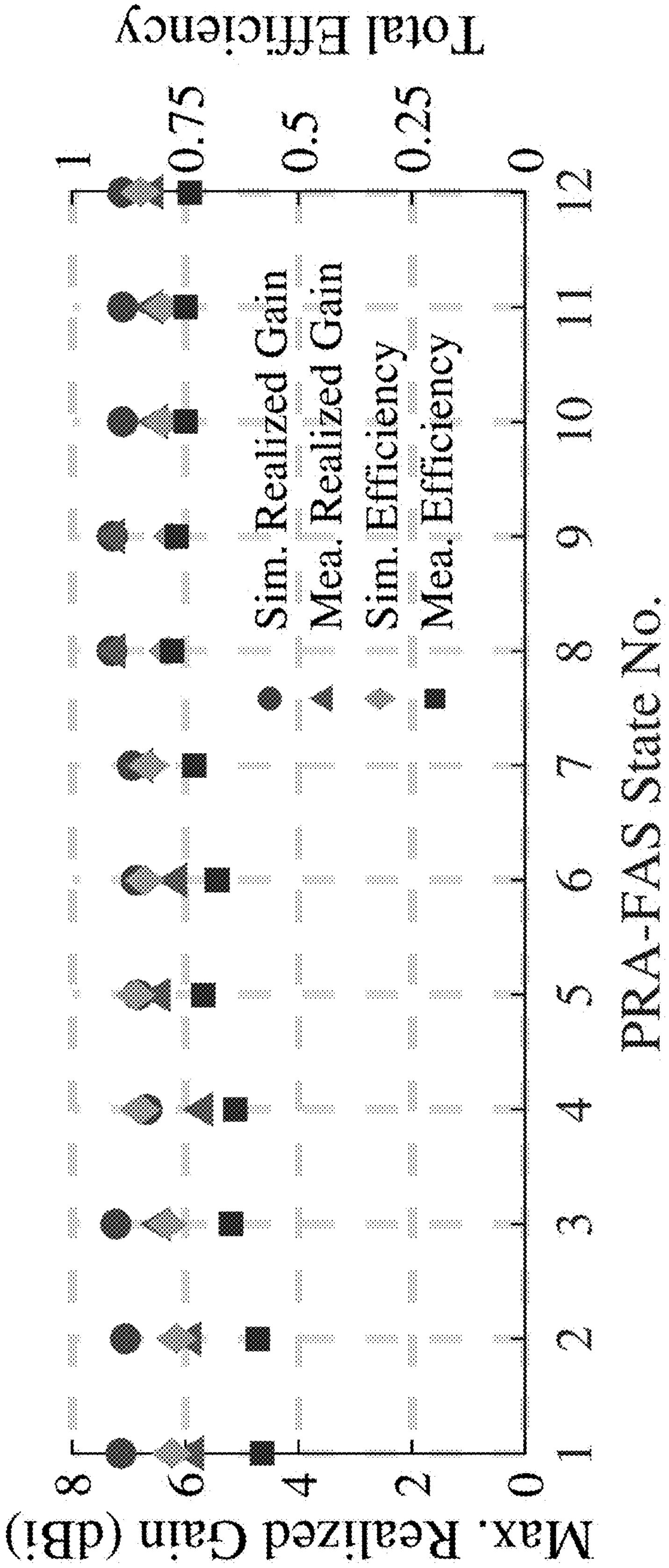
FIG. 11 illustrates simulated, measured maximum realized gain and total efficiency of all 12 states at 2.5 GHz.

FIG. 11 shows the realized gains as well as the efficiencies of all 12 PRA-FAS states at the center frequency of 2.5 GHz. It can be seen that the realized gains of all states are greater than 6.6 dBi. Meanwhile, an average efficiency of around 80% is achieved, which is sufficient for practical applications given the presence of the RF switches.

D.2 Measured Results of the PRA-FAS

Experimental results are required to verify the proposed PRA-FAS design and the proposed design process. The measured results for the PRA-FAS given in FIG. 2 are provided.

Figure 12A:
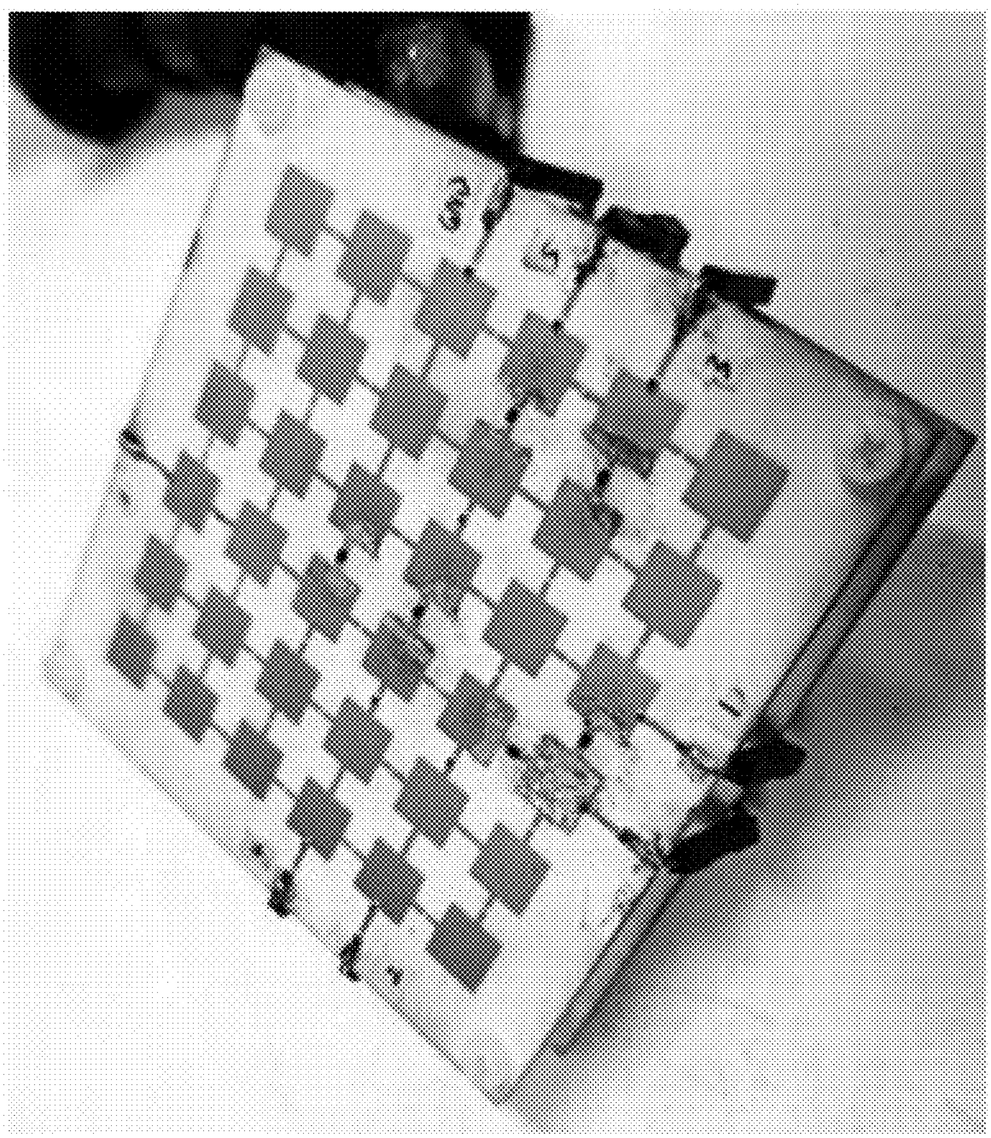
FIG. 12A illustrates prototype of the proposed PRA-FAS according to a certain embodiment of the present disclosure.
Figure 12B:
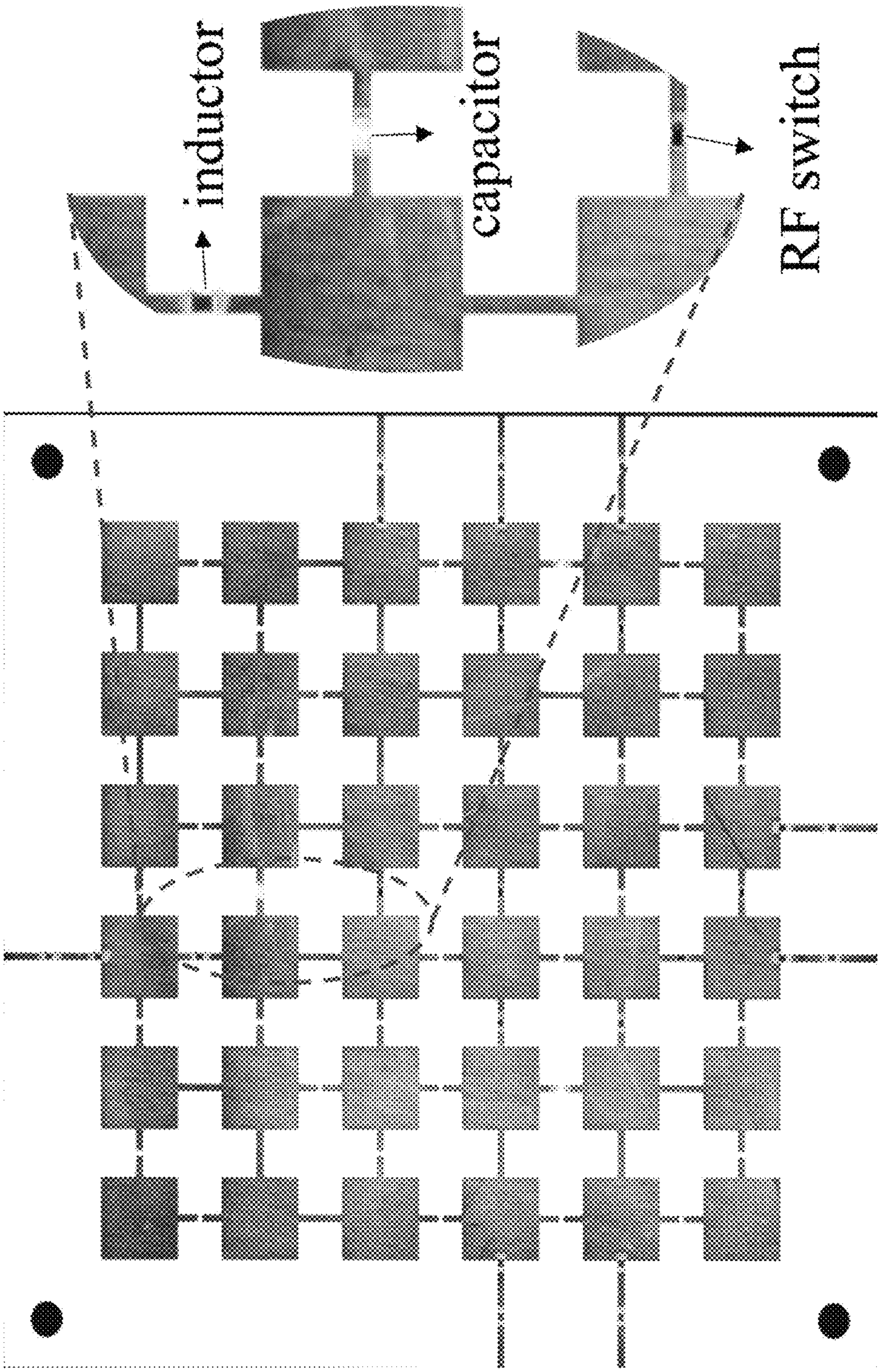
FIG. 12B illustrates top view of the pixel layer of the PRA-FAS in FIG. 12A.
Figure 12C:
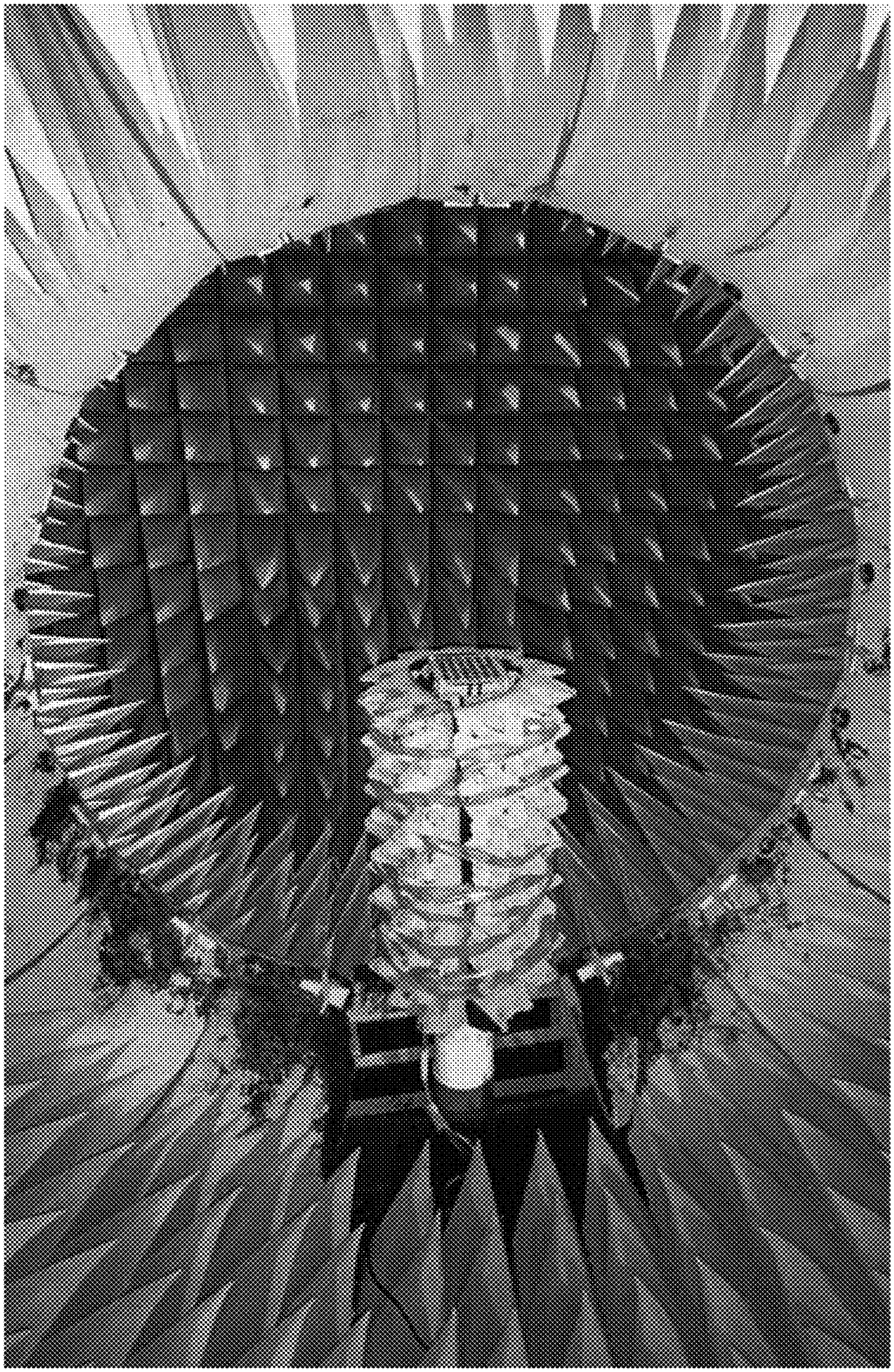
FIG. 12C illustrates measured setup, which shows that the proposed PRA-FAS in FIG. 12A is controlled by an FPGA.
Figure 13:
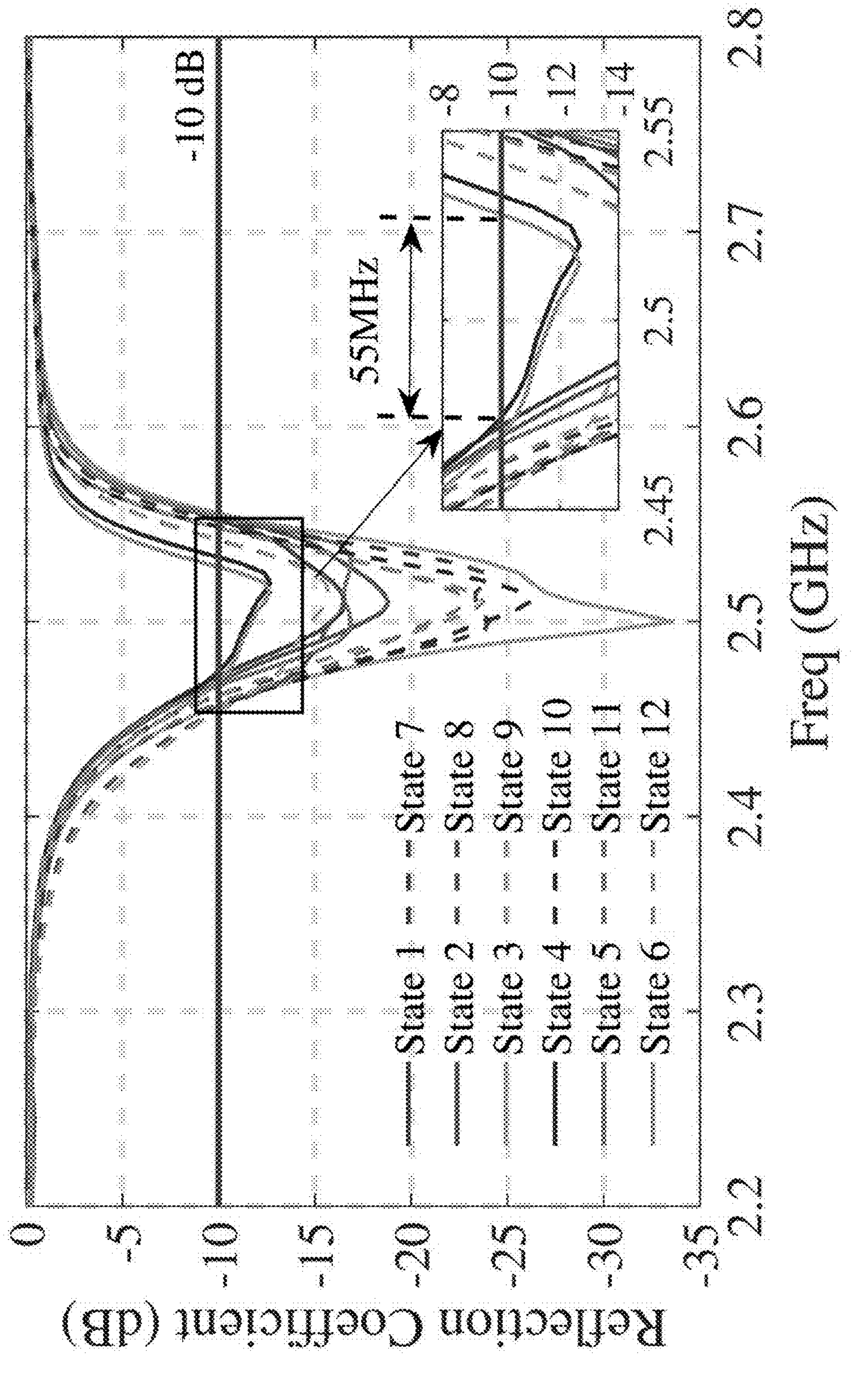
FIG. 13 illustrates measured reflection coefficients of 12 states of the PRA-FAS prototype in FIG. 12A versus frequency.

The photograph of the experimental prototype is presented in FIG. 12A. The pixel structure on the upper layer of the PRA-FAS is given in FIG. 12B. An FPGA AX7035 (0-/3.3-V output) is deployed to control the states of all 6 switches, achieving switching among 12 reconfigurable states. FIG. 12C shows the test setup of the PRA-FAS, where absorbing materials shield the DC control lines, preventing interference with the radiation field. FIG. 13 presents the measured reflection coefficients for all 12 states of the PRA-FAS, indicating that all states achieve impedance matching successfully and exhibit an operating bandwidth exceeding 50 MHz, similar to the simulation results in FIG. 7.

Figure 14A:
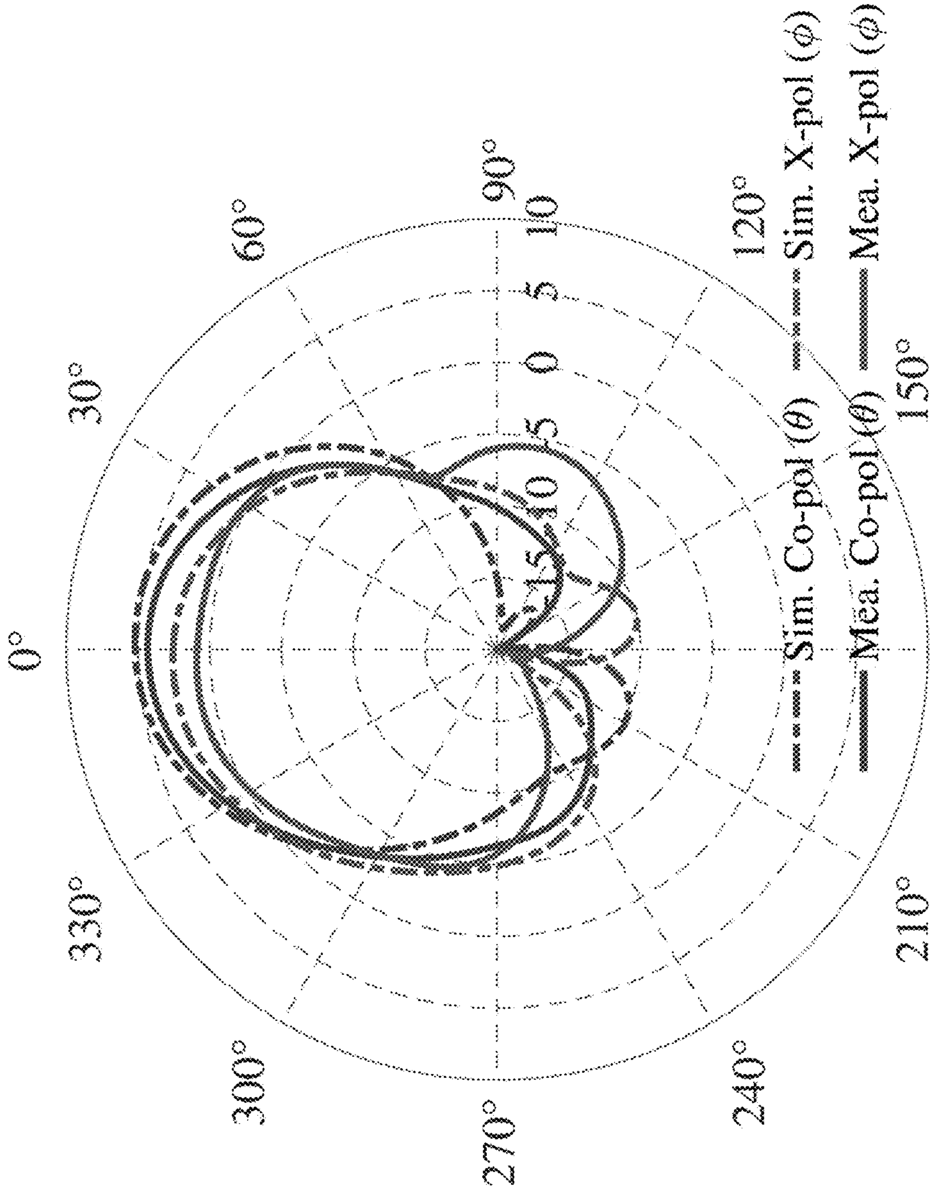
FIG. 14A illustrates simulated and measured radiation patterns of State 1 at 2.5 GHz when $\phi$=40°, the plane with maximum $e_\phi(\Omega)$ (Unit: dBi).
Figure 14B:
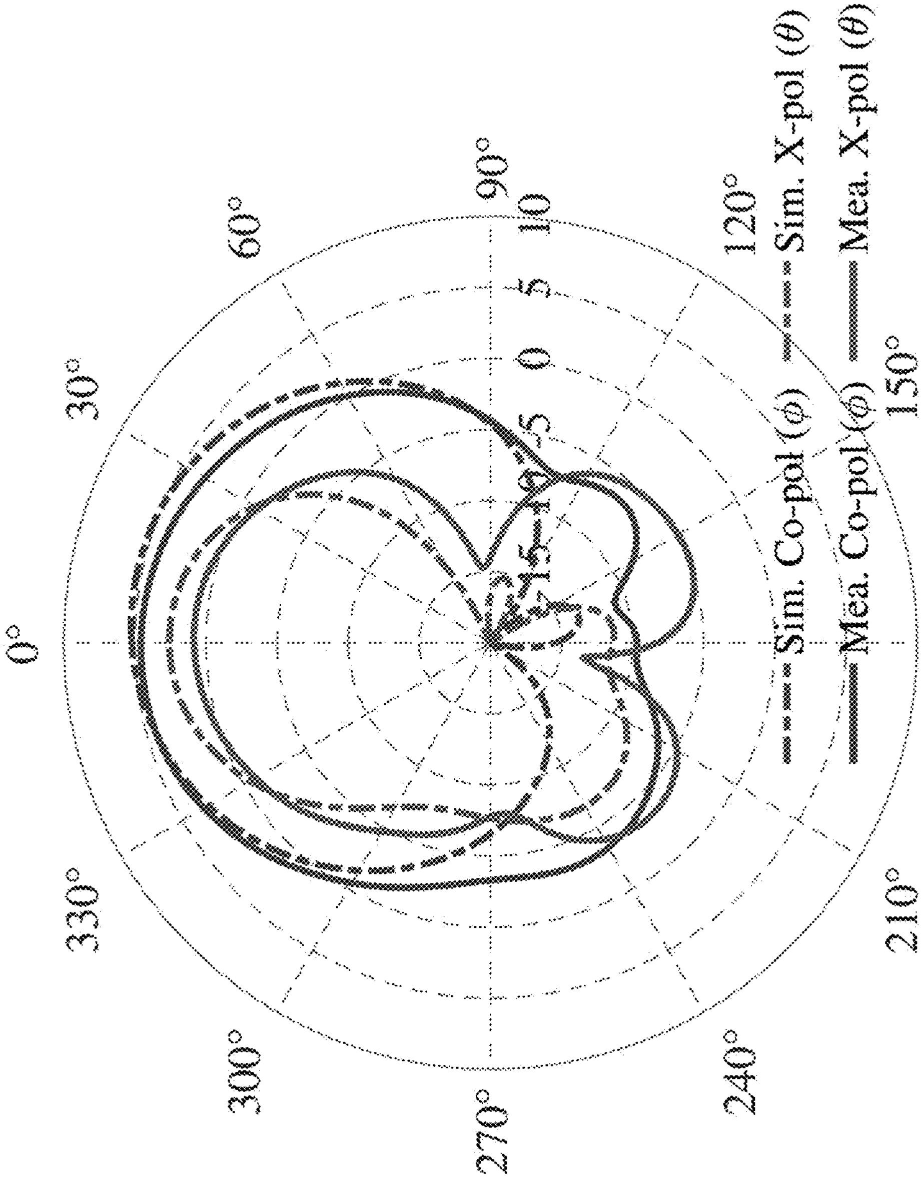
FIG. 14B illustrates simulated and measured radiation patterns of State 1 at 2.5 GHz when $\phi$=130°, the plane with maximum $e_\theta(\Omega)$ (Unit: dBi).

In the correlation calculation, only the electric field components in the upper hemispherical space are adopted (see the PAS at the beginning of Section D). FIG. 14A and FIG. 14B display the radiation patterns for State 1, measured on the planes where $e_\theta(\Omega)$ and $e_\phi(\Omega)$ components are most pronounced, respectively. Both patterns closely align with the simulated results. This consistency also exists in the other 11 PRA-FAS states, indicating the accuracy of the measured results. In addition, FIG. 11 illustrates the measured peak gain and total efficiency of the radiation patterns across various states of the PRA-FAS. The test outcomes closely align with the simulation data, with discrepancies attributable to manufacturing variances.

Figure 15:
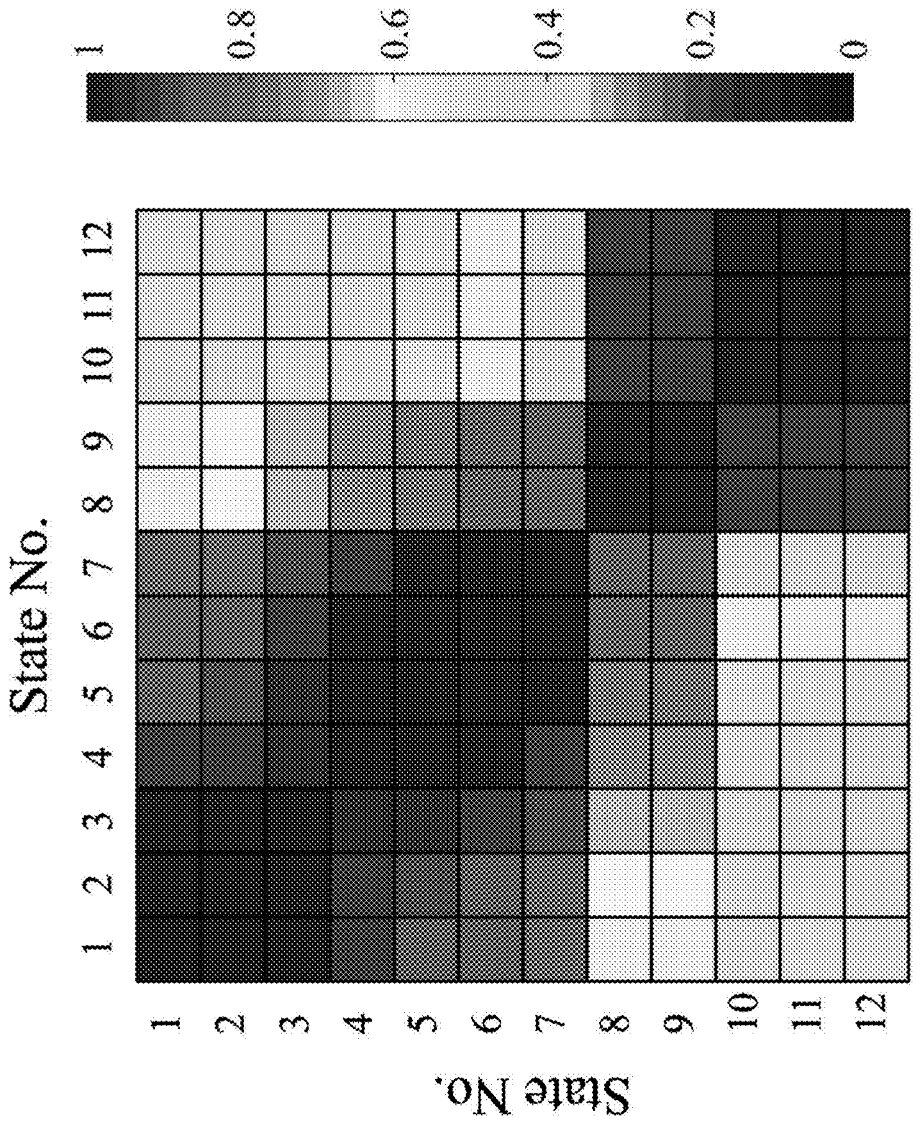
FIG. 15 illustrates measured covariance matrix of 12 PRA-FAS states.

FIG. 15 presents the covariance matrix obtained from measurement. The average relative error over all correlation terms is $\delta_e$=0.108 calculated by equation (29). Compared to the simulated covariance matrix in FIG. 8B ($\delta_e$=0.063), there is an increase in average error in the experimental outcomes. This is most likely due to modelling errors in the PIN diodes as detailed in the discussion section next. Despite the deterioration of the average error, each column or row in the measured covariance matrix still exhibits a distinct Bessel curve trend, making it applicable to FAS scenarios.

D.3 System Experiment of the PRA-FAS

To demonstrate the practical applicability of the proposed PRA-FAS, system-level simulations and experiments have also been conducted.

Figure 16:
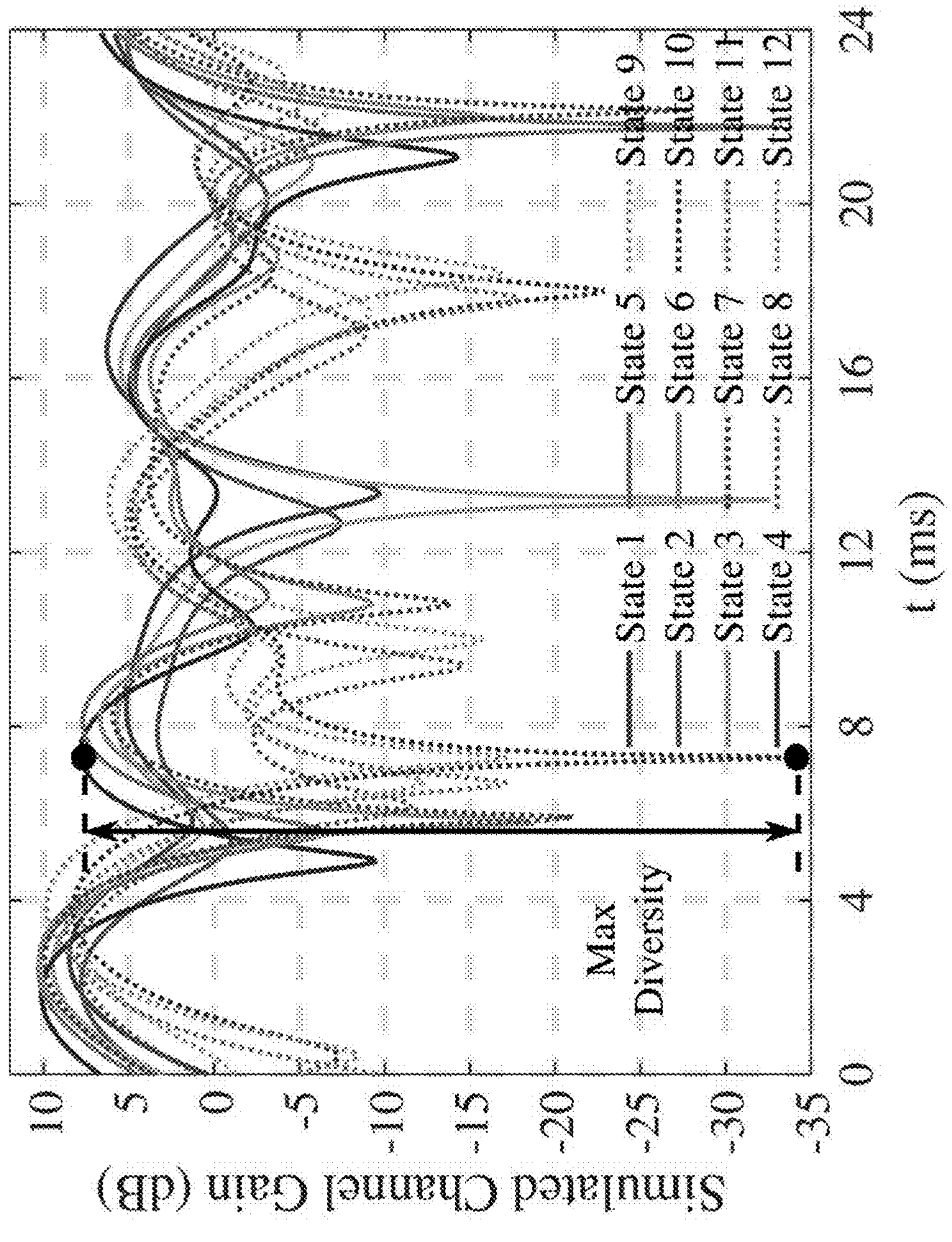
FIG. 16 illustrates the develop of the time-varying signal received by the 12 PRA-FAS ports obtained by simulation.
Figure 17:
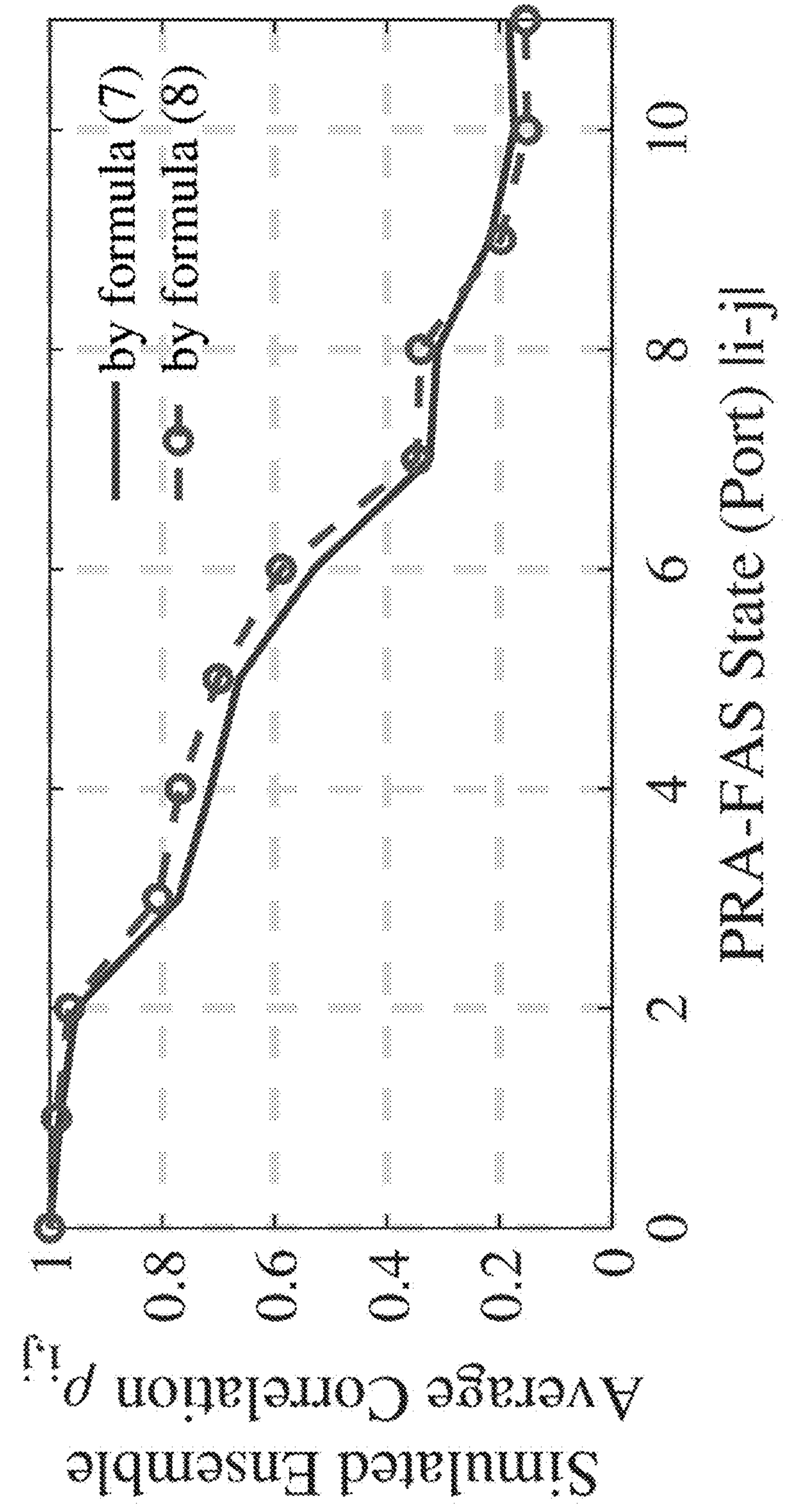
FIG. 17 illustrates simulated ensemble average port correlation of the PRA-FAS by equations (7) and (8), respectively.

In the proposed simulations, Clarke's model in three-dimensional space is adapted to assess the performance of the PRA-FAS [31]. A rich scattering mobile environment is simulated where the transmitter is stationary, while the PRA-FAS, acting as the receiver, was moved at the speed of v=60 km/h, and the transmitted signals are scattered by stationary objects around the mobile receiver. Under these conditions, the incident radiation at any given moment is unique, thus determining $h(\Omega)$ in equation (2). With the known radiation patterns of the 12 PRA-FAS states, the voltage at each PRA-FAS port can be computed using equation (6) and subsequently the channel gain for each port can be calculated. FIG. 16 illustrates the time-varying signals received by the 12 PRA-FAS ports, showing that there is up to 40 dB difference in channel gain between PRA-FAS ports. Furthermore, using the port voltages of FAS, the port-to-port correlation via equation (7) can be calculated, with the results of shown in FIG. 17. The high consistency between the results of equations (7) and (8) confirms the accuracy of the derivations presented in Section A of the present disclosure.

Figure 18A:
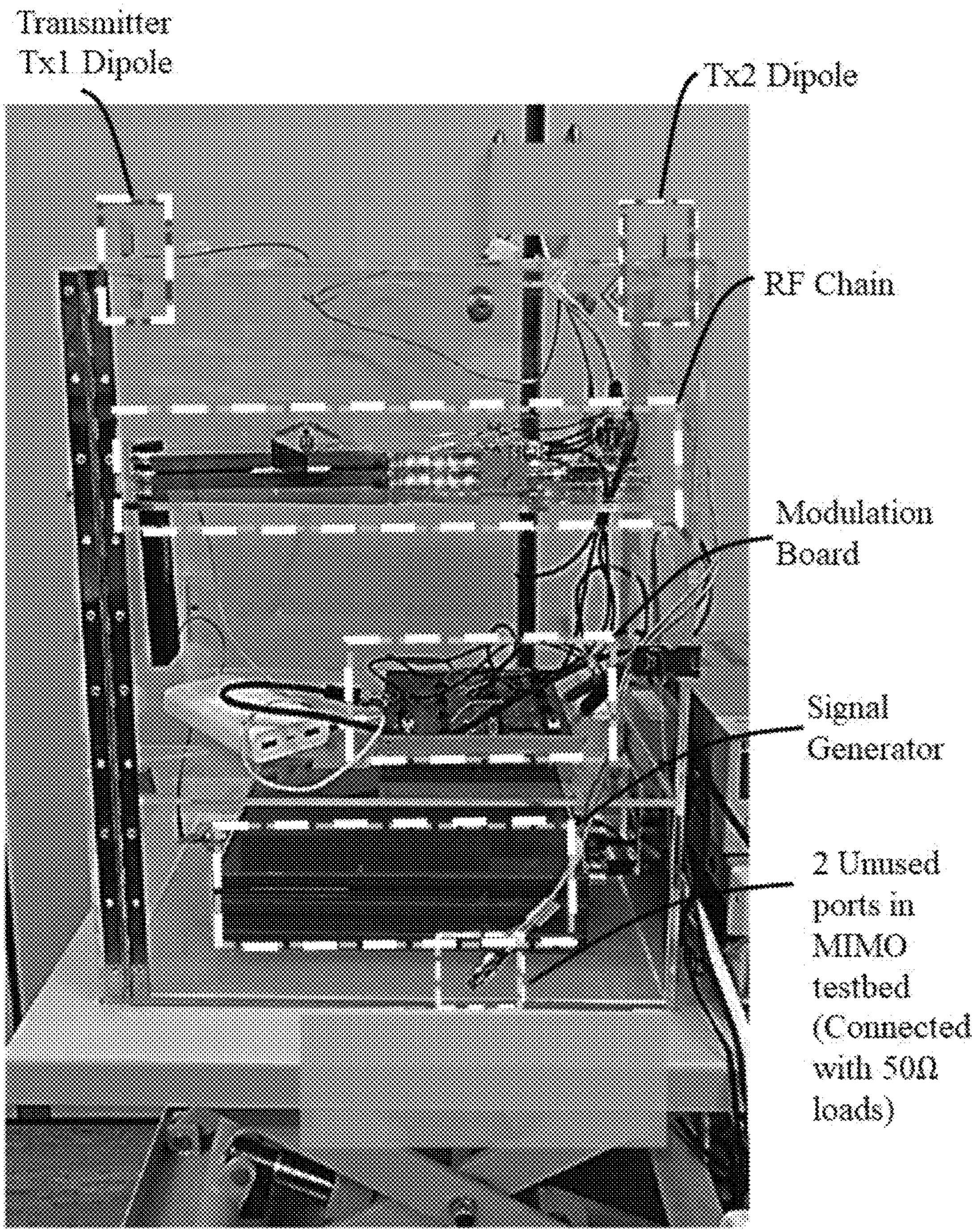
FIG. 18A illustrates FAS port correlation experiment setup for the proposed PRA-FAS, showing transmitter of the MIMO testbed with 2 dipoles.
Figure 18B:
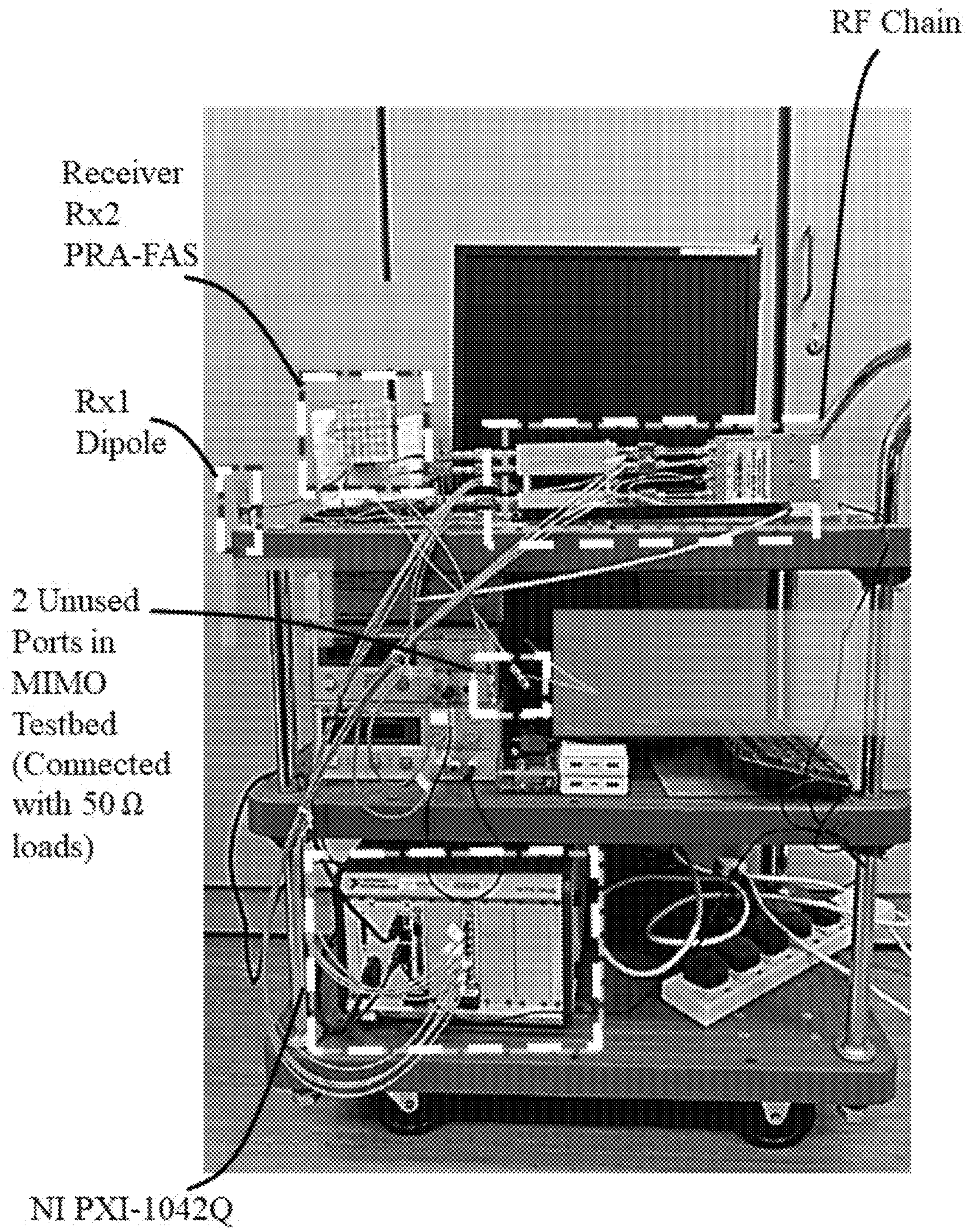
FIG. 18B illustrates FAS port correlation experiment setup for the proposed PRA-FAS, showing receiver of the MIMO testbed with the proposed PRA-FAS and a dipole.
Figure 18C:
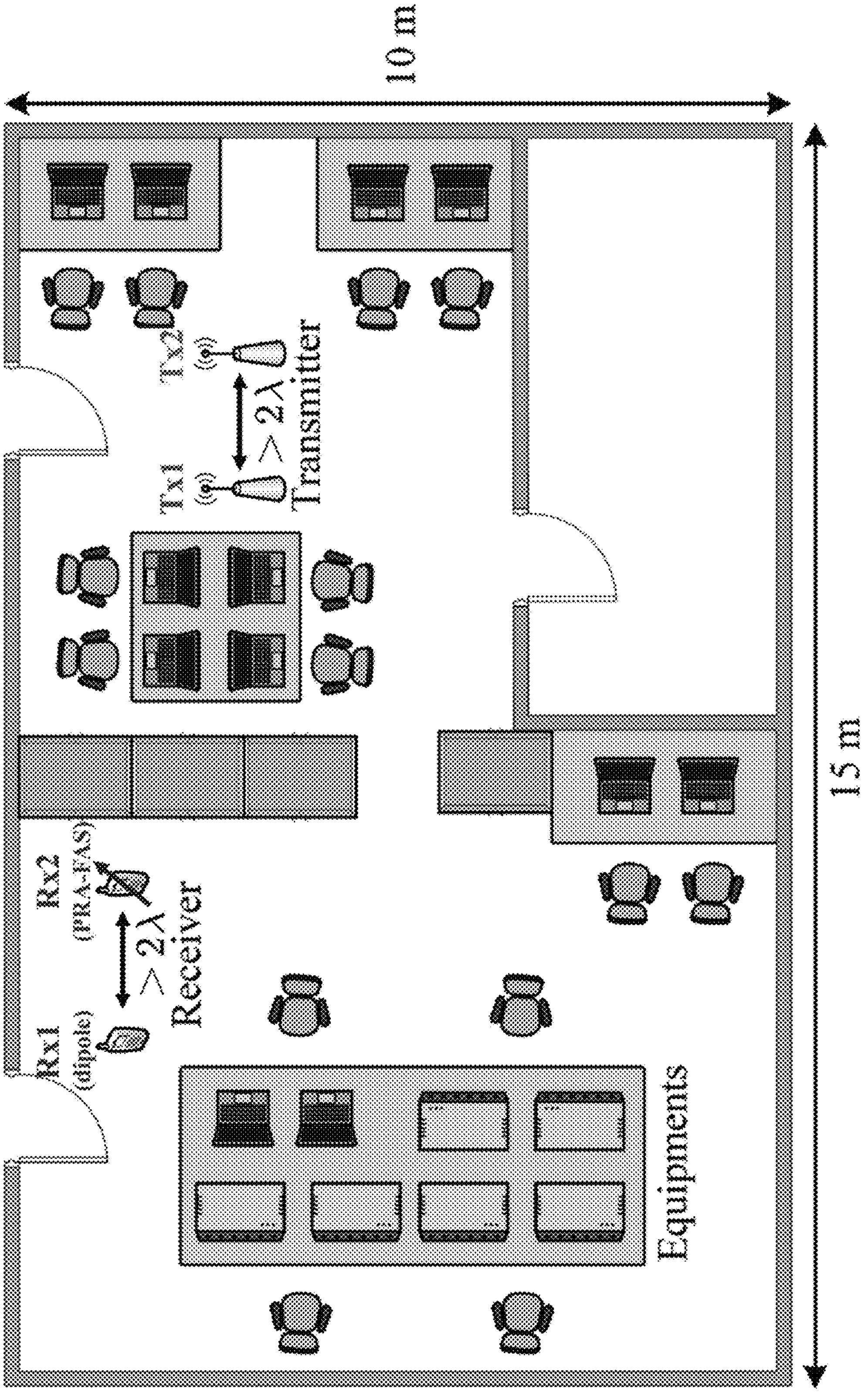
FIG. 18C illustrates FAS port correlation experiment setup for the proposed PRA-FAS, showing scheme of the indoor testing environment for the proposed PRA-FAS.

The final litmus test for the proposed PRA-FAS is to perform experiments and obtain measurements of the signals at the FAS ports in a rich scattering environment. To do this, a 4×4 MIMO testbed is used. It can provide measurements of 4×4 wireless channels every 0.01 seconds. To utilize the testbed for FAS measurements, it was configured as a 2×2 testbed, and the general test setup is given in FIG. 18A, FIG. 18B and FIG. 18C. As shown in FIG. 18A, both transmitting ports (Tx1 and Tx2) were set as dipoles and separated by over 2 wavelengths to provide uncorrelated transmission channels. FIG. 18B illustrates the schematic of the receiver, where the receiving port 1 (Rx1) was set to be a dipole, while receiving port 2 (Rx2) was set to the PRA-FAS. Both were again separated by at least 2 wavelengths, so they were uncorrelated.

With both ports of the transmitter set as dipoles, the MIMO channel elements, $h_{1,1}$ and $h_{1,2}$ correspond to a regular antenna system and can be used as benchmark channels. Channels $h_{2,1}$ and $h_{2,2}$ correspond to the two channels with the PRA-FAS in the receiver side, denoted as $$h_{2,1}^{FAS} \text{ and } h_{2,2}^{FAS},$$

respectively. The PRA-FAS was configured with an FPGA and set to cycle through the 12 FAS states in order. The state of the FAS could then be synchronized with the testbed so the channel for each FAS states could be identified. The MIMO antenna channel measurements were taken in the Wireless Communication Lab at the Hong Kong University of Science and Technology, whose indoor environment is given in FIG. 18C. The transmitter and receiver were put in a non-line-of-sight configuration separated by 5 m with 2 m high cupboards blocking the LoS Path.

Figure 19:
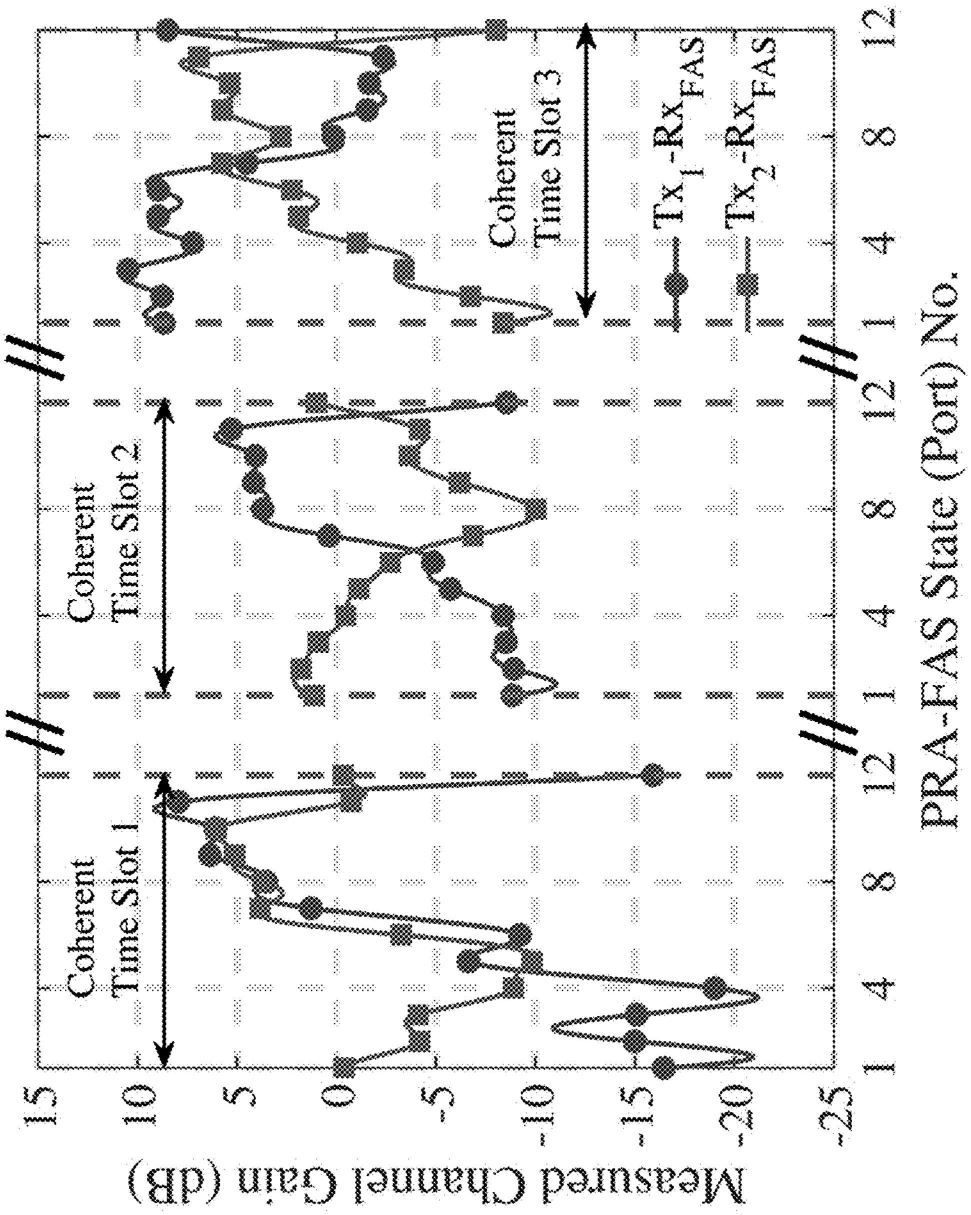
FIG. 19 illustrates $$h_{2,1}^{FAS} \text{ and } h_{2,2}^{FAS}$$

First, results that demonstrate the antenna diversity capability of PRA-FAS are presented. Since only one of the FAS ports can be activated at any instant in time, the proposed PRA-FAS cycled through its 12 configurations when the rich scattering channel is stationary. The stationary of the channels could be checked by the 2 benchmark channels, $h_{1,1}$ and $h_{1,2}$, which did not change during the measurement interval of the 12 configuration states. Three sets of channel samples from the $$h_{2,1}^{FAS} \text{ and } h_{2,2}^{FAS}$$

measurements over the 12 FAS states are shown in FIG. 19. In FIG. 19, the solid dots are the sample points, while the interpolated lines have been added for clearer visualization. These three sets of measurements were each for a different stationary channel, which can be achieved by placing the receiver at different locations in FIG. 18B with LoS path blocked. It can be observed that the PRA-FAS can provide channels that vary with its configuration states as required. In particular, as the 12 PRA-FAS states are cycled, up to around 30 dB signal variation is obtained, while the benchmark channels remain stationary. This shows that the PRA-FAS is generating sufficient diversity by changing its radiation patterns. Furthermore, it can be observed that in a multi-user environment, an SIR exceeding 15 dB can be achieved by port switching, which demonstrates the potential application of the proposed PRA-FAS in FAMA.

To obtain measurements of the signal correlation between the FAS ports, multiple channel samples can be averaged to provide an experimental ensemble average for the port correlation of the FAS. From the results, the measured average port correlation $$\rho_{i,j}^{mea}$$

can be written as $$\rho_{i,j}^{mea} = \frac{1}{2K}\sum_{k=1}^{K}\sum_{n=1}^{2}\frac{\varepsilon\left[h_{2,n}^{FAS}(i,k)h_{2,n}^{FAS}(j,k)*\right]}{\max\varepsilon\left[h_{2,n}^{FAS}(i,k)h_{2,n}^{FAS}(j,k)*\right]}, \quad (31)$$

where i, j∈{1, 2, . . . , 12}, $$h_{2,1}^{FAS}(i,k)$$

refers to the measured channel between the PRA-FAS and Tx1 during the k-th stationary channel condition while the PRA-FAS is in the i-th state, and the same applies to other terms. Then the ensemble average of all $$\rho_{i,j}^{mea}$$

terms with the same |i−j| value is calculated, as shown in FIG. 20, and the correlation given by equation (9) is also provided. It can be observed that the experimental results are generally a little less than equation (9). This is because the rich scattering environment in the proposed test will not be restricted to a uniform distribution within the 2D plane. In practice, the PAS will be more doughnut-shaped, and therefore experimentally correlations that are less than equation (9) will be obtained. Nevertheless, the final measurement results provide concrete evidence that the PRA-FAS provides fading signals suitably correlated between FAS ports.

FIG. 21 illustrates the method for designing the PRA-FAS. The PRA-FAS supports a total of N FAS ports uniformly distributed across a certain linear length of Wλ. In step 2110, positions of hardwires, open circuits, or RF switches between any two adjacent metallic pixel patches in a pixel layer of the pixel-based reconfigurable antenna are selected to satisfy a first condition that the position selections of hardwires, open circuits, and the RF switches provide impedance match over a specified bandwidth. In step 2130, selecting and ordering the N FAS ports from on/off state combinations of the RF switches are selected and ordered to satisfy a second condition that any two adjacent FAS ports of the N FAS ports are spatial correlated. The second condition can be satisfied when difference between a radiation pattern covariance matrix of all reconfigurable states and a target covariance matrix is minimized. In an optional step 2120, part of sets $$\mathcal{U}_{k,l}^{M}$$

that satisfies the first condition are selected as candidate sets for implementing the second condition to reduce search space. Other methods that have been discussed above will not be reiterated to avoid redundancy.

E. Future Discussion

Further discussion on three issues in the PRA-FAS design process is provided. The first issue considered is the selection of the number of switches required in the PRA-FAS design. The second issue considered is explaining the reason why there is a small deviation in the covariance errors between the simulation and experimental results. The final issue considered is the bandwidth of the FAS.

E.1 Selecting the Number of Switches

Selecting the optimal number of RF switches is crucial in the design of the PRA-FAS to ensure a sufficient number of reconfigurable states. Striking the right balance is essential for achieving the desired flexibility in adjusting the 3D radiation patterns across all states while maintaining design simplicity and efficiency.

To provide some insight into the selection of the number of switches, results for the design algorithm for different P values are provided to obtain the corresponding average error $\delta_e$ for the geometry in FIG. 2. For each P, the two-step method for PRA-FAS design is conducted to gain the optimal configuration $x^*_l$ and $S^*_k$, and the mapping order D*. The minimum average error $\delta_e$ is presented in TABLE. 3.

TABLE 3

Average error for various quantity of switches under the two-step method for $\mathcal{Q}$= 60 and N = 12

| Switch Quantity (P) | Minimum Average Error ($\delta_e$) |
|---|---|
| 4 | 0.148 |
| 5 | 0.099 |
| 6 | 0.063 |
| 7 | 0.080 |
| 8 | 0.076 |

As the number of switches P increases from 4 to 6, there is a gradual reduction in the minimum average error $\delta_e$. This trend suggests that an increased number of switches allows the covariance matrix to more closely approximate the target, aligning with the initial expectations. However, upon further increasing P, the minimum error begins to rise. This increase is attributable to the exponential growth in the number of possible states with the increment of P, which means that 100 sets $$\mathcal{U}_{k,l}^{M}$$

in each calculation are insufficient to explore the potential PRA-FAS configurations, thus failing to reach the global minimum in error. Taking into account the efficiency of the simulation process, P=6 is selected as the optimal number of switches for the proposed design, which balances the trade-off between the complexity and performance of the PRA-FAS.

E.2 Covariance Matrix Errors

To help find the source of the covariance matrix error between the measured and simulated results of the proposed PRA-FAS, it is necessary to look closely at the radiation patterns. Across all the spatial angles Ω, the amplitudes of the measured and simulated patterns were found to be consistent, however, slight differences in phase are observed. From the equation (8), it can be deduced that phase differences are particularly influential. Even with minor variations in phase, the correlation outcomes may be seriously affected. It is believed that this difference in phase between the simulated and experimental results is due to the inaccuracy of the equivalent model for the RF switch in the simulation, since the diodes do not operate under the same conditions as they were measured in [37]. Because 6 switches are used, any small errors will be accumulated even further. Despite the cumulative errors in phase (error in magnitude is not obvious from FIG. 14A and FIG. 14B), the proposed PRA-FAS still demonstrates distinct antenna diversity in system-level evaluations, thus these errors are deemed acceptable.

The proposed approach to rectify the switch modelling issue is to perform an optimization of the equivalent switch model parameters, so that the errors between the updated radiation patterns and experimental results are minimal. With the updated equivalent circuit model of the diodes, the PRA-FAS will be more accurate.

E.3 Bandwidth

The focus of the design has been to demonstrate that a FAS can be constructed using PRA. The bandwidth of the prototype obtained is just over 50 MHz. In wireless applications, wider bandwidths will be required. Approaches to increase the bandwidth are therefore an important issue to consider. In principle, this can be achieved by increasing T in equation (28) however there are two constraints that will also need to be overcome. The first is due to the design of the PRA-FAS radiating feed E-slot patch. Its height from the ground plane is low at only 1.524 mm resulting in the restricted bandwidth. The second is the limit of using only 6 switches for the reconfiguration of the pixel surface.

To obtain a wider bandwidth for the FAS to handle stable correlations for a larger bandwidth, it is necessary to increase the number of switches. That is more switch combinations need to be searched to find those with sufficient bandwidth. It has been found that doubling the height of the radiating feed plate and increasing the number of switches to 7 can increase the bandwidth to 130 MHz, exceeding 5%. Future investigation of increasing the bandwidth is required so that other approaches can also be considered for bandwidth extension.

E.4 Extension to mmWave Bands

One interesting issue to consider s whether the proposed design approach can be extended to mmWave bands. At millimeter wave frequencies and beyond, the difference in impedance between the on and off states of PIN diodes is limited [48], leading to poor reconfiguration. In such cases, advanced materials such as vanadium dioxide ($VO_2$) [49], known for their phase-change property in the high frequency range (up to terahertz), can be deployed for switching purposes. It is also possible to consider parasitic structures around the PIN diodes as discussed previously [48] to improve switching performance in mmWave bands.

In the present disclosure, a new approach to a FAS design based on pixel reconfiguration is described. In developing the approach, it can be seen that a FAS can be considered as being equivalent to systems with "fluid" radiation patterns. To validate the design approach, simulation and experimental results for a PRA-FAS prototype controlled by RF switches for a typical FAS with W=0.5 and N=12 operating at a center frequency of 2.5 GHz are provided. Because the PRA-FAS uses electronic switches for reconfiguration, it can meet the required packet-by-packet switching speeds of FAS.

It is experimentally shown that the 12 states of the PRA-FAS can provide channels that vary significantly when the underlying wireless channel is stationary, demonstrating that the PRA-FAS can provide the necessary diversity. Additionally, it is shown that the radiation pattern covariance matrix approximately meets Clarke's model both by simulation and experiment. Within the PRA-FAS, 6 RF switches are strategically placed among the 60 internal ports, striking a balance between complexity and performance. To realize this PRA-FAS's intricate design, a two-step optimization process is employed, which sequentially refines the antenna configuration and the sequence of matching patterns, aiming to approximate the ideal covariance matrix. A comprehensive system-level experiment was conducted in a fully scattering environment to validate the diversity and the port correlations of the designed PRA-FAS.

Further research is required. Methods to extend the PRA size for large FAS scales with W>λ/2 and N>12 are required. Multi-port PRA-FAS designs also need to be investigated for an MIMO-FAS.

The key contributions are listed as follows:

1) Radiation Pattern Covariance Matrix Analysis: signal correlation is related to the radiation patterns of the antenna and show that a FAS can also be interpreted by "fluid" radiation patterns. A radiation pattern covariance matrix is introduced to describe radiation pattern correlation, and therefore signal correlation, between any two PRA-FAS ports.
2) Sufficient FAS Ports: The proposed PRA-FAS demonstrates equivalent port movement over 0.5λ while achieving 12 FAS ports within a compact volume of 0.67λ×0.67λ×0.125λ. This level of port density can match that of conventional FAS, providing fine spatial sampling of channels compared with existing PRAs.
3) High Reconfigurability Speed: By leveraging RF switches and a software-controllable mechanism, the PRA-FAS achieves port switching with us latency, meeting the switching requirements of high-speed FAS [11], [12].
4) Two-step Method for PRA-FAS Design: A random search and a GA are devised to optimize the PRA-FAS, efficiently to reduce design complexity. First, pixel configurations that provide impedance matching are found. Then from these con-figurations, those meeting the FAS spatial correlation are selected.
5) PRA-FAS Prototype and Experimental Results: A PRA-FAS prototype operating at 2.5 GHz is provided to demonstrate the feasibility of the proposed design. In addition, system-level simulations and experiments using the proposed PRA-FAS is conducted to verify the correlation of the ports in wireless communication.

It will further be appreciated that any of the features in the above embodiments of the disclosure may be combined together and are not necessarily applied in isolation from each other. Similar combinations of two or more features from the above embodiments or preferred forms of the disclosure can be readily made by one skilled in the art.

Unless otherwise defined, the technical and scientific terms used herein have the plain meanings as commonly understood by those skill in the art to which the example embodiments pertain. Embodiments are illustrated in non-limiting examples. Based on the above disclosed embodiments, various modifications that can be conceived of by those skilled in the art would fall within spirits of the example embodiments.

CITED REFERENCES

[1] *Ericsson Mobility Report*. Ericsson, Stockholm, Sweden, June 2024.

[2] W. Saad, M. Bennis, and M. Chen, "A vision of 6G wireless systems: Applications, trends, technologies, and open research problems," *IEEE Netw*., vol. 34, no. 3, pp. 134-142, May/June 2020.

[3] K. B. Letaief, W. Chen, Y. Shi, J. Zhang, and Y.-J. A. Zhang, "The roadmap to 6G: AI empowered wireless networks," *IEEE Commun. Mag*., vol. 57, no. 8, pp. 84-90, August 2019.

[4] C.-X. Wang et al., “On the road to 6G: Visions, requirements, key technologies, and testbeds,” *IEEE Commun. Surveys Tuts.*, vol. 25, no. 2, pp. 905-974, 2nd Quart., 2023.

[5] C. Huang et al., “Holographic MIMO surfaces for 6G wireless networks: Opportunities, challenges, and trends,” *IEEE Wireless Commun.*, vol. 27, no. 5, pp. 118-125, October 2020.

[6] F. A. Pereira de Figueiredo, “An overview of massive MIMO for 5G and 6G,” *IEEE Latin America Trans.*, vol. 20, no. 6, pp. 931-940, June 2022.

[7] E. Basar, “Reconfigurable intelligent surface-based index modulation: A new beyond MIMO paradigm for 6G,” *IEEE Trans. Commun.*, vol. 68, no. 5, pp. 3187-3196 May 2020.

[8] K.-K. Wong, A. Shojaeifard, K.-F. Tong, and Y. Zhang, “Fluid antenna systems,” *IEEE Trans. Wireless Commun.*, vol. 20, no. 3, pp. 1950-1962 March 2021.

[9] K. K. Wong, K. F. Tong, Y. Shen, Y. Chen, and Y. Zhang, “Bruce Lee-inspired fluid antenna system: Six research topics and the potentials for 6G,” *Front. Commun. Netw.*, vol. 3, March 2022, Art. no. 853416.

[10] L. Zhu and K. K. Wong, “Historical review of fluid antenna and movable antenna,” January 2024, *arXiv:* 2401.02362,

[11] K.-K. Wong and K.-F. Tong, “Fluid antenna multiple access,” *IEEE Trans. Wireless Commun.*, vol. 21, no. 7, pp. 4801-4815 July 2022.

[12] K.-K. Wong, D. Morales-Jimenez, K.-F. Tong, and C.-B. Chae, “Slow fluid antenna multiple access,” *IEEE Trans. Commun.*, vol. 71, no. 5, pp. 2831-2846 May 2023.

[13] W. K. New, K.-K. Wong, H. Xu, K.-F. Tong, and C.-B. Chae, “Achievability of fluid antenna multiple access: A Han-Kobayashi’s comparison,” in *Proc. IEEE Globecom Workshops* (*GC Wkshps*), 2023, pp. 1201-1206.

[14] H. Xu et al., “Channel estimation for FAS-assisted multiuser mmWave systems,” *IEEE Commun. Lett.*, vol. 28, no. 3, pp. 632-636, March 2024.

[15] K.-K. Wong, C.-B. Chae, and K.-F. Tong, “Compact ultra massive antenna array: A simple open-loop massive connectivity scheme,” *IEEE Trans. Wireless Commun.*, vol. 23, no. 6, pp. 6279-6294 June 2024.

[16] K.-K. Wong, K.-F. Tong, and C.-B. Chae, “Fluid antenna system-Part II: Research opportunities,” *IEEE Commun. Lett.*, vol. 27, no. 8, pp. 1924-1928 June 2024.

[17] W. K. New, K.-K. Wong, H. Xu, K.-F. Tong, C.-B. Chae, and Y. Zhang, “Fluid antenna system enhancing orthogonal and non-orthogonal multiple access,” *IEEE Commun. Lett.*, vol. 28, no. 1, pp. 218-222, January 2024.

[18] J. Zheng, T. Wu, X. Lai, C. Pan, M. Elkashlan, and K.-K. Wong, “FAS-assisted NOMA short-packet communication systems,” *IEEE Trans. Veh. Technol.*, vol. 73, no. 7, pp. 10732-10737, July 2024.

[19] C. Borda-Fortuny, L. Cai, K. F. Tong, and K.-K. Wong, “Low-cost 3D-printed coupling-fed frequency agile fluidic monopole antenna system,” *IEEE Access*, vol. 7, pp. 95058-95064, 2019.

[20] E. Motovilova and S. Y. Huang, “A review on reconfigurable liquid dielectric antennas,” *Materials*, vol. 13, no. 8, p. 1863, 2020.

[21] Y. Shen et al., “Design and implementation of mmWave surface wave enabled fluid antennas and experimental results for fluid antenna multiple access,” 2024, *arXiv:* 2405.09663.

[22] R. Malinowski, I. P. Parkin, and G. Volpe, “Advances towards programmable droplet transport on solid surfaces and its applications,” *Chem. Soc. Rev.*, vol. 49, pp. 7879-7892 March 2020.

[23] L. N. Pringle et al., “A reconfigurable aperture antenna based on switched links between electrically small metallic patches,” *IEEE Trans. Antennas Propag.*, vol. 52, no. 6, pp. 1434-1445 June 2004.

[24] P. Lotfi, S. Soltani, and R. D. Murch, “Printed endfire beam-steerable pixel antenna,” *IEEE Trans. Antennas Propag.*, vol. 65, no. 8, pp. 3913-3923 August 2017.

[25] F. Jiang, C.-Y. Chiu, S. Shen, Q. S. Cheng, and R. Murch, “Pixel antenna optimization using N-port characteristic mode analysis,” *IEEE Trans. Antennas Propag.*, vol. 68, no. 5, pp. 3336-3347 May 2020.

[26] Y. Zhang, S. Shen, Z. Han, C.-Y. Chiu, and R. Murch, “Compact MIMO systems utilizing a pixelated surface: Capacity maximization,” *IEEE Trans. Veh. Technol.*, vol. 70, no. 9, pp. 8453-8467 September 2021.

[27] B. A. Cetiner, H. Jafarkhani, J.-Y. Qian, H. J. Yoo, A. Grau, and F. De Flaviis, “Multifunctional reconfigurable MEMs integrated antennas for adaptive MIMO systems,” *IEEE Commun. Mag.*, vol. 42, no. 12, pp. 62-70, December 2004.

[28] J. Rao et al., “A novel reconfigurable intelligent surface for wide-angle passive beamforming,” *IEEE Trans. Microw. Theory Techn.*, vol. 70, no. 12, pp. 5427-5439 December 2022.

[29] J. L. Araque and G. Vecchi. “A compact antenna reconfigurable in the band 1.7 GHZ-2.7 GHz,” in *Proc. IEEE Antennas Propag. Soc. Int. Symp.,* 2006, pp. 2333-2336.

[30] S. Song and R. D. Murch, “An efficient approach for optimizing frequency reconfigurable pixel antennas using genetic algorithms,” *IEEE Trans. Antennas Propag.*, vol. 62, no. 2, pp. 609-620, February 2014.

[31] R. H. Clarke, “A statistical theory of mobile-radio reception,” *Bell Syst. Techn. J.*, vol. 47, no. 6, pp. 957-1000 July/August 1968.

[32] R. G. Vaughan and J. B. Andersen, “Antenna diversity in mobile communications,” *IEEE Trans. Veh. Technol.*, vol. 36, no. 4, pp. 149-172, November 1987.

[33] M. Khammassi, A. Kammoun, and M.-S. Alouini, “A new analytical approximation of the fluid antenna system channel,” *IEEE Trans. Wireless Commun.*, vol. 22, no. 12, pp. 8843-8858 December 2023.

[34] R. E. Collin and F. J. Zucker, *Antenna Theory, Part* 1. New York, NY, USA: McGraw Hill, 1969.

[35] S. Shen, Y. Zhang, C.-Y. Chiu, and R. Murch, “Directional multiport ambient RF energy-harvesting system for the Internet of Things,” *IEEE Internet Things J.*, vol. 8, no. 7, pp. 5850-5865 April 2021.

[36] J. Costantine et al., “Analyzing the complexity and reliability of switch-frequency-reconfigurable antennas using graph models,” *IEEE Trans. Antennas Propag.*, vol. 60, no. 2, pp. 811-820, February 2012.

[37] “AlGaAs flip chip PIN diodes,” Data Sheet MA4AGP907, M/A-COM Technol. Solut. Inc., Lowell, MA, USA, May 2024. [Online]. Available: https://www.mouser.cn/datasheet/2/249/MA4AGP907_MA4AGFCP910-1922050.pdf

[38] Z. Han, S. Shen, Y. Zhang, C.-Y. Chiu, and R. Murch, “A pattern correlation decomposition method for analysis of ESPAR in single-RF MIMO systems,” *IEEE Trans. Wireless Commun.*, vol. 21, no. 7, pp. 4654-4668 July 2022.

[39] S. Shen, Y. Sun, S. Song, D. P. Palomar, and R. D. Murch, “Successive boolean optimization of planar pixel antennas,” *IEEE Trans. Antennas Propag.*, vol. 65, no. 2, pp. 920-925, February 2017.

[40] J. M. Johnson and Y. Rahmat-Samii, “Genetic algorithms and method of moments (GA/MoM) for the design of integrated antennas,” *IEEE Trans. Antennas Propag.*, vol. 47, no. 10, pp. 1606-1614 October 1999.

[41] *CST Studio Suite*, Simulia, Johnston, RI, USA, April 2024.

[42] S. Tang, Y. Zhang, Z. Han, C.-Y. Chiu, and R. Murch, “A pattern-reconfigurable antenna for single-RF 5G millimeter-wave communications,” *IEEE Antennas Wireless Propag. Lett.*, vol. 20, no. 12, pp. 2344-2348 December 2021.

[43] Y. Zhang, Z. Han, S. Tang, S. Shen, C.-Y. Chiu, and R. Murch, “A highly pattern-reconfigurable planar antenna with 360° single- and multi-beam steering,” *IEEE Trans. Antennas Propag.*, vol. 70, no. 8, pp. 6490-654 August 2022.

[44] Y. Zhang et al., “A low-profile microstrip vertically polarized endfire antenna with 360° beam-scanning and high beam-shaping capability,” *IEEE Trans. Antennas Propag.*, vol. 70, no. 9, pp. 7691-772 September 2022.

[45] “Chip inductors-0402DC series (1005),” Data Sheet 0402DC-R10XJRW, Coilcraft Inc., Cary, IL, USA, May 2024. [Online]. Available: https://www.coilcraft.com/get-media/b3553702-9a56-/4386-b513-fcddf8709240/0402dc.pdf

[46] “High Q chip multilayer ceramic capacitors (≤100 Vdc) for consumer electronics & industrial equipment,” Data Sheet CJM1555C1H130GB01, Murata, Nagaokakyo, Japan, May 2024. [Online]. Available: https://search.murata.co.jp/Ceramy/image/img/A01X/G101/ENG/GJM1555C1H130GB01-01A.pdf

[47] C. Y. Chiu, C. H. Cheng, Y. S. Wan, C. R. Rowell, and R. D. Murch, “Design of a flat fading 4×4 MIMO testbed for antenna characteri-zation using a modular approach,” in *Proc. IEEE Wireless Commun. Netw. Conf.*, 2007, pp. 2913-2918.

[48] J. Rao, Y. Zhan, and R. Murch, “A reconfigurable intelligent surface for arbitrary mm-wave polarization using parasitic enhancing structures,” in *Proc. IEEE Int. Symp. Antennas Propag. USNC-URSI Radio Sci. Meeting* (*USNC-URSI*), 2023, pp. 217-218.

[49] W. Yang, C. Zhou, Q. Xue, Q. Wen, and W. Che, “Millimeter-wave frequency-reconfigurable metasurface antenna based on vanadium dioxide films,” *IEEE Trans. Antennas Propag.*, vol. 69, no. 8, pp. 4359-4369 August 2021.

What is claimed is:

1. A pixel-based reconfigurable antenna (PRA) comprising:

a lower substrate;

a ground plane attached to a bottom surface of the lower substrate;

a patch antenna attached to a top surface of the lower substrate, wherein the patch antenna serves as a radiation source of the PRA, and the radiation source is configured to be fed from a back side of the ground plane through a probe;

an upper substrate disposed above the lower substrate and separated from the lower substrate with a spacing of $h_{air}$; and a pixel layer consisting of plural metallic pixel patches attached to a top surface of the upper substrate, the plural metallic pixel patches being arranged in a uniform grid pattern with a constant pitch distance b between any two adjacent metallic pixel patches, wherein:

the patch antenna provides reference electric field, which is then radiated after being coupled to metals of the pixel layer, wherein the pixel layer is reconfigurable, each reconfigurable state of the PRA corresponds to a FAS port, and the PRA supports a total of N fluid antenna system (FAS) ports uniformly distributed across a linear length of $W\lambda$, where $\lambda$ is wavelength, W is the number of the wavelengths, and $N/W>1$;

connections between any two adjacent metallic pixel patches are configured to be hardwired, open-circuited, or implemented via Radio Frequency (RF) switches, and position selections of hardwires, open circuits, and the RF switches satisfy a first condition that the position selections of the hardwires, the open circuits, and the RF switches provide impedance match over a specified bandwidth; and selection and ordering of the N FAS ports from on/off state combinations of the RF switches satisfy a second condition that any two adjacent FAS ports of the N FAS ports are spatial correlated, wherein the second condition can be satisfied when difference between a radiation pattern covariance matrix of all reconfigurable states and a target covariance matrix is minimized.

2. The PRA according to claim 1, wherein:

the connections between any two adjacent metallic pixel patches in the uniform grid pattern constitute a total of $\mathcal{Q}$ internal ports, of which P internal ports are designated for the RF switches, and open states denoted by 0 or connected states denoted by 1 between any two adjacent metallic pixel patches are represented by a vector x and position selections of the RF switches are specified by a set S, so that the vector x and the set S given below completely define a connection configuration of the PRA for the pixel layer:

$$x = [x_1, x_2, \ldots, x_{\mathcal{Q}}], \tag{10}$$

where $x_q \in \{0, 1\}$ for $q=1, 2, \ldots, \mathcal{Q}$, $$S = \{q_1, q_2, \ldots, q_P\}, \text{ for } P < \mathcal{Q}, \tag{11}$$

where $q_1$ to $q_P$ specify ordinal indices in the vector x of selected positions for P RF switches among the $\mathcal{Q}$ internal ports.

3. The PRA according to claim 2, wherein:

for a vector $x_l$ of all possible vectors x and a set $S_k$ of all possible sets S, $\mathcal{U}_{k,l}$ defines a set that contains $2^P$ elements representing all of the on/off state combinations of the RF switches, and a total number of such defined sets $\mathcal{U}_{k,l}$ is $$2^{\mathcal{Q}-P}C_P^{\mathcal{Q}};$$

and set $$\mathcal{U}_{k,l}^M$$

is a subset of set $\mathcal{U}_{k,l}$ that satisfies the first condition, and the first condition is mathematically formulated as $$\mathcal{U}_{k,l}^{M} = \{x_l^m \mid S_E(x_l^m, S_k) < -10 \text{ dB}, x_l^m \in \mathcal{U}_{k,l}\} \quad (18)$$

$$\text{s.t.: card}\left(\mathcal{U}_{k,l}^{M}\right) = M \geq N, \quad (19)$$

where $$S_E(x_l^m, S_k)$$

is a reflection coefficient of the PRA under a connection configuration determined by the vector $$x_l^m$$

and the set $S_k$.

4. The PRA according to claim 3, wherein part of sets $$\mathcal{U}_{k,l}^{M}$$

that satisfies the first condition are selected as candidate sets for implementing the second condition to reduce search space.

5. The PRA according to claim 4, wherein:

the second condition serves as a optimization objective for a genetic algorithm (GA)'s object function $\delta_e(D)$, and the optimization objective is given by $$\min_D \delta_e(D) \quad (30)$$

$$\text{s.t.}: D \in \{1, 2, \ldots, M\}^N, \text{ with } [D]_n \neq [D]_{n'},$$

where a vector sequence $D=[d_1, d_2, \ldots, d_N]^T$ represents the selection and ordering of the N FAS ports from M matching patterns in each candidate set $$\mathcal{U}_{k,l}^{M},$$

and the objective function $\delta_e(D)$ is given by $$\delta_e(D) = \frac{\Delta(D)}{TN^2}, \quad (29)$$

where $\Delta(D)$ is a total absolute error given by $$\Delta D = \sum_{n=1}^{N} \sum_{n'=1}^{N} \left\| [\varrho(D)]_{n,n'} \right| - \left| [\varrho^*]_{n,n'} \right\|, \quad (26)$$

where $[\boldsymbol{\varrho}]_{n,n'}$ is an (n, n')-th entry of the radiation pattern covariance matrix $\boldsymbol{\varrho}$, and $[\boldsymbol{\varrho}^*]_{n,n'}$ is an (n, n')-th entry of the target covariance matrix $\boldsymbol{\varrho}^*$.

6. The PRA according to claim 5, wherein when frequency is considered to meet the requirement of bandwidth, equation (18) is replaced by $$\mathcal{U}_{k,l}^{M} = \left\{x_l^m \mid \max[S_E(x_l^m, S_k, f_t)] < -10 \text{ dB}, x_l^m \in \mathcal{U}_{k,l}\right\}, \quad (27)$$

and equation (26) is replaced by $$\Delta(D) = \sum_{t=1}^{T} \sum_{n=1}^{N} \sum_{n'=1}^{N} \left\| [\boldsymbol{\varrho}^*(D, f_t)]_{n,n'} \right| - \left| [\boldsymbol{\varrho}^*]_{n,n'} \right\|, \quad (28)$$

where $$f_t = f_l + (t-1)\frac{f_u - f_l}{T-1}$$

for t=1, 2, . . . , T, $f_l$ is a lower limit, $f_u$ is an upper limit, and T represents sampling frequency points.

7. The PRA according to claim 5, wherein:

$[\boldsymbol{\varrho}^*]_{n,n'}$ is given by $$[\varrho^*]_{n,n'} = J_0\left(\frac{2\pi|n-n'|W}{N-1}\right), \quad (25)$$

where $J_0$ is Bessel function of first kind, order zero.

8. The PRA according to claim 5, wherein:

a $(Q+1)\times(Q+1)$ impedance matrix Z represents impedances of $(Q+1)$ ports made up of the Q internal ports and a single external feed port, and the $(Q+1)\times(Q+1)$ impedance matrix Z is represented by $$Z = \begin{bmatrix} Z_E & Z_{EI} \\ Z_{IE} & Z_I \end{bmatrix} = \begin{bmatrix} Z_{0,0}(f) & Z_{0,1}(f) & \cdots & Z_{0,Q}(f) \\ Z_{1,0}(f) & Z_{1,1}(f) & \cdots & Z_{1,Q}(f) \\ \vdots & \vdots & \ddots & \vdots \\ Z_{Q,0}(f) & Z_{Q,1}(f) & \cdots & Z_{Q,Q}(f) \end{bmatrix},$$

where $Z_{i,j}(f)$ denotes each element of the $(Q+1)\times(Q+1)$ impedance matrix Z, where f is frequency, 0 is the single external feed port, and 1 to $Q$ are the $Q$ internal ports, and where $Z_E \in \mathbb{C}^{1\times 1}$, $Z_{EI} \in \mathbb{C}^{1\times Q}$, $Z_{IE} \in \mathbb{C}^{Q\times 1}$ and $Z_I \in \mathbb{C}^{Q\times Q}$ are four sub-matrixes of the $(Q+1)\times(Q+1)$ impedance matrix Z.

9. The PRA according to claim 8, wherein:

an input impedance of the PRA is calculated as $$Z_{in}(x, S) = Z_E - Z_{EI}\left[Z_I + Z^L(x, S)\right]^{-1} Z_{IE}, \quad (15)$$

where $Z^L(x, S)$ is a $Q\times Q$ diagonal matrix indicating impedances terminated at the $Q$ internal ports under a connection configuration determined by the vector x and the set S.

10. The PRA according to claim 9, wherein:

the reflection coefficient $$S_E(x_l^m, S_k)$$

is given by $$S_E(x_l^m, S_k) = 10 \cdot \lg\left|\frac{Z_{in}(x_l^m, s_k) - z_0}{Z_{in}(x_l^m, s_k) + z_0}\right|^2 \text{dB}, \quad (20)$$

where $Z_0$ denotes a characteristic impedance, and $$Z_{in}(x_l^m, S_k)$$

is the input impedance of the PRA under the connection configuration determined by the vector $$x_l^m$$

and the set $S_k$.

11. The PRA according to claim 9, wherein:

$$e_q^{oc}(\Omega)$$

an open-circuit radiation pattern excited by a unit current at a q-th port of the ($\mathcal{Q}$+1) ports when all other ports are open, given by $$e_q^{oc}(\Omega) = \left[e_{\theta,q}^{oc}(\Omega), e_{\phi,q}^{oc}(\Omega)\right]^T$$

where θ and ϕ represent an elevation angle and an azimuth angle in spherical coordinates, respectively, and Ω=(θ, ϕ); and a combination of $$e_q^{oc}$$

for q=0, 1, 2, . . . , $\mathcal{Q}$ is represented by an open-circuit radiation pattern matrix $E_{OC}$, given by $$E_{OC} = \left[e_0^{oc}, e_1^{oc}, e_2^{oc}, \ldots, e_{\mathcal{Q}}^{oc}\right].$$

12. The PRA according to claim 11, wherein:

the radiation pattern covariance matrix $\varrho$ is written as $$\varrho = \varrho_0 = |C \oslash G|, \tag{22}$$

where Ø is Hadamard division, a matrix $G \in \mathbb{C}^{M\times M}$ represents an average energy of all M matching patterns and is used for normalization, and an (i, j)-th entry of the matrix G is written as $$[G]_{i,j} = \sqrt{[C]_{i,i}\,[C]_{j,j}}, \tag{24}$$

where a matrix C is an absolute correlation matrix of all M matching patterns, defines as $$C = I^H\left(\int\int_\Omega E_{OC}^H E_{OC} S(\Omega)\, d\Omega\right) I = I^H K_{OC} I, \tag{23}$$

where $K_{OC} \in \mathbb{C}^{(\mathcal{Q}+1)\times(\mathcal{Q}+1)}$ is a correlation matrix of all open-circuit radiation patterns weighted by S(Ω), S(Ω) is power angular spectrum (PAS), $E_{OC}$ is the open-circuit radiation pattern matrix, and $I=[i_1, i_2, \ldots, i_M]$ is a current matrix, where $i_1, i_2, \ldots, i_M$ are current vectors of all M matching patterns, each given by $$i = \frac{1}{\sqrt{Z_{in}(x, S)}}\begin{bmatrix} 1 \\ -[Z_I + Z^L(x, S)]^{-1} Z_{IE} \end{bmatrix}. \tag{17}$$

13. The PRA according to claim 11, wherein:

$[\varrho]_{n,n'}$ is given by $$[\varrho]_{n,n'} = \frac{\int\int e_n(\Omega)\cdot e_{n'}^*(\Omega) S(\Omega)\, d\Omega}{\int\int e_n(\Omega)\cdot e_{n'}^*(\Omega) S(\Omega)\, d\Omega \int\int e_{n'}(\Omega)\cdot e_{n'}^*(\Omega) S(\Omega)\, d\Omega}, \tag{8}$$

where S(Ω) is power angular spectrum (PAS), $e_n(\Omega)$ represents FAS radiation pattern of an n-th port of the N FAS ports excited by an n-th current vector $i_n$, and $e^*_{n'}(\Omega)$ denotes a complex conjugate of $e_{n'}(\Omega)$; and $e_n(\Omega)$ is written as $$e_n(\Omega) = \sum\nolimits_{q=0}^{\mathcal{Q}} [i_n]_q\, e_q^{oc}(\Omega) = E_{OC} i_n, \tag{16}$$

where $E_{OC}$ is the open-circuit radiation pattern matrix, and the n-th current vector $i_n$ is obtained by $$i_n = \frac{1}{\sqrt{Z_{in}(x, S)}}\begin{bmatrix} 1 \\ -[Z_I + Z^L(x, S)]^{-1} Z_{IE} \end{bmatrix}. \tag{17}$$

14. The PRA according to claim 4, wherein $\mathcal{Q}$=60, P=6, and a number of the candidate sets for implementing the second condition is approximately 100.

15. The PRA according to claim 1, wherein the upper and lower substrates are square prisms of size $P_s \times P_s \times h$, with a side length $P_s$ and a height h, each metallic pixel patch is a square having a side length a, the uniform grid pattern is arranged in a $N_s \times N_s$ square configuration, and a number of internal ports is given by $\mathcal{Q}=2\times N_s\times(N_s-1)$.

16. The PRA according to claim 1, wherein the patch antenna is an E-slot patch with a first slot and a second slot each extending inward from a long edge of a $L_p \times W_p$ rectangular radiating surface of the E-slot patch, and wherein the first and second slots are elongated rectangles each with dimensions $L_s \times W_s$.

17. The PRA according to claim 1, wherein the RF switches are controlled by direct current (DC) control lines arranged around boundaries of the PRA, with capacitors replacing part of the hardwires and inductors occupying feed points of the DC control lines and replacing part of the open circuits, the capacitors and the inductors providing isolation between DC control signals and RF signals.

18. A method for designing a pixel-based reconfigurable antenna (PRA), wherein a pixel layer of the PRA is reconfigurable, each reconfigurable state of the PRA corresponds to a FAS port, and the PRA supports a total of N fluid antenna system (FAS) ports uniformly distributed across a linear length of Wλ, where λ is wavelength, W is the number of the wavelengths, and N/W>1, the method comprising:

selecting positions of hardwires, open circuits, or radio frequency (RF) switches between any two adjacent metallic pixel patches in the pixel layer to satisfy a first condition that the position selections of the hardwires, the open circuits, and the RF switches provide impedance match over a specified bandwidth; and selecting and ordering the N FAS ports from on/off state combinations of the RF switches to satisfy a second condition that any two adjacent FAS ports of the N FAS ports are spatial correlated, wherein the second condition can be satisfied when difference between a radiation pattern covariance matrix of all reconfigurable states and a target covariance matrix is minimized.

19. The method according to claim 18, wherein:

the connections between any two adjacent metallic pixel patches in a uniform grid pattern constitute a total of $\mathcal{Q}$ internal ports, of which P internal ports are designated for the RF switches, and open states denoted by 0 or connected states denoted by 1 between any two adjacent metallic pixel patches are represented by a vector x and position selections of the RF switches are specified by a set S, so that the vector x and the set S given below completely define a connection configuration of the PRA for the pixel layer:

$$x = [x_1, x_2, \ldots, x_{\mathcal{Q}}], \tag{10}$$

where $x_q \in \{0, 1\}$ for q=1, 2, . . . , $\mathcal{Q}$, $$S = \{q_1, q_2, \ldots, q_P\}, \text{ for } P < \mathcal{Q}, \tag{11}$$

where $q_1$ to $q_P$ specify ordinal indices in the vector x of selected positions for P RF switches among the $\mathcal{Q}$ internal ports.

20. The method according to claim 19, wherein:

for a vector $x_l$ of all possible vectors x and a set $S_k$ of all possible sets S, $\mathcal{U}_{k,l}$ defines a set that contains $2^P$ elements representing all of the on/off state combinations of the RF switches, and a total number of such defined sets $\mathcal{U}_{k,l}$ is $$2^{\mathcal{Q}-P} C_P^{\mathcal{Q}};$$

and set $$\mathcal{U}_{k,l}^M$$

is a subset of set $\mathcal{U}_{k,l}$ that satisfies the first condition, and the first condition is mathematically formulated as $$\mathcal{U}_{k,l}^M = \{x_l^m \mid S_E(x_l^m, S_k) < -10\text{ dB}, x_l^m \in \mathcal{U}_{k,l}\} \tag{18}$$

$$\text{s.t.: card}(\mathcal{U}_{k,l}^M) = M \geq N, \tag{19}$$

where $$S_E(x_l^m, S_k)$$

is a reflection coefficient of the PRA under a connection configuration determined by the vector $$x_l^m$$

and the set $S_k$.

21. The method according to claim 20 further comprising: selecting part of sets $$\mathcal{U}_{k,l}^M$$

that satisfies the first condition as candidate sets for implementing the second condition to reduce search space.

22. The method according to claim 21, wherein:

the second condition serves as a optimization objective for a genetic algorithm (GA)'s object function $\delta_e(D)$, and the optimization objective is given by $$\min_D \delta_e(D) \tag{30}$$

$$\text{s.t.: } D \in \{1, 2, \ldots, M\}^N, \text{ with } [D]_n \neq [D]_{n'},$$

where a vector sequence $D=[d_1, d_2, \ldots, d_N]^T$ represents the selecting and ordering of the N FAS ports from M matching patterns in each candidate set $$\mathcal{U}_{k,l}^M,$$

and the objective function $\delta_e(D)$ is given by $$\delta_e(D) = \frac{\Delta(D)}{TN^2}, \tag{29}$$

where Δ(D) is a total absolute error given by $$\Delta D = \sum_{n=1}^N \sum_{n=1}^N \left| |[\boldsymbol{\varrho}(D)]_{n,n'}| - |[\boldsymbol{\varrho}^*]_{n,n'}| \right|, \tag{26}$$

where $[\boldsymbol{\varrho}]_{n,n'}$ is an (n, n')-th entry of the radiation pattern covariance matrix $\boldsymbol{\varrho}$, and $[\boldsymbol{\varrho}^*]_{n,n'}$ is an (n, n')-th entry of the target covariance matrix $\boldsymbol{\varrho}^*$.

23. The method according to claim 22, wherein when frequency is considered to meet the requirement of bandwidth, equation (18) is replaced by $$\mathcal{U}_{k,l}^M = \{x_l^m \mid \max[S_E(x_l^m, S_k, f_i)] < -10\text{ dB}, x_l^m \in \mathcal{U}_{k,l}\}, \tag{27}$$

and equation (26) is replaced by $$\Delta(D)=\sum_{t=1}^{T}\sum_{n=1}^{N}\sum_{n'=1}^{N}\left\|[\boldsymbol{\varrho}(D,f_t)]_{n,n'}\right|-\left|[\boldsymbol{\varrho}^*]_{n,n'}\right\|, \tag{28}$$

where $$f_t=f_l+(t-1)\frac{f_u-f_l}{T-1}$$

for t=1, 2, . . . , T, $f_l$ is a lower limit, $f_u$ is an upper limit, and T represents sampling frequency points.

24. The method according to claim 22, wherein:

$[\boldsymbol{\varrho}^*]_{n,n'}$ is given by $$[\boldsymbol{\varrho}^*]_{n,n'}=J_0\left(\frac{2\pi|n-n'|W}{N-1}\right), \tag{25}$$

where $J_0$ is Bessel function of first kind, order zero.

25. The method according to claim 22, wherein:

a $(\mathcal{Q}+1)\times(\mathcal{Q}+1)$ impedance matrix Z represents impedances of $(\mathcal{Q}+1)$ ports made up of the Q internal ports and a single external feed port, and the $(\mathcal{Q}+1)\times(\mathcal{Q}+1)$ impedance matrix Z is represented by $$Z=\begin{bmatrix} Z_E & Z_{EI}\\ Z_{IE} & Z_I\end{bmatrix}=\begin{bmatrix} z_{0,0}(f) & z_{0,1}(f) & \cdots & z_{0,\mathcal{Q}}(f)\\ z_{1,0}(f) & z_{1,1}(f) & \cdots & z_{1,\mathcal{Q}}(f)\\ \vdots & \vdots & \ddots & \vdots\\ z_{\mathcal{Q},0}(f) & z_{\mathcal{Q},1}(f) & \cdots & z_{\mathcal{Q},\mathcal{Q}}(f)\end{bmatrix},$$

where $Z_{i,j}(f)$ denotes each element of the $(\mathcal{Q}+1)\times(\mathcal{Q}+1)$ impedance matrix Z, where f is frequency, 0 is the single external feed port, and 1 to $\mathcal{Q}$ are the $\mathcal{Q}$ internal ports, and where $Z_E\in\mathbb{C}^{1\times 1}$, $Z_{EI}\in\mathbb{C}^{1\times\mathcal{Q}}$, $Z_{IE}\in\mathbb{C}^{\mathcal{Q}\times 1}$ and $Z_I\in\mathbb{C}^{\mathcal{Q}\times\mathcal{Q}}$ are four sub-matrixes of the $(\mathcal{Q}+1)\times(\mathcal{Q}+1)$ impedance matrix Z.

26. The method according to claim 25, wherein:

an input impedance of the PRA is calculated as $$Z_{in}(x,S)=Z_E-Z_{EI}\left[Z_I+Z^L(x,S)\right]^{-1}Z_{IE}, \tag{15}$$

where $Z^L(x, S)$ is a $\mathcal{Q}\times\mathcal{Q}$ diagonal matrix indicating impedances terminated at the $\mathcal{Q}$ internal ports under a connection configuration determined by the vector x and the set S.

27. The method according to claim 26, wherein:

the reflection coefficient $$S_E(x_l^m,S_k)$$

is given by $$S_E(x_l^m,S_k)=10\cdot lg\left|\frac{Z_{in}(x_l^m,S_k)-Z_0}{Z_{in}(x_l^m,S_k)+Z_0}\right|^2\text{dB}, \tag{20}$$

where $Z_0$ denotes a characteristic impedance, and $$Z_{in}(x_l^m,S_k)$$

is an input impedance of the PRA under the connection configuration determined by the vector $$x_l^m$$

and the set $S_k$.

28. The method according to claim 26, wherein:

$$e_q^{oc}(\Omega)$$

is an open-circuit radiation pattern excited by a unit current at a q-th port of the $(\mathcal{Q}+1)$ ports when all other ports are open, given by $$e_q^{oc}(\Omega)=\left[e_{\theta,q}^{oc}(\Omega),\,e_{\phi,q}^{oc}(\Omega)\right]^T$$

where θ and ϕ represent an elevation angle and an azimuth angle in spherical coordinates, respectively, and Ω=(θ, ϕ); and a combination of $$e_q^{oc}$$

for q=0, 1, 2, . . . , $\mathcal{Q}$ is represented by an open-circuit radiation pattern matrix $E_{OC}$, given by $$E_{OC}=\left[e_0^{oc},e_1^{oc},e_2^{oc},\ldots,e_{\mathcal{Q}}^{oc}\right].$$

29. The method according to claim 28, wherein:

the radiation pattern covariance matrix $\boldsymbol{\varrho}$ is written as $$\varrho=\varrho_0=|C\oslash G|, \tag{22}$$

where ⌀ is Hadamard division, a matrix $G\in\mathbb{C}^{M\times M}$ represents an average energy of all M matching patterns and is used for normalization, and an (i, j)-th entry of the matrix G is written as $$[G]_{i,j}=\sqrt{[C]_{i,i}[C]_{j,j}}, \tag{24}$$

where a matrix C is an absolute correlation matrix of all M matching patterns, defines as $$C=I^H\left(\int\int_\Omega E_{OC}^H E_{OC}S(\Omega)d\Omega\right)I=I^H K_{OC}I, \tag{23}$$

where $K_{OC} \in \mathbb{C}^{(\mathcal{Q}+1)\times(\mathcal{Q}+1)}$ is a correlation matrix of all open-circuit radiation patterns weighted by $S(\Omega)$, $S(\Omega)$ is power angular spectrum (PAS), $E_{OC}$ is the open-circuit radiation pattern matrix, and $I=[i_1, i_2, \ldots, i_M]$ is a current matrix, where $i_1, i_2, \ldots, i_M$ are current vectors of all M matching patterns, each given by $$i = \frac{1}{\sqrt{Z_{in}(x, S)}}\begin{bmatrix} 1 \\ -\left[Z_I + Z^L(x, S)\right]^{-1} Z_{IE} \end{bmatrix}. \quad (17)$$

30. The method according to claim 28, wherein: $[\varrho]_{n,n'}$ is given by $$[\varrho]_{n,n'} = \frac{\iint e_n(\Omega)\cdot e^*_{n'}(\Omega)S(\Omega)d\Omega}{\sqrt{\iint e_n(\Omega)\cdot e^*_{n'}(\Omega)S(\Omega)d\Omega \iint e_{n'}(\Omega)\cdot e^*_{n'}(\Omega)S(\Omega)d\Omega}}, \quad (8)$$

where $S(\Omega)$ is power angular spectrum (PAS), $e_n(\Omega)$ represents FAS radiation pattern of an n-th port of the N FAS ports excited by an n-th current vector $i_n$, and $e^*_{n'}(\Omega)$ denotes a complex conjugate of $e_{n'}(\Omega)$; and $e_n(\Omega)$ is written as $$e_n(\Omega) = \sum_{q=0}^{\mathcal{Q}} [i_n]_q e_q^{oc}(\Omega) = E_{OC} i_n, \quad (16)$$

where $E_{OC}$ is the open-circuit radiation pattern matrix, and the n-th current vector in is obtained by $$i_n = \frac{1}{\sqrt{Z_{in}(x, S)}}\begin{bmatrix} 1 \\ -\left[Z_I + Z^L(x, S)\right]^{-1} Z_{IE} \end{bmatrix}. \quad (17)$$

31. The method according to claim 21, wherein $\mathcal{Q}$=60, P=6, and a number of the candidate sets for implementing the second condition is approximately 100.

* * * * *